United States Patent
Ohkoshi et al.

(10) Patent No.: US 12,428,310 B2
(45) Date of Patent: Sep. 30, 2025

(54) IRON-BASED OXIDE MAGNETIC POWDER AND METHOD FOR PRODUCING SAME

(71) Applicants: THE UNIVERSITY OF TOKYO, Tokyo (JP); DOWA HOLDINGS CO., LTD., Tokyo (JP)

(72) Inventors: Shin-ichi Ohkoshi, Tokyo (JP); Asuka Namai, Tokyo (JP); Hiroko Tokoro, Tokyo (JP); Marie Yoshikiyo, Tokyo (JP); Kazuhiro Yamaga, Tokyo (JP); Yasuto Miyamoto, Tokyo (JP); Yuki Mineyama, Tokyo (JP); Kenji Sakane, Tokyo (JP); Tetsuya Kawahito, Tokyo (JP)

(73) Assignees: DOWA HOLDINGS CO., LTD., Tokyo (JP); THE UNIVERSITY OF TOKYO, Tokyo (JP)

( * ) Notice: Subject to any disclaimer, the term of this patent is extended or adjusted under 35 U.S.C. 154(b) by 828 days.

(21) Appl. No.: 17/764,229

(22) PCT Filed: Sep. 29, 2020

(86) PCT No.: PCT/JP2020/036984
§ 371 (c)(1),
(2) Date: Mar. 28, 2022

(87) PCT Pub. No.: WO2021/065936
PCT Pub. Date: Apr. 8, 2021

(65) Prior Publication Data
US 2022/0375663 A1  Nov. 24, 2022

(30) Foreign Application Priority Data

Sep. 30, 2019 (JP) ................................. 2019-181072
Sep. 28, 2020 (JP) ................................. 2020-162743

(51) Int. Cl.
| | | |
|---|---|---|
| *C01G 49/06* | (2006.01) | |
| *B82Y 25/00* | (2011.01) | |
| *B82Y 30/00* | (2011.01) | |
| *B82Y 40/00* | (2011.01) | |

(52) U.S. Cl.
CPC .............. *C01G 49/06* (2013.01); *B82Y 25/00* (2013.01); *B82Y 30/00* (2013.01); *B82Y 40/00* (2013.01); *C01P 2004/04* (2013.01); *C01P 2004/64* (2013.01)

(58) Field of Classification Search
CPC ... C01G 49/06; C01P 2004/04; C01P 2004/64
See application file for complete search history.

(56) References Cited

U.S. PATENT DOCUMENTS

| | | | |
|---|---|---|---|
| 11,401,170 B2 * | 8/2022 | Ohkoshi | C01G 49/06 |
| 2018/0005737 A1 * | 1/2018 | Sakane | H01F 1/14725 |
| 2018/0208479 A1 * | 7/2018 | Sakane | G11B 5/70642 |

FOREIGN PATENT DOCUMENTS

| | | |
|---|---|---|
| JP | 2008-063201 | 3/2008 |
| JP | 2008-174405 | 7/2008 |
| JP | 2016-130208 | 7/2016 |
| JP | 2017-024981 | 2/2017 |
| JP | 2019-001663 | 1/2019 |
| JP | 2019-003713 | 1/2019 |
| JP | 2019-082356 | 5/2019 |
| JP | 2019-175539 | 10/2019 |
| WO | 2008/029861 | 3/2008 |
| WO | 2008/149785 | 8/2010 |

* cited by examiner

*Primary Examiner* — C Melissa Koslow
(74) *Attorney, Agent, or Firm* — Millen, White, Zelano & Branigan, P.C.; Christopher W. Brody

(57) ABSTRACT

A raw material solution containing trivalent iron ions, or trivalent iron ions and ions of a metal element that partially substitutes Fe sites, and an alkaline aqueous solution for neutralizing the raw material solution are added to a reaction system to adjust the pH of the reaction system from 1.0 to 3.0 or lower. Hydroxycarboxylic acid is added to the obtained reaction solution and the pH of the reaction system is then neutralized from 7.0 to 10.0 or lower. The obtained precipitate of a substituent metal element-containing iron oxyhydroxide is coated with silicon oxide, followed by heating so as to form particles of ε-iron oxide in which Fe sites are partially substituted by other metal elements, and then, a slurry containing the particles is classified. The iron-based oxide magnetic powder has a particle shape close to a perfect sphere and is suitable for use in a magnetic recording medium.

12 Claims, 3 Drawing Sheets

[Fig.1]
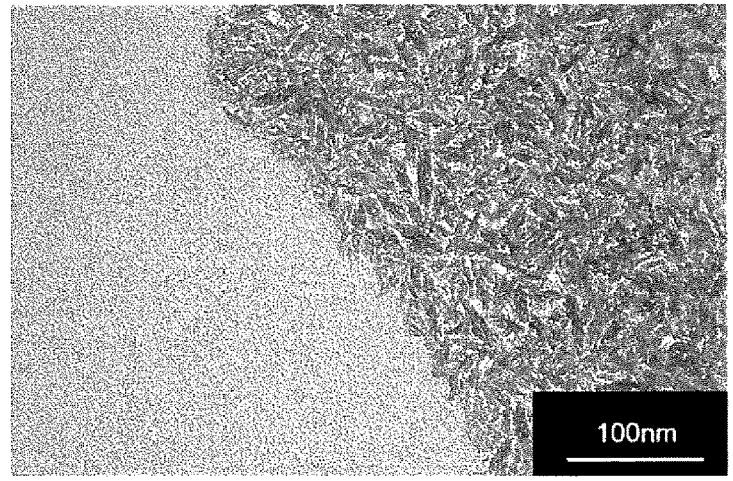
[Fig.2]
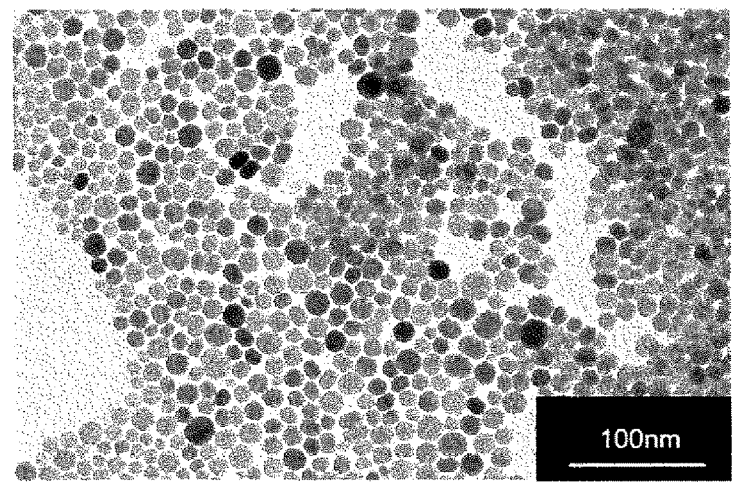
[Fig.3]
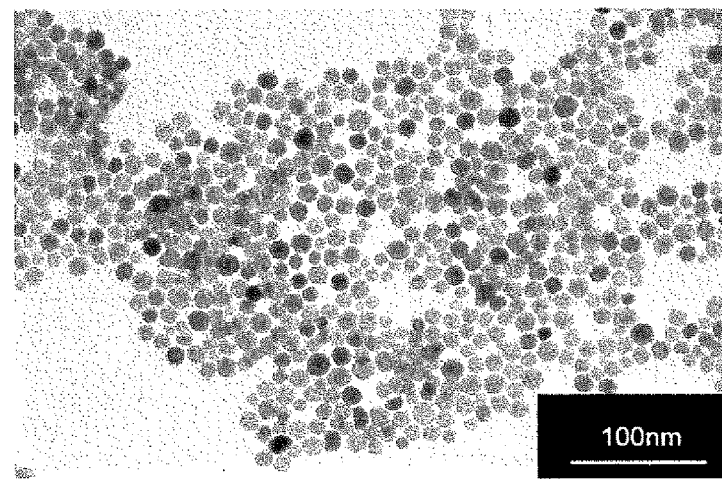

[Fig.4]
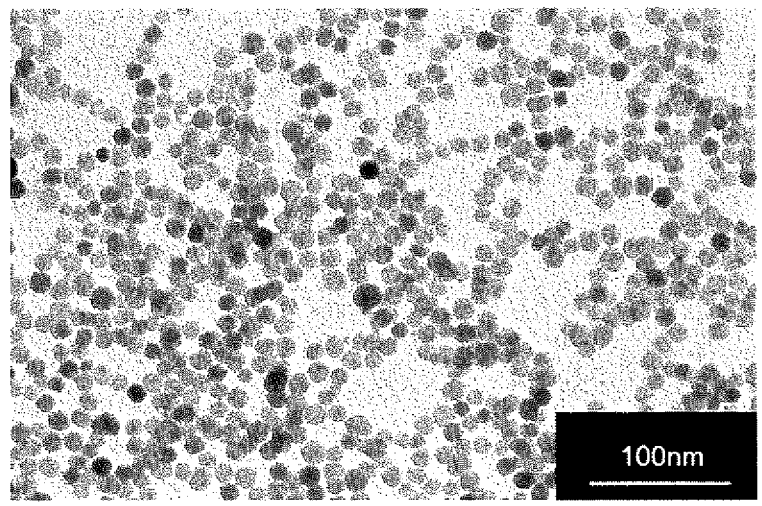
[Fig.5]
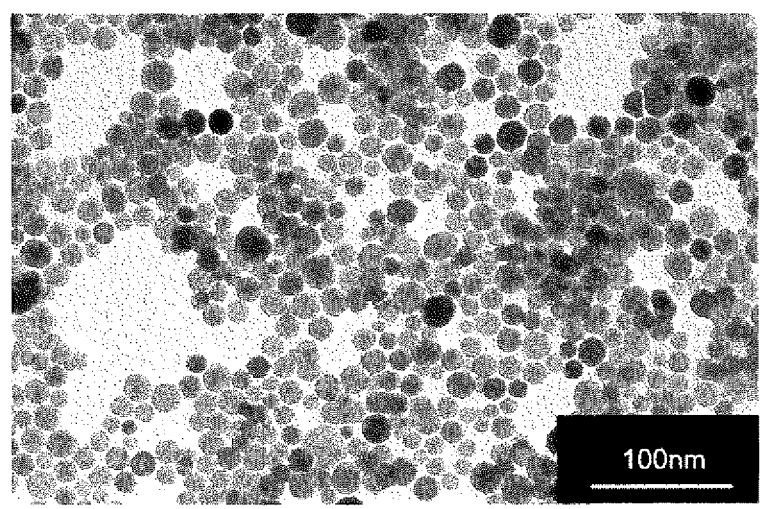
[Fig.6]
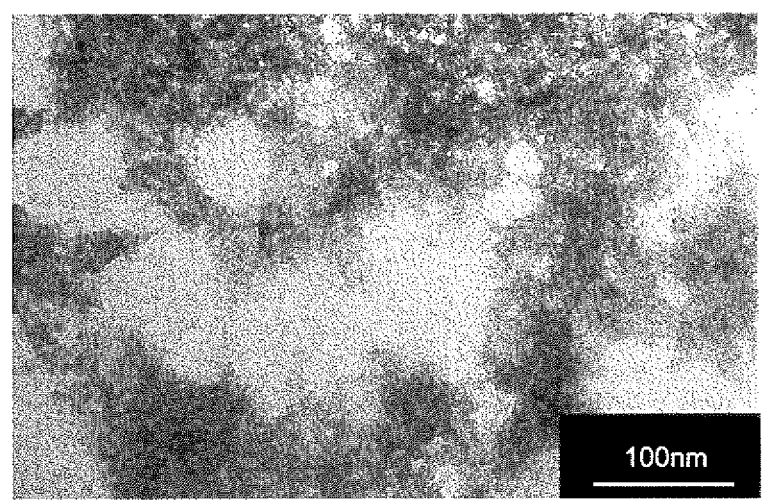

[Fig.7]
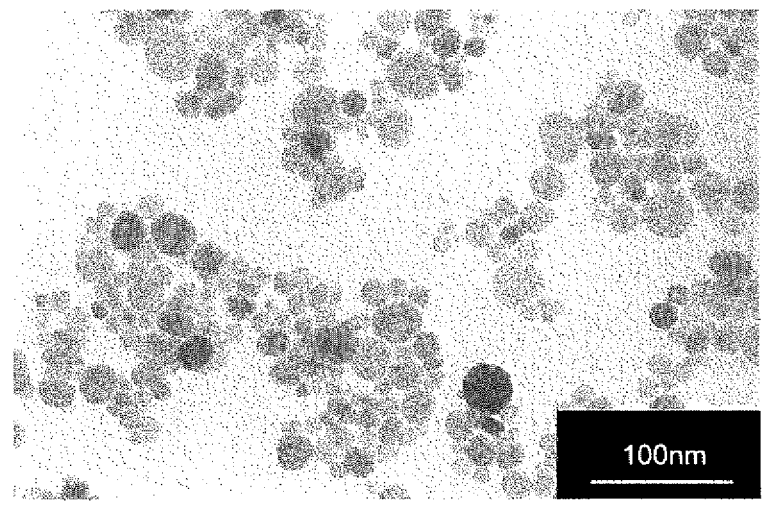

IRON-BASED OXIDE MAGNETIC POWDER AND METHOD FOR PRODUCING SAME

TECHNICAL FIELD

The present invention relates to an iron-based oxide magnetic powder suitable for a high-density magnetic recording medium, a radio wave absorber, etc., and particularly to a magnetic powder in which the average particle diameter of the particles is on the order of nanometers, and a method for producing the same.

BACKGROUND ART

While $\varepsilon$-$Fe_2O_3$ is an extremely rare phase among iron oxides, particles thereof having a size on the order of nanometers show a great coercive force (Hc) of about 20 kOe ($1.59 \times 10^6$ A/m) at room temperature, and therefore, a production method for synthesizing $\varepsilon$-$Fe_2O_3$ as a single phase has been conventionally studied (PTL 1). Further, when $\varepsilon$-$Fe_2O_3$ is used in a magnetic recording medium, there is currently no material for a magnetic head having a high level of saturation magnetic flux density corresponding thereto, and therefore, the adjustment of the coercive force is also performed by partially substituting the Fe sites of $\varepsilon$-$Fe_2O_3$ by a trivalent metal such as Al, Ga, or In, and the relationship between the coercive force and the radio wave absorption properties has also been examined (PTL 2).

On the other hand, in the field of magnetic recording, development of a magnetic recording medium having a high ratio of reproduced signal level to particulate noise (C/N ratio: carrier to noise ratio) has been conducted, and in order to increase the recording density, there has been a demand for refinement of magnetic particles constituting a magnetic recording layer. However, the refinement of magnetic particles is generally likely to cause deterioration of the environmental stability and thermal stability thereof, and there is a concern about the deterioration of the magnetic properties of the magnetic particles under the use or storage environment. Therefore, by partially substituting the Fe sites of $\varepsilon$-$Fe_2O_3$ by another metal having excellent heat resistance, various types of partially substituted $\varepsilon$-$Fe_2O_3$, in which the particle size is reduced and the coercive force is made variable, and which also have excellent environmental stability and thermal stability, represented by a general formula $\varepsilon$-$A_xB_yFe_{2-x-y}O_3$ or $\varepsilon$-$A_xB_yC_zFe_{2-x-y-z}O_3$ (wherein A is a divalent metal element such as Co, Ni, Mn, or Zn, B is a tetravalent metal element such as Ti, and C is a trivalent metal element such as In, Ga, or Al) have been developed (PTL 3).

$\varepsilon$-$Fe_2O_3$ is obtained as a stable phase with a size on the order of nanometers, and therefore, a special method is needed for its production. In the above-mentioned PTLs 1 to 3, a method for producing $\varepsilon$-$Fe_2O_3$, in which a fine crystal of an iron oxyhydroxide produced by a liquid-phase method is used as a precursor, and the precursor is coated with silicon oxide by a sol-gel method, followed by a heat treatment, is disclosed, and as the liquid-phase method, each of a reverse micelle method using an organic solvent as a reaction medium and a method using only an aqueous solution as a reaction medium is disclosed. However, in $\varepsilon$-$Fe_2O_3$ or partially substituted $\varepsilon$-$Fe_2O_3$ obtained by such a method, there are variations in magnetic properties, and therefore, improvement of the magnetic properties thereof by removing the silicon oxide coating after the heat treatment, and performing a classification treatment has been proposed.

$\varepsilon$-$Fe_2O_3$ or an $\varepsilon$-type iron-based oxide in which Fe is partially substituted produced by a conventional production method disclosed in the above-mentioned PTLs 1 to 3 has excellent magnetic properties, however, depending on the production conditions, variations are sometimes observed in a coercive force distribution. In response to the problem of variations in coercive force distribution, PTL 4 discloses a method for producing an $\varepsilon$-type iron-based oxide magnetic particle powder containing a substituent metal element, in which an alkali is added to an aqueous solution containing trivalent iron ions and ions of a metal M that partially substitutes the Fe sites so as to neutralize the pH to 1.0 or higher and 3.0 or lower, and thereafter a hydroxycarboxylic acid D is added thereto in an amount of 0.125 or more and 1.0 or less in terms of molar ratio with respect to the amount of the trivalent iron ions: D/Fe or molar ratio with respect to the total amount of the trivalent iron ions and the ions of the substituent metal M: (D/(Fe+M)), and an alkali is further added thereto so as to neutralize the pH to 7.0 or higher and 10.0 or lower, and the produced iron oxyhydroxide containing the substituent metal element is coated with silicon oxide, followed by heating as a method for producing an $\varepsilon$-type iron-based oxide magnetic particle powder containing a substituent metal element. The hydroxycarboxylic acid which is a carboxylic acid having an OH group in the molecule is assumed to bring about an effect of forming a complex with the trivalent iron ion dissolved in the reaction solution, and delaying a hydroxide formation reaction of iron when an alkali is further added in the subsequent step resulting in narrowing the distribution of the average particle diameter of precursor fine particles containing an iron oxyhydroxide to be produced.

CITATION LIST

Patent Literature

PTL 1: JP-A-2008-174405
PTL 2: WO 2008/029861
PTL 3: WO 2008/149785
PTL 4: JP-A-2017-024981

SUMMARY OF INVENTION

Technical Problem

The $\varepsilon$-type iron-based oxide magnetic powder containing a substituent metal element produced by the production method disclosed in PTL 4 was excellent in that the particle size distribution is narrow and the content of fine particles that do not contribute to magnetic recording properties is low so that the coercive force distribution is narrow, but there was still room for improvement for increasing the recording density of a magnetic recording medium.

When applying the $\varepsilon$-type iron-based oxide magnetic powder to a magnetic recording medium, it is desired that not only the average particle diameter is merely controlled, but also the abundance ratio of fine particles or coarse particles whose particle diameter is far from the average value is decreased as much as possible. The presence of fine particles causes an increase in noise in the electromagnetic conversion property SNR of the magnetic recording medium even if the volume ratio to the magnetic powder is small. Further, the coarse particles are particles whose coercive force is too high to perform writing with a magnetic head, and if the abundance ratio thereof is large, it causes a decrease in the magnetic recording density. The $\varepsilon$-type iron-based oxide magnetic powder containing a substituent metal element produced by the production method disclosed in PTL 4 cannot be said to have a sufficiently reduced content of fine particles and coarse particles described above, and still had a problem with an increase in the recording density of a magnetic recording medium.

Further, the ε-type iron-based oxide magnetic powder containing a substituent metal element produced by the production method disclosed in PTL 4 also had a problem that the particle shape is distorted. If the particle shape is distorted, when the particles are magnetically oriented during the production of a magnetic recording medium, the protruding and recessed parts of the particles may interfere with each other and hinder the orientation of the particles, and therefore, it is desired that the particle shape is as close to a perfect sphere as possible.

In view of the above problems, in the present invention, an iron-based oxide magnetic powder that is composed of particles of ε-iron oxide in which Fe sites are partially substituted by other metal elements, that has a sufficiently reduced content of fine particles and coarse particles, that has a particle shape close to a perfect sphere, and that is suitable for use in a magnetic recording medium, and a method for producing an iron-based oxide magnetic powder are provided.

Solution to Problem

In order to solve the above problems, in the present invention, (1) an iron-based oxide magnetic powder composed of particles of ε-iron oxide in which Fe sites are partially substituted by other metal elements, wherein an average particle diameter measured with a transmission electron microscope is 10 nm or more and 20 nm or less, the number ratio of particles with a particle diameter of 8 nm or less is 3% or less, the number ratio of particles with a particle diameter of 20 nm or more is 25% or less, the average circularity of particles measured with a transmission electron microscope is 0.955 or more, and the coefficient of variation of the particle diameter measured with a transmission electron microscope is 19% or less is provided.

(2) Further, it is preferred that the metal element that partially substitutes the Fe sites is one or more types of Ga, Co, and Ti.

(3) It does not matter that the metal element that partially substitutes the Fe sites is one or more types of Ga, Co, Ti, Ni, Mn, Cr, Nd, Dy, and Gd.

In the present invention, further, (4) a method for producing an iron-based oxide magnetic powder, which has an average particle diameter measured with a transmission electron microscope of 10 nm or more and 20 nm or less, and is composed of particles of ε-iron oxide or ε-iron oxide in which Fe sites are partially substituted by other metal elements, including:

a raw material solution preparation step of preparing an aqueous solution containing trivalent iron ions, or trivalent iron ions and ions of a metal element that partially substitutes the Fe sites (hereinafter referred to as a raw material solution), and an alkaline aqueous solution for neutralizing the raw material solution;

a first neutralization step of continuously or intermittently adding each of the raw material solution and the alkaline aqueous solution to a reaction system and mixing so as to adjust the pH of the reaction system to 1.0 or higher and 3.0 or lower;

a step of adding a hydroxycarboxylic acid to the aqueous solution after the first neutralization step;

a second neutralization step of neutralizing the pH to 7.0 or higher and 10.0 or lower by adding an alkali to the aqueous solution to which the hydroxycarboxylic acid is added, thereby obtaining a slurry containing a precipitate of an iron oxyhydroxide or a substituent metal element-containing iron oxyhydroxide;

a step of adding a silicon compound having a hydrolyzable group to the slurry containing the iron oxyhydroxide or the substituent metal element-containing iron oxyhydroxide, thereby coating the iron oxyhydroxide or the substituent metal element-containing iron oxyhydroxide with a hydrolysate of the silicon compound;

a step of heating the iron oxyhydroxide or the substituent metal element-containing iron oxyhydroxide coated with the hydrolysate of the silicon compound, thereby forming ε-iron oxide or ε-iron oxide, in which Fe sites are partially substituted by other metal elements, coated with silicon oxide;

a step of removing the silicon oxide on the ε-iron oxide or the ε-iron oxide, in which Fe sites are partially substituted by other metal elements, coated with the silicon oxide, thereby obtaining a slurry containing the ε-iron oxide or the ε-iron oxide, in which Fe sites are partially substituted by other metal elements;

a step of adding a quaternary ammonium salt at a concentration of 0.009 mol/kg or more and 1.0 mol/kg or less as a surface modifier to the slurry containing the ε-iron oxide or the ε-iron oxide, in which Fe sites are partially substituted by other metal elements, and also adjusting the pH to 11.0 or higher and 14.0 or lower;

a step of subjecting the surface modifier-containing slurry to a dispersion treatment, thereby obtaining a dispersion slurry of particles of the ε-iron oxide or the ε-iron oxide, in which Fe sites are partially substituted by other metal elements; and a step of classifying the dispersion slurry of the particles of the ε-iron oxide or the ε-iron oxide, in which Fe sites are partially substituted by other metal elements is provided.

(5) It is preferred that the first neutralization step described in the above item (4) is a step of continuously or intermittently adding each of the raw material solution and the alkaline aqueous solution containing the alkali in an amount of 0.4 equivalents or more and 0.9 equivalents or less with respect to the total amount of an acid group contained in the raw material solution to the reaction system which does not contain trivalent iron ions or ions of a metal element that partially substitutes the Fe sites and mixing so as to adjust the pH of the reaction system to 1.0 or higher and 3.0 or lower.

(6) The first neutralization step described in the above item (4) may be a step in which when each of the raw material solution and the alkaline aqueous solution is continuously or intermittently added to the reaction system which previously contains trivalent iron ions, or trivalent iron ions and ions of a metal element that partially substitutes the Fe sites, the amount of the trivalent iron ions and the ions of the metal element that partially substitutes the Fe sites previously contained in the reaction system is set to 50 mol % or less of the sum of the amount of the trivalent iron ions and the ions of the metal element that partially substitutes the Fe sites and the amount of the trivalent iron ions and the ions of the metal element that partially substitutes the Fe sites contained in the raw material solution added to the reaction system, and each of the raw material solution and the alkaline aqueous solution containing the alkali in an amount of 0.4 equivalents or more and 1.8 equivalents or less with respect to the total amount of an acid group contained in the raw material solution is continuously or intermittently added to the reaction system and mixed, so as to adjust the pH of the reaction system to 1.0 or higher and 3.0 or lower.

(7) It is preferred that in the first neutralization step in the above item (5), the addition rate of each of the raw material solution and the alkaline aqueous solution is adjusted so as to maintain the cumulative amount of the addition amount of the alkaline aqueous solution with respect to the total cumulative addition amount of the acid group contained in the raw material solution within a range of 0.4 equivalents or more and 0.9 equivalents or less through the step.

(8) It is preferred that in the first neutralization step in the above item (4), the raw material solution and the alkaline aqueous solution are added over 10 minutes or more.

(9) It is preferred that the average diameter measured with a dynamic light scattering particle size distribution analyzer of the slurry containing the iron oxyhydroxide or the substituent metal element-containing iron oxyhydroxide obtained in the second neutralization step in the above item (4) is 300 nm or less.

(10) It is preferred that iron(III) chloride is used as a supply source of the trivalent iron ions contained in the raw material solution in the above item (4).

(11) It is preferred that the cumulative addition amount of the alkali with respect to the total cumulative addition amount of the acid group contained in the raw material solution in the above item (5) is set to 0.6 equivalents or more and 0.9 equivalents or less through the first neutralization step.

(12) It is preferred that the cumulative addition amount of the alkali with respect to the total cumulative addition amount of the acid group contained in the raw material solution in the above item (6) is set to 0.4 equivalents or more and 1.8 equivalents or less through the first neutralization step.

Advantageous Effects of Invention

By using the production method of the present invention, an iron-based oxide magnetic powder, which has a sufficiently reduced content of fine particles and coarse particles that do not contribute to the improvement of magnetic recording properties, has a particle shape close to a perfect sphere, and is suitable for use in a magnetic recording medium can be obtained.

BRIEF DESCRIPTION OF DRAWINGS

FIG. 1 is a TEM photograph of iron oxyhydroxide crystals containing substituent elements obtained in Example 2.

FIG. 2 is a TEM photograph of an iron-based oxide magnetic powder obtained in Example 2.

FIG. 3 is a TEM photograph of an iron-based oxide magnetic powder obtained in Example 3.

FIG. 4 is a TEM photograph of an iron-based oxide magnetic powder obtained in Example 4.

FIG. 5 is a TEM photograph of an iron-based oxide magnetic powder obtained in Comparative Example 1.

FIG. 6 is a TEM photograph of iron oxyhydroxide crystals containing substituent elements obtained in Comparative Example 2.

FIG. 7 is a TEM photograph of an iron-based oxide magnetic powder obtained in Comparative Example 2.

DESCRIPTION OF EMBODIMENTS

[Iron-Based Oxide Magnetic Powder]

An iron-based oxide magnetic powder obtained according to the present invention is composed of particles of ε-iron oxide or particles of ε-iron oxide in which Fe sites are partially substituted by other metal elements (hereinafter sometimes referred to as substitution-type ε-iron oxide particles). The magnetic powder sometimes contains a different phase (for example, one in which the Fe sites of $\alpha$-$Fe_2O_3$ are partially substituted by other metal elements) that is unavoidable in the production. It is possible to confirm that the magnetic powder is composed of particles of ε-iron oxide in which Fe sites are partially substituted by other metal elements using X-ray diffractometry (XRD), high-energy electron diffractometry (HEED), or the like.

Examples of the substitution-type ε-iron oxide particles that can be produced by the production method of the present invention include the following.

One represented by a general formula: $\varepsilon$-$C_zFe_{2-z}O_3$ (wherein C is one or more types of trivalent metal elements selected from In, Ga, Al, Cr, Nd, Dy, and Gd)

One represented by a general formula: $\varepsilon$-$A_xB_yFe_{2-x-y}O_3$ (wherein A is one or more types of divalent metal elements selected from Co, Ni, Mn, and Zn, and B is one or more types of tetravalent metal elements selected from Ti and Sn)

One represented by a general formula: $\varepsilon$-$A_xC_zFe_{2-x-z}O_3$ (wherein A is one or more types of divalent metal elements selected from Co, Ni, Mn, and Zn, and C is one or more types of trivalent metal elements selected from In, Ga, Al, Cr, Nd, Dy, and Gd)

One represented by a general formula: $\varepsilon$-$B_yC_zFe_{2-y-z}O_3$ (wherein B is one or more types of tetravalent metal elements selected from Ti and Sn, and C is one or more types of trivalent metal elements selected from In, Ga, Al, Cr, Nd, Dy, and Gd)

One represented by a general formula: $\varepsilon$-$A_xB_yC_zFe_{2-x-y-z}O_3$ (wherein A is one or more types of divalent metal elements selected from Co, Ni, Mn, and Zn, B is one or more types of tetravalent metal elements selected from Ti and Sn, and C is one or more types of trivalent metal elements selected from In, Ga, Al, Cr, Nd, Dy, and Gd)

The metal element that partially substitutes the Fe sites is preferably one or more types of Ga, Co, and Ti from the viewpoint of balance between magnetic properties and thermal stability. In addition, as the substituent element, in addition to Ga, Co, and Ti, one or more types of Ni, Mn, Cr, Nd, Dy, and Gd can be used.

[Particle Diameter]

It is preferred that the ε-iron oxide particles or the substitution-type ε-iron oxide particles that constitute the iron-based oxide magnetic powder of the present invention have an average particle diameter measured with a transmission electron microscope (hereinafter sometimes referred to as TEM average particle diameter) of 10 nm or more and 20 nm or less. When the TEM average particle diameter is 20 nm or less, the electromagnetic conversion property when the iron-based oxide magnetic powder is used in a magnetic recording medium can be improved. The TEM average particle diameter is preferably 17 nm or less. When the TEM average particle diameter of the substitution-type ε-iron oxide particles decreases, the abundance ratio of fine particles that do not contribute to the improvement of magnetic properties increases to deteriorate the magnetic properties per unit mass of the magnetic powder, and therefore, the TEM average particle diameter is preferably 10 nm or more. Note that in the present description, the particle diameter measured with a transmission electron microscope refers to a particle diameter of a primary particle of ε-iron oxide in which Fe sites are partially substituted.

The iron-based oxide magnetic powder of the present invention is characterized in that with respect to the ε-iron oxide particles or the substitution-type ε-iron oxide particles, the number ratio of particles with a particle diameter measured with a transmission electron microscope (hereinafter sometimes referred to as TEM particle diameter) of 8 nm or less is 3% or less, and the number ratio of particles with a TEM particle diameter of 20 nm or more is 25% or less.

The n-iron oxide particles or the substitution-type ε-iron oxide particles with a TEM particle diameter of 8 nm or less have a low coercive force, and therefore are particles that do not contribute to magnetic recording even if they are present in a magnetic recording medium, but on the contrary are particles that may lead to an increase in noise components in the electromagnetic conversion property of the magnetic recording medium. Therefore, in the ε-iron oxide particles or the substitution-type ε-iron oxide particles, it is preferred that the number ratio of particles with a TEM particle diameter of 8 nm or less is as small as possible. In the iron-based oxide magnetic powder of the present invention, the number ratio of particles with a TEM particle diameter of 8 nm or less is 3% or less, and therefore, the amount of noise components in the electromagnetic conversion property when the iron-based oxide magnetic powder is used in a magnetic recording medium can be decreased as compared with the case where a conventional iron-based oxide magnetic powder is used.

Further, in the iron-based oxide magnetic powder composed of the ε-iron oxide particles or the substitution-type ε-iron oxide particles having a TEM average particle diameter of 10 nm or more and 20 nm or less, the ε-iron oxide particles or the substitution-type ε-iron oxide particles with a TEM particle diameter of 20 nm or more have a larger coercive force than the particles with an average particle diameter, and therefore, even if such particles are present in a magnetic recording medium, a magnetic record cannot be written by a magnetic head, and therefore, such particles also do not contribute to magnetic recording, and thus are particles that may lead to a decrease in the magnetic recording density of the medium. Therefore, it is preferred that the number ratio of particles with a TEM particle diameter of 20 nm or more is also small. In the iron-based oxide magnetic powder of the present invention, the number ratio of particles with a TEM particle diameter of 20 nm or more is 25% or less, and therefore, the magnetic recording density when the iron-based oxide magnetic powder is used in a magnetic recording medium can be improved as compared with the case where a conventional iron-based oxide magnetic powder is used.

In the iron-based oxide magnetic powder of the present invention, with respect to the ε-iron oxide particles or the substitution-type ε-iron oxide particles that constitute the magnetic powder, the coefficient of variation of the particle diameter is set to 19% or less. Setting the coefficient of variation of the particle diameter to 19% or less works advantageously for the improvement of the electromagnetic conversion property when the iron-based oxide magnetic powder is used in a magnetic recording medium.

[Average Circularity]

In the present invention, the particle shape of the ε-iron oxide particle or the substitution-type ε-iron oxide particle is evaluated based on the average circularity of the particles observed with a transmission electron microscope defined below. The circularity is a concept that evaluates how close the shape of a certain particle is to a perfect sphere, and refers to a numerical value obtained by dividing the product of the projected area of the particle and $4\pi$ by the square of the peripheral length of the projected image of the particle and takes a value from 0 to 1. In the case of a perfect circle, the circularity is 1. The method for measuring the circularity will be described later, but for the substitution-type ε-iron oxide particles, by increasing the number of particles for which the circularity is measured and calculating the average value, the displacement from the perfect sphere of the ε-iron oxide particle or the substitution-type ε-iron oxide particle can be evaluated.

It is preferred that in the ε-iron oxide particles or the substitution-type ε-iron oxide particles that constitute the iron-based oxide magnetic powder of the present invention, the average circularity of particles observed with a transmission electron microscope is 0.955 or more. When the average circularity of the particles is 0.955 or more, the substitution-type ε-iron oxide particles are easily oriented when a magnetic recording medium is produced by orienting the ε-iron oxide particles or the substitution-type ε-iron oxide particles by an external magnetic field, and therefore, as a result, the magnetic recording density of the magnetic recording medium can be improved. The average circularity of particles observed with a transmission electron microscope is more preferably 0.96 or more.

[Method for Producing Iron-Based Oxide Magnetic Powder]

The method for producing an iron-based oxide magnetic powder of the present invention is characterized in that precursor particles that serve as a precursor of the ε-iron oxide particles or the substitution-type ε-iron oxide particles have a larger particle diameter and better dispersibility than precursor particles obtained by a conventional known production method. The present inventors presumed that in the step of producing precursor particles disclosed in PTL 4, very fine precursor particles with a particle diameter of 1 nm or less are produced, and the precursor particles are coated with a silicon compound in a state of being aggregated to a size on the order of several tens of nanometers, and then subjected to a firing step, and as a result, iron-based oxide particles with an average particle diameter of about 10 to 30 nm are formed. In the production method disclosed in PTL 4, it is difficult to arbitrarily control the degree of aggregation of the precursor particles, and it is considered that as a result, only an iron-based oxide magnetic powder with a wide particle diameter distribution is obtained. In the production method of the present invention, by improving the method for producing precursor particles, precursor particles having a large particle diameter and good dispersibility are obtained, and it is considered that by using such a precursor, the production ratio of particles finer than the average particle diameter or coarse iron-based oxide particles is reduced, and the ε-iron oxide particles or the substitution-type ε-iron oxide particles having a particle shape closer to a perfect sphere are obtained.

Further, in the method for producing an iron-based oxide magnetic powder of the present invention, the content of fine particles can be further reduced by classifying the slurry containing the ε-iron oxide particles or the substitution-type ε-iron oxide particles having a particle shape closer to a perfect sphere.

[Starting Material]

In the method for producing an iron-based oxide magnetic powder of the present invention, an acidic aqueous solution (raw material solution) containing trivalent iron ions, or trivalent iron ions and metal ions of a metal element that finally substitutes Fe sites of ε-iron oxide particles is used as a starting material of the iron-based oxide magnetic particle powder. Note that in the description, the "acidic" means that the pH is 7.0 or lower. As the supply source of the iron ions or the metal ions of a substituent element, a water-soluble inorganic acid salt such as a nitrate, a sulfate, or a chloride can be used from the viewpoint of ease of availability and price. In order to finally obtain the ε-iron oxide particles or the substitution-type ε-iron oxide particles, it is preferred to pass through β-FeOOH as a precursor, and a halogen ion is required for obtaining β-FeOOH as the crystal structure of the precursor. Therefore, it is preferred to use iron(III) chloride among the illustrated iron salts.

In the production method of the present invention, in the raw material solution preparation step, the above-mentioned raw material solution and an aqueous solution of an alkali used for neutralizing the raw material solution in the first neutralization step described later are prepared in advance. The alkali for neutralizing the raw material solution may be any of an alkali metal or alkaline earth hydroxide, ammonia water, and an ammonium salt such as ammonium hydrogen carbonate, but it is preferred to use ammonia water or ammonium hydrogen carbonate with which an impurity is less likely to remain when the ε-iron oxide particles or the substitution-type ε-iron oxide particles are finally formed by performing a heat treatment.

[First Neutralization Step]

The most important technical feature in the method for producing an iron-based oxide magnetic powder of the present invention is that in the first neutralization step, each of the raw material solution obtained in the previous step and the alkaline aqueous solution for neutralizing the raw material solution is added to a reaction system. Note that the reaction system will be described later.

In a conventional method for producing an iron-based oxide magnetic powder composed of ε-iron oxide particles or substitution-type ε-iron oxide particles using an aqueous solution system, in general, an alkaline aqueous solution is continuously added to the entire amount of a raw material solution to be used in the reaction. In this case, a time lag occurs until the reaction system after adding the alkaline aqueous solution becomes in a uniformly mixed state, and local fluctuation occurs in the compositional ratio of metal ions and OH$^-$ ions in the reaction system, and therefore, it is presumed that generation frequency and particle diameter of the above-mentioned precursor generated by the neutralization reaction locally vary, and it is difficult to control the degree of aggregation of precursor particles.

On the other hand, in the first neutralization step in the production method of the present invention, the concentrations of the raw material solution and the alkaline aqueous solution to be added, and the addition rate thereof to the reaction system can be arbitrarily changed, and therefore, it becomes possible to more uniformly control the compositional ratio of metal ions and OH$^-$ ions in the reaction system, and precursor particles having a large particle diameter and good dispersibility are obtained, and as a result, an iron-based oxide magnetic powder having a narrow particle diameter distribution is obtained.

In the first neutralization step in the production method of the present invention, the raw material solution obtained in the previous step and the alkaline aqueous solution are continuously or intermittently added to the reaction system and mixed so as to adjust the pH of the reaction system to 1.0 or higher and 3.0 or lower. It is considered that in the aqueous solution obtained by mixing the raw material solution and the alkaline aqueous solution, although the detailed crystal structure is unknown, very fine particles of an oxyhydroxide of the trivalent iron or the substituent metal element, a hydroxide of the trivalent iron or the substituent metal element, or a mixture thereof are generated, and a colloidal solution is formed. In the production method of the present invention, the compositional ratio of metal ions and OH$^-$ ions in the reaction system can be strictly controlled, and therefore, the generation state of such colloidal particles can be controlled to a desired state.

In the present specification, the reaction system refers to a reaction solution in which the raw material solution and the alkaline aqueous solution are mixed and a neutralization reaction occurs.

In a first embodiment of the present invention, the first neutralization step is typically started by simultaneously adding the raw material solution and the alkaline aqueous solution into pure water that is the reaction system which does not contain trivalent iron ions or ions of a metal element that partially substitutes the Fe sites. In this case, the reaction system at the initial stage is pure water, and the reaction system after the start of addition of the raw material solution and the alkaline aqueous solution becomes a reaction solution in which pure water, the raw material solution, and the alkaline aqueous solution are mixed.

In the first embodiment of the production method, the raw material solution and the alkaline aqueous solution may be directly and simultaneously added to an empty reaction vessel for holding the reaction solution. In this case, the reaction system is a mixed solution of the raw material solution and the alkaline aqueous solution.

In a second embodiment of the production method of the present invention, the reaction system at the initial stage is an acidic metal salt solution containing trivalent iron ions, or trivalent iron ions and ions of a metal element that partially substitutes the Fe sites, and the raw material solution and the alkali are simultaneously added into the metal salt solution. Here, the type of the metal salt contained in the metal salt solution may be the same as the mode of the metal salt contained in the above-mentioned raw material solution. In this case, the amount of the metal ions contained in the metal salt solution that is the reaction system at the initial stage is preferably set to 50 mol % or less with respect to the sum of the amount of the metal ions contained in the metal salt solution and the amount of the metal ions contained in the raw material solution added in the first neutralization step.

In the first neutralization step of the first embodiment of the production method of the present invention, the raw material solution and the alkaline aqueous solution containing the alkali in an amount of 0.4 equivalents or more and 0.9 equivalents or less with respect to the total amount of an acid group contained in the raw material solution are added so as to adjust the pH of the reaction system to 1.0 or higher and 3.0 or lower. Note that the acid group refers to Cl$^-$ in the case of a chloride, NO$_3^-$ in the case of a nitrate, and SO$_4^{2-}$ in the case of a sulfate.

In this case, the equivalent can be represented as follows.
[moles of alkali used in neutralization×alkali valence]/[sum of (moles of acid group contained in raw material solution× acid group valence)]

Here, the alkali valence is the number of moles of OH-ions stoichiometrically generated from 1 mol of the alkali, and for example, the alkali valences of NaOH, Ca(OH)$_2$, and NH$_3$ are 1, 2, and 1, respectively. Further, the acid group valence is the valence of an acid group anion, and for example, the acid group valences of a chloride Cl$^-$, a nitrate NO$_3^-$, and a sulfate SO$_4^{2-}$ are 1, 1, and 2, respectively.

When the amount of the alkali to be added is less than 0.4 equivalents, the amount of colloids to be generated by neutralization of the raw material solution becomes small and the effect of the present invention cannot be obtained, and therefore, it is not preferred. When the amount of the alkali to be added exceeds 0.9 equivalents, the dispersibility of the colloidal solution to be obtained deteriorates and the effect of the present invention cannot be obtained, and therefore, it is not preferred. When the pH after neutralization is lower than 1.0, the amount of colloids to be generated by neutralization of the raw material solution becomes small and the effect of the present invention cannot be obtained, and therefore, it is not preferred. When the pH after neutralization exceeds 3.0, the dispersibility of the colloidal solution to be obtained deteriorates and the effect of the present invention cannot be obtained, and therefore, it is also not preferred.

Note that the value of pH described in the present description was measured using a glass electrode according to JIS Z 8802. The pH standard solution refers to a value measured with a pH meter calibrated using a suitable buffer solution corresponding to the pH range to be measured. Further, the pH described in the present description is a value obtained by directly reading a measured value indicated by a pH meter compensated with a temperature compensation electrode under the reaction temperature conditions.

The addition mode of the raw material solution and the alkaline aqueous solution may be continuous or intermittent. Further, the addition rate of each of the raw material solution and the alkaline aqueous solution may be constant or may be changed in the middle of addition. With respect to the timing of addition of the raw material solution and the alkaline aqueous solution, the addition starts at the same time, but with respect to the timing of completion of addition, it does not matter if there is a time when the addition of either of the raw material solution and the alkaline aqueous solution is completed first and only the other is added.

In the first neutralization step of the production method of the present invention, the raw material solution and the alkaline aqueous solution are continuously or intermittently added to the reaction system, and therefore, it is preferred to control the addition rate of each using the concept of "cumulative alkali addition equivalent" which is the equivalent number of cumulative addition amount of the alkali with respect to 1 equivalent of the total cumulative addition amount of the acid group contained in the raw material solution. The cumulative alkali addition equivalent can be represented as follows.

[Cumulative amount of moles of alkali used in neutralization×alkali valence]/[sum of (cumulative amount of moles of acid group contained in raw material solution×acid group valence)]

Here, the cumulative amount of moles of alkali refers to the cumulative amount of the number of moles of the alkali added, and the cumulative amount of moles of acid group refers to the cumulative amount of the number of moles of the acid group added.

In the first neutralization step of the first embodiment of the production method of the present invention, it is preferred to adjust the addition rate of each of the raw material solution and the alkaline aqueous solution so that the cumulative alkali addition equivalent is maintained within a range of 0.4 equivalents or more and 0.9 equivalents or less through the first neutralization step. It is more preferred to set the cumulative alkali addition equivalent to 0.6 equivalents or more and 0.9 equivalents or less through the first neutralization step.

Strictly speaking, if the addition start times of the raw material solution and the alkaline aqueous solution do not exactly match, the cumulative alkali addition equivalent may not become 0.4 equivalents or more and 0.9 equivalents or less at the very early stage of the start of the reaction in some cases, however, in this case, the addition start times of the raw material solution and the alkaline aqueous solution are regarded as completely the same.

By adjusting the cumulative alkali addition equivalent in the first neutralization step to 0.4 equivalents or more through the first neutralization step, an increase in the concentration of free trivalent iron ions in the reaction system can be suppressed, and therefore, the number of generated precursor nuclear particles to be formed when the alkali is added to the reaction system can be reduced. As a result, the particle diameter of the colloid contained in the colloidal solution obtained in the first neutralization step can be made larger than in the case of PTL 4, and the particle diameter of the precursor particles of the ε-iron oxide particles or the substitution-type ε-iron oxide particles obtained in the second neutralization step which is the subsequent step can be made larger. If there is a time when the cumulative alkali addition equivalent is not maintained at 0.4 equivalents or more and becomes less than 0.4 equivalents, the particle diameter of the colloid contained in the colloidal solution obtained in the first neutralization step becomes smaller, and as a result, the effect of the present invention sometimes cannot be obtained.

By adjusting the cumulative alkali addition equivalent in the first neutralization step to 0.9 equivalents or less through the first neutralization step, the pH of the reaction system can be prevented from exceeding 3.0, and the grains of the precursor particles can grow in a dispersed state in the reaction system. As a result, it is possible to obtain precursor particles having good dispersibility (that is, causing less interparticle aggregation) and a narrow particle size distribution in the second neutralization step that is the subsequent step. If there is a time when the cumulative alkali addition equivalent is not maintained at 0.9 equivalents or less and exceeds 0.9 equivalents, the dispersibility of the colloidal solution obtained in the first neutralization step deteriorates (that is, interparticle aggregation increases), and as a result, the effect of the present invention cannot be obtained in some case.

In the first neutralization step of the second embodiment of the production method of the present invention, the raw material solution and the alkaline aqueous solution containing the alkali in an amount of 0.4 equivalents or more and 1.8 equivalents or less with respect to the total amount of the acid group contained in the raw material solution are added so as to adjust the pH of the reaction system to 1.0 or higher and 3.0 or lower. In addition, it is preferred that in the first neutralization step of the second embodiment of the production method of the present invention, the addition rate of each of the raw material solution and the alkaline aqueous solution is adjusted so that the cumulative alkali addition equivalent is maintained within a range of 0.4 equivalents or more and 1.8 equivalents or less and the pH of the reaction system is maintained within a range of 3.0 or lower (preferably 0.0 or higher) through the neutralization step, and the pH at the end of the first neutralization step becomes 1.0 or higher and 3.0 or lower.

The total metal ion concentration in the raw material solution is not particularly specified in the present invention, but it is preferred to adjust the total concentration after alkali addition in the second neutralization step to 0.01 mol/kg or more and 0.5 mol/kg or less. When it is less than 0.01 mol/kg, the amount of the iron-based oxide magnetic powder obtained by one reaction is small, which is economically not preferred. When the total metal ion concentration exceeds 0.5 mol/kg, the reaction solution tends to gel due to the rapid occurrence of precipitation of a hydroxide, and therefore, it is not preferred.

The alkali concentration of the alkaline aqueous solution, in other words, the pH of the alkaline aqueous solution is also appropriately adjusted based on the same idea.

In the first neutralization step of the production method of the present invention, the raw material solution and the alkaline aqueous solution are added to the reaction system over a period of 10 minutes or more and mixed. If the addition time is less than 10 minutes, the nuclear particles of the precursor are generated at a time immediately after the addition, and the ions that should have been used for nuclear growth are also consumed, so that the size of the precursor becomes small, which is not preferred from the viewpoint of obtaining the effect of the present invention.

Further, by extending the addition time, the particle diameter of the colloid obtained in the first neutralization step can be controlled, but if it is extended too much, the productivity deteriorates, and therefore, it is not preferred. Accordingly, the addition time is preferably 10 minutes or more and 480 minutes or less, and more preferably 60 minutes or more and 300 minutes or less.

In the production method of the present invention, the treatment temperature during the first neutralization treatment is not particularly limited, but is preferably set to 20° C. or higher and 60° C. or lower.

[Hydroxycarboxylic Acid Addition Step]

In the production method of the present invention, a hydroxycarboxylic acid is added to the colloidal solution obtained in the first neutralization step described above. The hydroxycarboxylic acid is a carboxylic acid having an OH group in the molecule and acts as a complexing agent for an iron ion. Here, it is considered that the hydroxycarboxylic acid has an effect of forming a complex with a trivalent iron ion dissolved in the reaction solution, and delaying a hydroxide formation reaction of iron when the second neutralization treatment is performed in the subsequent step, resulting in narrowing the distribution of the average particle diameter of the precursor fine particles containing an iron oxyhydroxide to be produced. Note that it is considered that the hydroxycarboxylic acid also forms a partial complex with the metal ion of the substituent element. The type and the addition amount of the hydroxycarboxylic acid may be in accordance with a known technique of PTL 4.

There exist many types of hydroxycarboxylic acids such as glycolic acid, lactic acid, various hydroxybutyric acids, glyceric acid, malic acid, tartaric acid, citric acid, and mevalonic acid, but a polyvalent aliphatic hydroxycarboxylic acid is preferred from the viewpoint of a complexing ability, and tartaric acid, citric acid, or malic acid is more preferred in terms of price and ease of availability.

Further, with respect to the addition amount of the hydroxycarboxylic acid, the addition amount of the hydroxycarboxylic acid is preferably such that the molar ratio thereof with respect to the total amount of the trivalent iron ions and the ions of the substituent metal element M(D/(Fe+M)) is 0.125 or more and 1.0 or less.

The hydroxycarboxylic acid may be added in a mechanically stirred state without particularly changing the reaction temperature in the first neutralization step, which is the previous step. Although it may be added as a solid to the reaction solution, it is preferably added in an aqueous solution state from the viewpoint of ensuring the uniformity of the reaction.

[Second Neutralization Step]

In the production method of the present invention, an alkali is further added to the reaction solution after the addition of the hydroxycarboxylic acid so as to neutralize the pH to 7.0 or higher and 10.0 or lower. As the alkali to be added, the alkaline aqueous solution used in the first neutralization step described above can be used, but a solution in which the alkali concentration is changed may be used. By this step, the nuclei of the iron oxyhydroxide, which is the precursor of the substitution-type ε-iron oxide particles produced in the first neutralization step, grow and final precursor particles can be formed.

In this step, by setting the pH after neutralization to 7.0 or higher and 10.0 or lower, when the trivalent iron and the substituent metal element are neutralized, the iron oxyhydroxide containing the substituent metal element, which is a solid material, can be obtained without leaving dissolved ions of the trivalent iron and the substituent metal element in the reaction solution. If the pH after neutralization is set lower than 7.0, the substituent metal element which is not completely neutralized in the first neutralization step, for example, Co is left as an ion in the liquid to cause composition deviation in the solid material to be collected, and also waste the substituent metal element, and therefore, it is not preferred also from the viewpoint of production cost. Further, when the pH after neutralization exceeds 10.0, the effect of neutralization is saturated, and when, for example, an amphoteric metal such as Al is used as the substituent metal element, there arise problems that an ion is left in the liquid, the composition deviates, and the substituent metal element is wasted in the same manner as in the case where the pH is lower than 7.0, and therefore, it is not preferred.

The particles of the iron oxyhydroxide or the particles of the substituent metal element-containing iron oxyhydroxide (precursor particles) contained in the slurry obtained in this step have an average diameter measured with a dynamic light scattering particle size distribution analyzer (hereinafter sometimes referred to as a DLS average diameter) of preferably 300 nm or less, more preferably 100 nm or less, and further more preferably 70 nm or less. The small DLS average diameter in this manner means that the dispersibility of the precursor particles is good and the degree of aggregation is low, and is advantageous to the ε-iron oxide particles or the substitution-type ε-iron oxide particles that constitute the iron-based oxide magnetic powder to be finally obtained for reducing the number ratio of coarse particles with a particle diameter of 20 nm or more or the like. The lower limit of the DLS average diameter of the slurry containing the precursor particles is not particularly limited, but one having a diameter of about 20 nm or more is obtained by the production method of the present invention.

[Water Washing Step]

In the production method of the present invention, the iron oxyhydroxide as the precursor produced in the steps up to this point is small also in terms of DLS average diameter and has high dispersibility. However, the ionic strength in the solution increases as it goes through the hydroxycarboxylic acid addition step and the neutralization step in the steps up to the previous stage. If the ionic strength remains high, it will become an aggregation system in the subsequent coating step with silicon oxide, and therefore, it is not preferred. Therefore, it is preferred to wash the slurry obtained in the above step with water to reduce the ionic strength in the solution and bring it in a dispersed state. The water washing method is not particularly specified, but a method of performing a water washing treatment in a slurry state as such is preferred in consideration of maintenance of particle dispersibility in this step, washing uniformity, connection with the steps before and after this step, handleability, and the like. When considering this, water washing using an ultrafiltration membrane or an ion exchange membrane is preferred. In the case of washing using an ultrafiltration membrane, as the membrane, one having a molecular weight cut-off through which particles do not pass to the filtrate side is used, and with respect to completion of the washing, it is preferred to perform the washing until the electrical conductivity of the filtrate becomes 200 mS/m or less, more preferably 100 mS/m or less, and further more preferably 30 mS/m or less. When there are many residual ions, the melting point of silicon oxide is locally lowered in the subsequent heating step, and therefore, there is a problem that coarse particles are easily generated by sintering when obtaining ε-iron oxide.

[Coating Step with Silicon Oxide]

In the production method of the present invention, the precursor particles formed in the steps up to this point hardly undergo phase transition to the substitution-type ε-iron oxide particles even if the particles are subjected to a heat treatment as they are, and therefore, prior to the heat treatment, a silicon oxide coating is applied to the precursor particles. As a coating method with silicon oxide, it is preferred to apply a sol-gel method. Note that the silicon oxide here includes not only one having a stoichiometric composition, but also one having a nonstoichiometric composition such as the below-mentioned silanol derivative or the like.

In the case of the sol-gel method, to an aqueous solution of iron oxyhydroxide crystals or iron oxyhydroxide crystals containing a substituent element dispersed after the precursor reaction, a silicon compound having a hydrolyzable group, for example, a silane compound such as tetraethoxysilane (TEOS), tetramethoxysilane (TMOS), or any of various types of silane coupling agents is added to cause a hydrolysis reaction under stirring, and the surface of the iron oxyhydroxide crystal is coated with the generated silanol derivative. Further, an acid catalyst or an alkali catalyst may be added thereto. It is preferred to add it when considering the treatment time. Representative examples thereof include hydrochloric acid as the acid catalyst and ammonia as the alkali catalyst. When the acid catalyst is used, it is necessary to limit the addition of the acid catalyst to such an amount that the iron oxyhydroxide particles or the iron oxyhydroxide particles containing a substituent element are not dissolved.

Note that as a specific method for coating with silicon oxide, the same method as the sol-gel method in a known process can be adopted. For example, the reaction temperature for the silicon oxide coating in the sol-gel method is 20° C. or higher and 60° C. or lower, and the reaction time is about 1 hour or more and 20 hours or less. After the coating treatment with silicon oxide, solid-liquid separation and a drying treatment are performed to prepare a sample before the heating step. Here, after the coating treatment, water washing may be performed before solid-liquid separation. Further, here, at the time of solid-liquid separation, a flocculation agent may be added to perform the solid-liquid separation.

[Heating Step]

In the production method of the present invention, the ε-iron oxide particles or the substitution-type ε-iron oxide particles are obtained by subjecting the precursor particles coated with silicon oxide to a heating treatment. Prior to the heating treatment, washing and drying steps may be provided. The heating treatment is performed in an oxidative atmosphere, and the oxidative atmosphere may be an air atmosphere. The heating treatment temperature varies depending on the coating amount of silicon oxide and therefore cannot be generalized, but the heating can be generally performed within a range of 700° C. or higher and 1300° C. or lower. When the heating temperature is too low, a different phase or a compound whose phase transition is not sufficient is likely to be mixed. When the lower limit of the heating temperature is set to 700° C. or higher, the substitution-type ε-iron oxide particles that are the target of the present invention can be selectively and stably obtained, and as a result, the generation of a different phase or a compound whose phase transition is not sufficient can be suppressed. When the heating temperature is high, $\alpha\text{-Fe}_2\text{O}_3$ that is a thermodynamically stable phase or partially substituted $\alpha\text{-Fe}_2\text{O}_3$ is likely to be generated, and therefore, the heating treatment is performed preferably at 900° C. or higher and 1200° C. or lower, and more preferably at 950° C. or higher and 1150° C. or lower. The heating treatment time can be adjusted within a range of about 0.5 hours or more and 10 hours or less, but favorable results are easily obtained within a range of 2 hours or more and 5 hours or less.

[Silicon Oxide Coating Removal Step]

By the above steps, the ε-iron oxide particles or the substitution-type ε-iron oxide particles coated with silicon oxide are obtained, but in the production method of the present invention, prior to the below-mentioned classification treatment, the silicon oxide coating is dissolved and removed.

As a specific method, since silicon oxide is soluble in an alkaline aqueous solution, silicon oxide can be dissolved and removed by immersing the ε-iron oxide particles or the substitution-type ε-iron oxide particles coated with silicon oxide after the heating treatment in an aqueous solution in which a strong alkali such as NaOH or KOH is dissolved and stirring the aqueous solution. When the dissolution rate is increased, the alkali aqueous solution may be heated. Representatively, when an alkali such as NaOH is added in an amount not less than 3 molar times the amount of silicon oxide, and the slurry containing the powder is stirred in a state where the temperature of the aqueous solution is 60° C. or higher and 70° C. or lower, silicon oxide can be favorably dissolved.

[Iron Oxide Particle-Containing Slurry]

In the production method of the present invention, the ε-iron oxide particles or the substitution-type ε-iron oxide particles obtained by the silicon oxide coating removal step described above are dispersed in water to form a slurry. In this case, it is preferred to perform washing using pure water until the electrical conductivity of the solvent becomes 15 mS/m or less from the viewpoint of suppression of aggregation of the iron oxide particles and reduction of impurities. Thereafter, the pH of the slurry is adjusted to 11.0 or higher and 14.0 or lower by adding a quaternary ammonium salt to the slurry. By adding a quaternary ammonium salt to the slurry to adjust the pH of the slurry to 11.0 or higher and 14.0 or lower, excellent dispersibility of the substitution-type ε-iron oxide particles in the slurry is ensured. When the pH of the slurry is lower than 11.0, the dispersibility of the ε-iron oxide particles or the substitution-type ε-iron oxide particles deteriorates, and also when the pH of the slurry exceeds 14.0, the effect of improving the dispersibility is saturated and the chemical cost of the alkali increases, and therefore, each case is not preferred. Note that as will be described later, when a hydroxide of a tetraalkylammonium salt is used as the quaternary ammonium salt, the pH of the slurry falls within the above-mentioned range without adding another alkali.

[Quaternary Ammonium Ion]

The quaternary ammonium ion is a cation resulting from substitution of all four hydrogen atoms of an ammonium ion ($NH_4^+$) by an organic group, and as the substituent, an alkyl group or an aryl group is generally used. In the production method of the present invention, as a surface modifier for the ε-iron oxide particles or the substitution-type ε-iron oxide particles, a quaternary ammonium ion that is stable in a strong alkaline region in which the dispersibility of the iron oxide particles is good is used. Among the quaternary ammonium ions, it is preferred to use a tetraalkylammonium ion that is industrially easily available. The tetraalkylammonium ion is a quaternary ammonium cation and is a polyatomic ion whose molecular formula is represented by $NR_4^+$ (R is an arbitrary alkyl group). The tetraalkylammonium salt is a completely dissociated salt and is present as an ion stable in an alkaline aqueous solution, and therefore is used as a surface modifier for improving the dispersibility of the substitution-type ε-iron oxide particles in the slurry in the production method of the present invention. Examples of a supply source of the tetraalkylammonium ion include a hydroxide, a chloride, and a bromide, but a hydroxide of the tetraalkylammonium ion is a strong alkali by itself, and therefore, when it is added to the slurry, the pH of the slurry falls within the above-mentioned preferred pH range without adding another alkali, and thus, it is more preferred to use tetraalkylammonium hydroxide as the surface modifier.

As the supply source of the tetraalkylammonium ion, a chloride or a bromide of a tetraalkylammonium ion can also be used, but in this case, an increase in pH is suppressed when such a salt is added to the slurry, and an additional alkali is needed for adjusting the pH, so that the ion strength of the system increases, and therefore, the dispersibility of the substitution-type ε-iron oxide particles is slightly inferior to the case where a hydroxide is used.

Examples of the tetraalkylammonium salt include quaternary ammonium salts having the same alkyl group such as a tetramethylammonium salt, a tetrapropylammonium salt, and a tetrabutylammonium salt, and quaternary ammonium salts having different alkyl groups, and any of them can be used, but it is preferred to use a hydroxide such as tetramethylammonium hydroxide, tetrapropylammonium hydroxide, and tetrabutylammonium hydroxide, respectively.

The concentration of the tetraalkylammonium ion is set to 0.009 mol/kg or more and 1.0 mol/kg or less in order to modify the surfaces of the ε-iron oxide particles or the substitution-type ε-iron oxide particles in the slurry and enhance the dispersibility thereof. In either case where the concentration is less than 0.009 mol/kg or more than 1.0 mol/kg, the effect of improving the dispersibility is not sufficient, and one having a CV value of 19% or less cannot be obtained after classification.

[Classification Treatment]

In the production method of the present invention, the surface modifier-containing slurry obtained by adding the surface modifier is subjected to a dispersion treatment, whereby an iron oxide particle dispersion slurry is obtained. Here, the dispersion treatment is a treatment of loosening the aggregation of aggregates of the ε-iron oxide particles or the substitution-type ε-iron oxide particles contained in the surface modifier-containing slurry. As the dispersion treatment method, a known method such as dispersion with an ultrasonic disperser, pulverization using a medium such as a bead mill, or stirring with a stirring blade, a shaking machine, or a shaker can be adopted.

The dispersion treatment of the surface modifier-containing slurry is preferably performed until the average secondary particle diameter (DLS particle diameter) of the iron oxide particles measured with a dynamic light scattering particle size distribution analyzer becomes 65 nm or less. In a state where the DLS particle diameter exceeds 65 nm, when the particle diameter is small, such as a TEM average particle diameter of 20 nm or less, one having a CV value of 19% or less cannot be obtained, and therefore, such a state is not preferred.

[Classification Operation]

In the production method of the present invention, the surface modifier-containing slurry obtained by adding the surface modifier is subjected to the dispersion treatment, and the ε-iron oxide particle or substitution-type ε-iron oxide particle dispersion slurry is subjected to a classification operation. As the classification operation, a known wet classification method such as a centrifugation method can be adopted. Fine particles can be removed by removing the supernatant after the slurry is subjected to a centrifuge, and coarse particles can be removed by removing the precipitate after the slurry is subjected to a centrifuge. The gravitational acceleration during centrifugation is preferably 40,000 G or more. Further, it is preferred to repeat the classification operation three or more times. After the classification operation, the magnetic powder composed of the ε-iron oxide particles or the substitution-type ε-iron oxide particles is collected using a known solid-liquid separation method, and washed with water as needed, and then dried.

[Transmission Electron Microscope (TEM) Observation]

TEM observation of the magnetic powder composed of the substitution-type ε-iron oxide obtained by the production method of the present invention was performed under the following conditions. In the TEM observation, JEM-1011 manufactured by JEOL Ltd. was used. For particle observation, TEM photographs taken at a magnification of 10,000 times and a magnification of 100,000 times were used (those after removing the silicon oxide coating were used).

—Measurement of Average Particle Diameter, Particle Size Distribution, and Circularity—

Digitization was used in the evaluation of the TEM average particle diameter, particle size distribution, and circularity. Mac-View Ver. 4.0 was used as the image processing software. When the image processing software is used, the particle diameter of a certain particle is calculated as the length of the long side of a rectangle having the smallest area among the rectangles circumscribing the particle. Further, the circularity of a certain particle is calculated as a value obtained by dividing the product of the area of the particle and $4\pi$ by the square of the peripheral length of the particle. As for the number of particles, 200 or more particles were measured.

The selection criteria for the particles to be measured among the particles shown in the transmission electron micrograph were as follows.

[1] A particle that is partially outside the visual field of the micrograph is not measured.

[2] A particle with a well-defined contour and existing independently is measured.

[3] Even if the particle shape deviates from the average particle shape, a particle that is independent and can be measured as a single particle is measured.

[4] Particles that overlap each other, but the boundaries between the particles are clear, and also the shape of the entire particle can be determined are each measured as a single particle.

[5] Overlapping particles whose boundaries are not clear and also whose overall shape is unknown are regarded as particles whose shape cannot be determined and are not measured.

The number average particle diameter of the particles selected based on the above criteria was calculated and defined as the average particle diameter by TEM observation of the iron oxide magnetic powder. Further, a value obtained by dividing the "standard deviation of the particle diameter of the selected particle" by the "number average particle diameter (=average particle diameter) of the selected particles" was calculated and defined as the coefficient of variation of the particle diameter by TEM observation of the iron oxide magnetic powder. In addition, the number average circularity of the selected particles was calculated and defined as the average circularity by TEM observation of the iron oxide magnetic powder.

[DLS Average Diameter]

The DLS particle diameter by a dynamic light scattering particle size distribution analysis of the slurry containing the iron oxyhydroxide or the substituent metal element-containing iron oxyhydroxide obtained by the production method of the present invention, and the iron oxide particle dispersion slurry after the dispersion treatment was measured under the following conditions.

As the dynamic light scattering particle size distribution analyzer, (FPAR-1000K high sensitivity specification) manufactured by Otsuka Electronics Co., Ltd. was used, and as a fiber probe, a dilution-type probe was used. The measurement was performed under the following measurement conditions: a measurement time: 180 seconds, the number of repetitions: 1, and solvent setting: water. As the analysis mode, the Cumulant method was used.

[Compositional Analysis by High-Frequency Inductively Coupled Plasma Atomic Emission Spectroscopy (ICP)]

The compositional analysis of the obtained magnetic powder composed of the substitution-type ε-iron oxide particles was performed. In the compositional analysis, ICP-720ES manufactured by Agilent Technologies, Inc. was used, and the analysis was performed by setting the measurement wavelength (nm) as follows: Fe: 259.940 nm, Ga: 294.363 nm, Co: 230.786 nm, Ti: 336.122 nm, Ni: 231.604 nm, and Cr: 267.716 nm. As the measurement wavelength of each metal element, a wavelength at which the linearity of the calibration curve can be obtained without interference with the spectra of other elements is selected according to the composition of the iron-based oxide magnetic powder to be analyzed.

[Measurement of Magnetic Hysteresis Curve (B-H Curve)]

The magnetic properties of the obtained magnetic powder composed of the substitution-type ε-iron oxide particles were measured under the following conditions.

In the case of the iron-based oxide magnetic powder composed of the substitution-type ε-iron oxide particles, as a magnetic property measuring device, a vibrating sample magnetometer (VSM) (VSM-5, manufactured by Toei Industry Co., Ltd.) was used, and magnetic properties were measured at an applied magnetic field of 1035 kA/m (13 kOe), an M measurement range of 0.005 A·m² (5 emu), an applied magnetic field change rate of 15 (kA/ms), a time constant of 0.03 sec, and a wait time of 0.1 sec. Evaluation was performed for the coercive force Hc, saturation magnetization σs, SFD, and square ratio SQ based on a B-H curve, and also evaluation for a low Hc component that does not contribute to magnetic recording was performed based on a differential B-H curve. Further, in this case, the intercept of the vertical axis in the 0 magnetic field of the differential B-H curve was represented $I_L$, and the peak height on the high Hc side was represented $I_H$. Note that the SFD refers to a value obtained by dividing the half width of the peak on the high Hc side by the coercive force Hc. In addition, in the measurement and evaluation, the attached software (Ver. 2.1) manufactured by Toei Industry Co., Ltd. was used. Further, the square ratio SQ is one for the entire B-H curve. When the value of the differential B-H curve at the maximum magnetic field was represented by $I_{Hmax}$, in the case where $I_{Hmax}/I_H$ was 0.2 or less, the above measurement results were used. When $I_{Hmax}/I_H$ exceeded 0.2, remeasurement was performed according to the following procedure.

As a result of measurement at an applied magnetic field of 1035 kA/m (13 kOe), when $I_{Hmax}/I_H$ exceeded 0.2, a high temperature superconducting type VSM (VSM-5HSC, manufactured by Toei Industry Co., Ltd.) was used, and magnetic properties were measured at an applied magnetic field Hmax of 2387 kA/m (30 kOe), an M measurement range of 0.005 A·m² (5 emu), an applied magnetic field change rate of 30 kA/(m·s), a time constant of 0.03 sec, and a wait time of 0.1 sec. As a result, when $I_{Hmax}/I_H$ was 0.2 or less, the above measurement results were used, and when $I_{Hmax}/I_H$ exceeded 0.2, remeasurement was performed according to the following procedure.

As a result of measurement at an applied magnetic field of 1035 kA/m (13 kOe) and 2387 kA/m (30 kOe), when $I_{Hmax}/I_H$ exceeded 0.2, a high temperature superconducting type VSM (VSM-5HSC, manufactured by Toei Industry Co., Ltd.) was used, and magnetic properties were measured at an applied magnetic field Hmax of 3979 kA/m (50 kOe), an M measurement range of 0.005 A·m² (5 emu), an applied magnetic field change rate of 30 kA/(m·s), a time constant of 0.03 sec, and a wait time of 0.1 sec. As a result, it was confirmed that $I_{Hmax}/I_H$ is 0.2 or less, and therefore, the measurement results were used.

EXAMPLES

Example 1

As an iron raw material containing chloride ions, 349.8 g of ferric(III) chloride hexahydrate with a purity of 99 mass %, as raw materials of substituent elements, 84.1 g of a gallium(III) nitrate solution with a Ga concentration of 10.9 mass % and a nitrate concentration of 33 mass %, 15.8 g of cobalt(II) nitrate hexahydrate with a purity of 97 mass %, and 10.9 g of a titanium(IV) chloride solution with a Ti concentration of 16.5 mass % and a chloride ion concentration of 31 mass %, and 468.9 g of pure water were mixed, whereby a raw material aqueous solution was prepared. The molar ratio of metal ions in the raw material aqueous solution is as follows: Fe:Ga:Co:Ti=1.705:0.175:0.070:0.050. Subsequently, in a 5 L reaction vessel, 1500 g of pure water was placed, and the liquid temperature was adjusted to 40° C. while mechanically stirring with a stirring blade. Subsequently, while continuing stirring and keeping the liquid temperature at 40° C., the raw material aqueous solution and a 6.2% ammonia aqueous solution (as an alkali) were simultaneously added into the pure water, and thereafter, stirring was performed for 60 minutes while keeping the liquid temperature at 40° C., whereby a colloidal solution was obtained (procedure 1, first neutralization step). Here, the raw material aqueous solution was continuously added over 240 minutes at an addition rate of 3.87 g/min, and the ammonia aqueous solution was continuously added over 240 minutes at an addition rate of 3.87 g/min. While adding the raw material aqueous solution and the ammonia aqueous solution, the ratio of the cumulative addition amount of the alkali to the total cumulative addition amount of the acid group contained in the raw material solution was 0.75 equivalents. The pH of the obtained colloidal solution was 1.68.

Subsequently, to the colloidal solution obtained by the procedure 1, 288.8 g of a citric acid solution with a citric acid concentration of 20 mass % as a hydroxycarboxylic acid was continuously added over 60 minutes under the condition of 40° C. (hydroxycarboxylic acid addition step), and thereafter, 186.6 g of a 22.14% ammonia solution was added thereto all at once, and then, the resulting mixture was held for 10 minutes while stirring under the condition of temperature of 40° C., whereby a slurry of a precursor, which is an intermediate product, was obtained (procedure 2, second neutralization step). The pH after adding 186.6 g of the ammonia solution all at once was 8.5.

The precursor slurry obtained by the procedure 2 was collected and washed with an ultrafiltration membrane and a membrane having a UF molecular weight cut-off of 50,000 until the electrical conductivity of the filtrate became 30 mS/m or less (procedure 3).

When the DLS average diameter of the precursor particles contained in the washed slurry obtained by the procedure 3 was measured, the DLS average diameter thereof was 36.2 nm.

Subsequently, 935.7 g of the washed slurry obtained by the procedure 3 was taken out, and pure water was added thereto to give a total amount of 1100 g. The temperature was adjusted to 40° C. while stirring, and 1288.4 g of ethanol was added thereto, followed by stirring for 5 minutes, and thereafter, 283.6 g of a 22.14 mass % ammonia aqueous solution was added thereto. Further, 1130.3 g of tetraethoxysilane (TEOS) as a silicon compound having a hydrolyzable group was added thereto over 35 minutes. Thereafter, while keeping the liquid temperature at 40° C., stirring was continued as such for 1 hour to carry out coating with a hydrolysate of the silicon compound. Thereafter, the obtained solution was washed and subjected to solid-liquid separation, and the product was collected as a cake (procedure 4).

After the cake (the precursor coated with the hydrolysate in a gel form) obtained by the procedure 4 was dried, the resulting dry powder was subjected to a heat treatment at 1130° C. for 4 hours in a furnace with an air atmosphere, whereby a powder of iron oxide containing substituent metal elements and coated with silicon oxide was obtained. Note that the hydrolysate of the silicon compound turns into an oxide when it is subjected to a heat treatment in an air atmosphere (procedure 5).

The powder of iron oxide containing substituent metal elements and coated with silicon oxide obtained by the procedure 5 was placed in a 20 mass % NaOH aqueous solution with a liquid temperature of 60° C. and stirred for 24 hours so as to carry out a treatment of removing the silicon oxide on the surfaces of the particles, whereby a slurry containing particles of ε-iron oxide in which Fe sites were partially substituted by other metal elements was obtained (procedure 6).

The slurry obtained by the procedure 6 was washed until the electrical conductivity became 15 mS/m or less.

Subsequently, to the washed slurry, a 25 mass % tetramethylammonium hydroxide (hereinafter referred to as TMAOH) aqueous solution was added as a surface modifier, whereby a surface modifier-containing slurry with a solid content of 4.1% was obtained. Here, the addition amount of the TMAOH aqueous solution was set so that the TMAOH concentration in the surface modifier-containing slurry became 0.065 mol/kg. In this case, the pH of the slurry became 13.

40 g of the obtained surface modifier-containing slurry was subjected to an ultrasonic dispersion treatment for 1 hour with an ultrasonic cleaner (Yamato 5510 Branson, manufactured by (Yamato Scientific) Co., Ltd.), and then subjected to a centrifugation treatment at a rotation speed of 14,000 rpm for 30 minutes with an R20A2 rotor of a centrifuge (himac CR21GII, manufactured by Hitachi Koki Co., Ltd.), and 30 g of a supernatant slurry was collected. The gravitational acceleration in the centrifugation treatment was set to 24,000 G. For a slurry on the precipitate side, the operation of addition of 30 g of a 0.065 mol/kg TMAOH aqueous solution, ultrasonic dispersion, a centrifugation treatment at 14,000 rpm and 24,000 G for 30 minutes, and collection of 30 g of a supernatant slurry was repeated further 9 times, whereby a total of 300 g of the supernatant slurry was collected. After 300 g of the collected supernatant slurry was mixed, 40 g thereof was taken out.

40 g of the taken out supernatant slurry was subjected to a centrifugation treatment at a rotation speed of 18,000 rpm for 30 minutes with an R20A2 rotor of a centrifuge (himac CR21GII, manufactured by Hitachi Kaki Co., Ltd.), and 30 g of a supernatant slurry containing fine particles was removed and a slurry on the precipitate side was obtained. The gravitational acceleration in the centrifugation treatment was set to 39,000 G. To a slurry on the precipitate side obtained by repeating the operation of addition of 30 g of a 0.065 mol/kg TMAOH aqueous solution, ultrasonic dispersion, a centrifugation treatment at 18,000 rpm and 39,000 G for 30 minutes, and removal of 30 g of a supernatant slurry further 9 times for the obtained slurry on the precipitate side, a 1 mass % sulfuric acid aqueous solution was added to adjust the pH to 6.5 and aggregate substitution-type ε-iron oxide particles, followed by filtration through a membrane filter, and the solid was collected and then dried, whereby an iron-based oxide magnetic powder according to Example 1 was obtained.

The obtained iron-based oxide magnetic powder had a coercive force of 314 (kA/m), a saturation magnetization of 16.6 ($Am^2/kg$), a square ratio of 0.637, an SFD of 0.71, and an $I_L/I_H$ value of 0.14. Further, the obtained iron-based oxide magnetic powder was dispersed in pure water using an ultrasonic disperser to prepare a slurry, and the prepared slurry was dropped onto a collodion film on a grid and adhered thereto, and then, naturally dried. Thereafter, carbon vapor deposition was performed, and the resultant was subjected to TEM observation. As a result of measuring 200 particles by TEM observation, the TEM average particle diameter was 16.0 nm, the number ratio of particles with a particle diameter of 8 nm or less was 0.0%, the number ratio of particles with a particle diameter of 20 nm or more was 1.3%, the coefficient of variation (CV value) was 12%, and the average circularity of the particles was 0.974. In addition, evaluation of compositional analysis was performed, and the molar compositional ratio of each metal element was calculated when the total amount of iron and the substituent metal elements was set to 2 mol. The above production conditions are shown in Tables 1 and 2, and the measurement results for the obtained iron-based oxide magnetic powder are shown in Tables 3 and 4 (the same applies to the following Examples and Comparative Examples).

Example 2

As an iron raw material containing chloride ions, 350.8 g of ferric(III) chloride hexahydrate with a purity of 99 mass %, as raw materials of substituent elements, 95.3 g of a gallium(III) nitrate solution with a Ga concentration of 11.0 mass % and a nitrate concentration of 33 mass, 10.1 g of cobalt(II) nitrate hexahydrate with a purity of 97 mass, and 9.8 g of a titanium(IV) chloride solution with a Ti concentration of 16.5 mass % and a chloride ion concentration of 31 mass %, and 474.5 g of pure water were mixed, whereby a raw material aqueous solution was prepared. The molar ratio of metal ions in the raw material aqueous solution is as follows: Fe:Ga:Co:Ti=1.710:0.200:0.045:0.045. Subsequently, in a 5 L reaction vessel, 1500 g of pure water was placed, and the liquid temperature was adjusted to 40° C. while mechanically stirring with a stirring blade. Subsequently, while continuing stirring and keeping the liquid temperature at 40° C., the raw material aqueous solution and a 6.5% ammonia aqueous solution (as an alkali) were simultaneously added into the pure water, and thereafter, stirring was performed for 60 minutes while keeping the liquid temperature at 40° C., whereby a colloidal solution was obtained (procedure 1, first neutralization step). Here, the raw material aqueous solution was continuously added over 240 minutes at an addition rate of 3.92 g/min, and the ammonia aqueous solution was continuously added over 240 minutes at an addition rate of 3.92 g/min. While adding the raw material aqueous solution and the ammonia aqueous solution, the ratio of the cumulative addition amount of the alkali to the total cumulative addition amount of the acid group contained in the raw material solution was 0.80 equivalents. The pH of the obtained colloidal solution was 1.85.

Subsequently, to the colloidal solution obtained by the procedure 1, 288.8 g of a citric acid solution with a citric acid concentration of 20 mass % as a hydroxycarboxylic acid was continuously added over 60 minutes under the condition of 40° C. (hydroxycarboxylic acid addition step), and thereafter, 189.8 g of a 21.87% ammonia solution was added thereto all at once, and then, the resulting mixture was held for 10 minutes while stirring under the condition of temperature of 40° C., whereby a slurry of a precursor, which is an intermediate product, was obtained (procedure 2, second neutralization step). The pH after adding 189.8 g of the ammonia solution all at once was 8.62.

The precursor slurry obtained by the procedure 2 was collected and washed with an ultrafiltration membrane and a membrane having a UF molecular weight cut-off of 50,000 until the electrical conductivity of the filtrate became 30 mS/m or less (procedure 3).

The washed slurry obtained by the procedure 3 was dropped onto a collodion film on a grid and adhered thereto, and then, naturally dried. Thereafter, carbon vapor deposition was performed, and the resultant was subjected to TEM observation. In FIG. 1, a TEM photograph of the precursor particles (the particles of the substituent element-containing iron oxyhydroxide) obtained in this Example is shown. Note that the length indicated by the white horizontal line displayed in the lower right of the TEM photograph is 100 nm. In addition, when the DLS average diameter of the precursor particles contained in the washed slurry obtained by the procedure 3 was measured, the DLS average diameter thereof was 48.4 nm.

Subsequently, 704.7 g of the washed slurry obtained by the procedure 3 was taken out, and pure water was added thereto to give a total amount of 807 g. The temperature was adjusted to 40° C. while stirring, and 945.2 g of 2-propanol was added thereto, followed by stirring for 5 minutes, and thereafter, 207.0 g of a 22.3 mass % ammonia aqueous solution was added thereto. Further, 829.2 g of tetraethoxysilane (TEAS) as a silicon compound having a hydrolyzable group was added thereto over 35 minutes. Thereafter, while keeping the liquid temperature at 40° C., stirring was continued as such for 1 hour to carry out coating with a hydrolysate of the silicon compound. Thereafter, the obtained solution was washed and subjected to solid-liquid separation, and the product was collected as a cake (procedure 4).

After the cake (the precursor coated with the hydrolysate in a gel form) obtained by the procedure 4 was dried, the resulting dry powder was subjected to a heat treatment at 1050° C. for 4 hours in a furnace with an air atmosphere, whereby a powder of iron oxide containing substituent metal elements and coated with silicon oxide was obtained. Note that the hydrolysate of the silicon compound turns into an oxide when it is subjected to a heat treatment in an air atmosphere (procedure 5).

The powder of iron oxide containing substituent metal elements and coated with silicon oxide obtained by the procedure 5 was placed in a 20 mass % NaOH aqueous solution with a liquid temperature of 60° C. and stirred for 24 hours so as to carry out a treatment of removing the silicon oxide on the surfaces of the particles, whereby a slurry containing particles of ε-iron oxide in which Fe sites were partially substituted by other metal elements was obtained (procedure 6).

The slurry obtained by the procedure 6 was washed until the electrical conductivity became 15 mS/m or less.

Subsequently, to the washed slurry, a 25 mass % TMAOH aqueous solution was added as a surface modifier, whereby a surface modifier-containing slurry with a solid content of 5.9% was obtained. Here, the addition amount of the TMAOH aqueous solution was set so that the TMAOH concentration in the surface modifier-containing slurry became 0.065 mol/kg. In this case, the pH of the slurry became 13.

40 g of the obtained surface modifier-containing slurry was subjected to an ultrasonic dispersion treatment for 1 hour with an ultrasonic cleaner (Yamato 5510 Branson, manufactured by (Yamato Scientific) Co., Ltd.), and then subjected to a centrifugation treatment at a rotation speed of 16,000 rpm for 30 minutes with an R20A2 rotor of a centrifuge (himac CR21GII, manufactured by Hitachi Koki Co., Ltd.), and 30 g of a supernatant slurry was collected. The gravitational acceleration in the centrifugation treatment was set to 31,000 G. For a slurry on the precipitate side, the operation of addition of 30 g of a 0.065 mol/kg TMAOH aqueous solution, ultrasonic dispersion, a centrifugation treatment at 16,000 rpm and 31,000 G for 30 minutes, and collection of 30 g of a supernatant slurry was repeated further 9 times, whereby a total of 300 g of the supernatant slurry was collected. After 300 g of the collected supernatant slurry was mixed, 40 g thereof was taken out.

40 g of the taken out supernatant slurry was subjected to a centrifugation treatment at a rotation speed of 18,000 rpm for 30 minutes with an R20A2 rotor of a centrifuge (himac CR21GII, manufactured by Hitachi Koki Co., Ltd.), and 30 g of a supernatant slurry containing fine particles was removed and a slurry on the precipitate side was obtained. The gravitational acceleration in the centrifugation treatment was set to 39,000 G. To a slurry on the precipitate side obtained by repeating the operation of addition of 30 g of a 0.065 mol/kg TMAOH aqueous solution, ultrasonic dispersion, a centrifugation treatment at 18,000 rpm and 39,000 G for 30 minutes, and removal of 30 g of a supernatant slurry further 9 times for the obtained slurry on the precipitate side, a 1 mass % sulfuric acid aqueous solution was added to adjust the pH to 6.5 and aggregate substitution-type ε-iron oxide particles, followed by filtration through a membrane filter, and the solid was collected and then dried, whereby an iron-based oxide magnetic powder according to Example 2 was obtained.

The obtained iron-based oxide magnetic powder had a coercive force of 317 (kA/m), a saturation magnetization of 14.7 ($Am^2$/kg), a square ratio of 0.590, an SFD of 1.43, and an $I_L/I_H$ value of 0.56. Further, as a result of subjecting the obtained iron-based oxide magnetic powder to TEM observation by the same procedure as in Example 1, the TEM average particle diameter was 14.2 nm, the number ratio of particles with a particle diameter of 8 nm or less was 0.5%, the number ratio of particles with a particle diameter of 20 nm or more was 7.2%, the coefficient of variation (CV value) was 19%, and the average circularity of the particles was 0.960. In FIG. 2, a TEM photograph of the iron-based oxide magnetic powder obtained in this Example is shown. Note that the length indicated by the white horizontal line displayed in the lower right of the TEM photograph is 100 nm. In addition, evaluation of compositional analysis was performed, and the molar compositional ratio of each metal element was calculated when the total amount of iron and the substituent metal elements was set to 2 mol.

Example 3

As an iron raw material containing chloride ions, 414.1 g of ferric(III) chloride hexahydrate with a purity of 99 mass %, as raw materials of substituent elements, 39.7 g of a gallium(III) nitrate solution with a Ga concentration of 10.9 mass % and a nitrate concentration of 31 mass %, 11.2 g of cobalt(II) nitrate hexahydrate with a purity of 97 mass %, and 10.8 g of a titanium(IV) chloride solution with a Ti concentration of 16.5 mass % and a chloride ion concentration of 31 mass %, and 641.5 g of pure water were mixed, whereby a raw material aqueous solution was prepared. The molar ratio of metal ions in the raw material aqueous solution is as follows: Fe:Ga:Co:Ti=1.835:0.075:0.045:0.045. Subsequently, in a 5 L reaction vessel, 1500 g of pure water was placed, and the liquid temperature was adjusted to 40° C. while mechanically stirring with a stirring blade. Subsequently, while continuing stirring and keeping the liquid temperature at 40° C., the raw material aqueous solution and a 6.2% ammonia aqueous solution (as an alkali) were simultaneously added into the pure water, and thereafter, stirring was performed for 60 minutes while keeping the liquid temperature at 40° C., whereby a colloidal solution was obtained (procedure 1, first neutralization step). Here, the raw material aqueous solution was continuously added over 240 minutes at an addition rate of 4.21 g/min, and the ammonia aqueous solution was continuously added over 240 minutes at an addition rate of 4.21 g/min. While adding the raw material aqueous solution and the ammonia aqueous solution, the ratio of the cumulative addition amount of the alkali to the total cumulative addition amount of the acid group contained in the raw material solution was 0.75 equivalents. The pH of the obtained colloidal solution was 2.11.

Subsequently, to the colloidal solution obtained by the procedure 1, 288.8 g of a citric acid solution with a citric acid concentration of 20 mass % as a hydroxycarboxylic acid was continuously added over 60 minutes under the condition of 40° C. (hydroxycarboxylic acid addition step), and thereafter, 186.1 g of a 22.14% ammonia solution was added thereto all at once, and then, the resulting mixture was held for 10 minutes while stirring under the condition of temperature of 40° C., whereby a slurry of a precursor, which is an intermediate product, was obtained (procedure 2, second neutralization step). The pH after adding 186.1 g of the ammonia solution all at once was 8.88.

The precursor slurry obtained by the procedure 2 was collected and washed with an ultrafiltration membrane and a membrane having a UF molecular weight cut-off of 50,000 until the electrical conductivity of the filtrate became 30 mS/m or less (procedure 3).

When the DLS average diameter of the precursor particles contained in the washed slurry obtained by the procedure 3 was measured, the DLS average diameter thereof was 35.5 nm.

Subsequently, 848.1 g of the washed slurry obtained by the procedure 3 was taken out, and pure water was added thereto to give a total amount of 1000 g. The temperature was adjusted to 40° C. while stirring, and 1171.3 g of ethanol was added thereto, followed by stirring for 5 minutes, and thereafter, 257.8 g of a 22.14 mass % ammonia aqueous solution was added thereto. Further, 1027.5 g of tetraethoxysilane (TEAS) as a silicon compound having a hydrolyzable group was added thereto over 35 minutes. Thereafter, while keeping the liquid temperature at 40° C., stirring was continued as such for 1 hour to carry out coating with a hydrolysate of the silicon compound. Thereafter, the obtained solution was washed and subjected to solid-liquid separation, and the product was collected as a cake (procedure 4).

After the cake (the precursor coated with the hydrolysate in a gel form) obtained by the procedure 4 was dried, the resulting dry powder was subjected to a heat treatment at 1110° C. for 4 hours in a furnace with an air atmosphere, whereby a powder of iron oxide containing substituent metal elements and coated with silicon oxide was obtained. Note that the hydrolysate of the silicon compound turns into an oxide when it is subjected to a heat treatment in an air atmosphere (procedure 5).

The powder of iron oxide containing substituent metal elements and coated with silicon oxide obtained by the procedure 5 was placed in a 20 mass % NaOH aqueous solution with a liquid temperature of 60° C. and stirred for 24 hours so as to carry out a treatment of removing the silicon oxide on the surfaces of the particles, whereby a slurry containing particles of ε-iron oxide in which Fe sites were partially substituted by other metal elements was obtained (procedure 6).

The slurry obtained by the procedure 6 was washed until the electrical conductivity became 15 mS/m or less.

Subsequently, to the washed slurry, a 25 mass % TMAOH aqueous solution was added as a surface modifier, whereby a surface modifier-containing slurry with a solid content of 5.7% was obtained. Here, the addition amount of the TMAOH aqueous solution was set so that the TMAOH concentration in the surface modifier-containing slurry became 0.065 mol/kg. In this case, the pH of the slurry became 13.

40 g of the obtained surface modifier-containing slurry was subjected to an ultrasonic dispersion treatment for 1 hour with an ultrasonic cleaner (Yamato 5510 Branson, manufactured by (Yamato Scientific) Co., Ltd.), and then subjected to a centrifugation treatment at a rotation speed of 16,000 rpm for 30 minutes with an R20A2 rotor of a centrifuge (himac CR21GII, manufactured by Hitachi Koki Co., Ltd.), and 30 g of a supernatant slurry was collected. The gravitational acceleration in the centrifugation treatment was set to 31,000 G. For a slurry on the precipitate side, the operation of addition of 30 g of a 0.065 mol/kg TMAOH aqueous solution, ultrasonic dispersion, a centrifugation treatment at 16,000 rpm and 31,000 G for 30 minutes, and collection of 30 g of a supernatant slurry was repeated further 9 times, whereby a total of 300 g of the supernatant slurry was collected. After 300 g of the collected supernatant slurry was mixed, 40 g thereof was taken out.

40 g of the taken out supernatant slurry was subjected to a centrifugation treatment at a rotation speed of 18,000 rpm for 30 minutes with an R20A2 rotor of a centrifuge (himac CR21GII, manufactured by Hitachi Koki Co., Ltd.), and 30 g of a supernatant slurry containing fine particles was removed and a slurry on the precipitate side was obtained. The gravitational acceleration in the centrifugation treatment was set to 39,000 G. To a slurry on the precipitate side obtained by repeating the operation of addition of 30 g of a 0.065 mol/kg TMAOH aqueous solution, ultrasonic dispersion, a centrifugation treatment at 18,000 rpm and 39,000 G for 30 minutes, and removal of 30 g of a supernatant slurry further 9 times for the obtained slurry on the precipitate side, a 1 mass % sulfuric acid aqueous solution was added to adjust the pH to 6.5 and aggregate substitution-type ε-iron oxide particles, followed by filtration through a membrane filter, and the solid was collected and then dried, whereby an iron-based oxide magnetic powder according to Example 3 was obtained.

The obtained iron-based oxide magnetic powder had a coercive force of 441 (kA/m), a saturation magnetization of 12.8 (Am$^2$/kg), a square ratio of 0.645, an SFD of 1.08, and an $I_L/I_H$ value of 0.42. Further, as a result of subjecting the obtained iron-based oxide magnetic powder to TEM observation by the same procedure as in Example 1, the TEM average particle diameter was 14.1 nm, the number ratio of particles with a particle diameter of 8 nm or less was 0.0%, the number ratio of particles with a particle diameter of 20 nm or more was 0.0%, the coefficient of variation (CV value) was 14%, and the average circularity of the particles was 0.972. In FIG. 3, a TEM photograph of the iron-based oxide magnetic powder obtained in this Example is shown. Note that the length indicated by the white horizontal line displayed in the lower right of the TEM photograph is 100 nm. In addition, evaluation of compositional analysis was performed, and the molar compositional ratio of each metal element was calculated when the total amount of iron and the substituent metal elements was set to 2 mol.

Example 4

As an iron raw material containing chloride ions, 391.9 g of ferric(III) chloride hexahydrate with a purity of 99 mass %, as raw materials of substituent elements, 10.1 g of cobalt(II) nitrate hexahydrate with a purity of 97 mass %, and 9.8 g of a titanium(IV) chloride solution with a Ti concentration of 16.5 mass % and a chloride ion concentration of 31 mass %, and 667.4 g of pure water were mixed, whereby a raw material aqueous solution was prepared. The molar ratio of metal ions in the raw material aqueous solution is as follows: Fe:Co:Ti=1.910:0.045:0.045. Subsequently, in a 5 L reaction vessel, 1500 g of pure water was placed, and the liquid temperature was adjusted to 40° C. while mechanically stirring with a stirring blade. Subsequently, while continuing stirring and keeping the liquid temperature at 40° C., the raw material aqueous solution and a 5.6% ammonia aqueous solution (as an alkali) were simultaneously added into the pure water, and thereafter, stirring was performed for 60 minutes while keeping the liquid temperature at 40° C., whereby a colloidal solution was obtained (procedure 1, first neutralization step). Here, the raw material aqueous solution was continuously added over 240 minutes at an addition rate of 4.22 g/min, and the ammonia aqueous solution was continuously added over 240 minutes at an addition rate of 4.22 g/min. While adding the raw material aqueous solution and the ammonia aqueous solution, the ratio of the cumulative addition amount of the alkali to the total cumulative addition amount of the acid group contained in the raw material solution was 0.75 equivalents. The pH of the obtained colloidal solution was 2.00.

Subsequently, to the colloidal solution obtained by the procedure 1, 288.8 g of a citric acid solution with a citric acid concentration of 20 mass % as a hydroxycarboxylic acid was continuously added over 60 minutes under the condition of 40° C. (hydroxycarboxylic acid addition step), and thereafter, 185.4 g of a 22.14% ammonia solution was added thereto all at once, and then, the resulting mixture was held for 10 minutes while stirring under the condition of temperature of 40° C., whereby a slurry of a precursor, which is an intermediate product, was obtained (procedure 2, second neutralization step). The pH after adding 185.4 g of the ammonia solution all at once was 8.90.

The precursor slurry obtained by the procedure 2 was collected and washed with an ultrafiltration membrane and a membrane having a UF molecular weight cut-off of 50,000 until the electrical conductivity of the filtrate became 30 mS/m or less (procedure 3).

When the DLS average diameter of the precursor particles contained in the washed slurry obtained by the procedure 3 was measured, the DLS average diameter thereof was 36.9 nm.

Subsequently, 848.8 g of the washed slurry obtained by the procedure 3 was taken out, and pure water was added thereto to give a total amount of 1000 g. The temperature was adjusted to 40° C. while stirring, and 1171.3 g of ethanol was added thereto, followed by stirring for 5 minutes, and thereafter, 257.8 g of a 22.14 mass % ammonia aqueous solution was added thereto. Further, 1027.5 g of tetraethoxysilane (TEOS) as a silicon compound having a hydrolyzable group was added thereto over 35 minutes. Thereafter, while keeping the liquid temperature at 40° C., stirring was continued as such for 1 hour to carry out coating with a hydrolysate of the silicon compound. Thereafter, the obtained solution was washed and subjected to solid-liquid separation, and the product was collected as a cake (procedure 4).

After the cake (the precursor coated with the hydrolysate in a gel form) obtained by the procedure 4 was dried, the resulting dry powder was subjected to a heat treatment at 1110° C. for 4 hours in a furnace with an air atmosphere, whereby a powder of iron oxide containing substituent metal elements and coated with silicon oxide was obtained. Note that the hydrolysate of the silicon compound turns into an oxide when it is subjected to a heat treatment in an air atmosphere (procedure 5).

The powder of iron oxide containing substituent metal elements and coated with silicon oxide obtained by the procedure 5 was placed in a 20 mass % NaOH aqueous solution with a liquid temperature of 60° C. and stirred for 24 hours so as to carry out a treatment of removing the silicon oxide on the surfaces of the particles, whereby a slurry containing particles of ε-iron oxide in which Fe sites were partially substituted by other metal elements was obtained (procedure 6).

The slurry obtained by the procedure 6 was washed until the electrical conductivity became 15 mS/m or less.

Subsequently, to the washed slurry, a 25 mass % TMAOH aqueous solution was added as a surface modifier, whereby a surface modifier-containing slurry with a solid content of 5.7% was obtained. Here, the addition amount of the TMAOH aqueous solution was set so that the TMAOH concentration in the surface modifier-containing slurry became 0.065 mol/kg. In this case, the pH of the slurry became 13.

40 g of the obtained surface modifier-containing slurry was subjected to an ultrasonic dispersion treatment for 1 hour with an ultrasonic cleaner (Yamato 5510 Branson, manufactured by (Yamato Scientific) Co., Ltd.), and then subjected to a centrifugation treatment at a rotation speed of 16,000 rpm for 30 minutes with an R20A2 rotor of a centrifuge (himac CR21GII, manufactured by Hitachi Koki Co., Ltd.), and 30 g of a supernatant slurry was collected. The gravitational acceleration in the centrifugation treatment was set to 31,000 G. For a slurry on the precipitate side, the operation of addition of 30 g of a 0.065 mol/kg TMAOH aqueous solution, ultrasonic dispersion, a centrifugation treatment at 16,000 rpm and 31,000 G for 30 minutes, and collection of 30 g of a supernatant slurry was repeated further 9 times, whereby a total of 300 g of the supernatant slurry was collected. After 300 g of the collected supernatant slurry was mixed, 40 g thereof was taken out.

40 g of the taken out supernatant slurry was subjected to a centrifugation treatment at a rotation speed of 18,000 rpm for 30 minutes with an R20A2 rotor of a centrifuge (himac CR21GII, manufactured by Hitachi Koki Co., Ltd.), and 30 g of a supernatant slurry containing fine particles was removed and a slurry on the precipitate side was obtained. The gravitational acceleration in the centrifugation treatment was set to 39,000 G. To a slurry on the precipitate side obtained by repeating the operation of addition of 30 g of a 0.065 mol/kg TMAOH aqueous solution, ultrasonic dispersion, a centrifugation treatment at 18,000 rpm and 39,000 G for 30 minutes, and removal of 30 g of a supernatant slurry further 9 times for the obtained slurry on the precipitate side, a 1 mass % sulfuric acid aqueous solution was added to adjust the pH to 6.5 and aggregate substitution-type ε-iron oxide particles, followed by filtration through a membrane filter, and the solid was collected and then dried, whereby an iron-based oxide magnetic powder according to Example 4 was obtained.

The obtained iron-based oxide magnetic powder had a coercive force of 558 (kA/m), a saturation magnetization of 11.4 (Am$^2$/kg), a square ratio of 0.673, an SFD of 0.89, and an $I_L/I_H$ value of 0.29. Further, as a result of subjecting the obtained iron-based oxide magnetic powder to TEM observation by the same procedure as in Example 1, the TEM average particle diameter was 14.2 nm, the number ratio of particles with a particle diameter of 8 nm or less was 0.0%, the number ratio of particles with a particle diameter of 20 nm or more was 0.0%, the coefficient of variation (CV value) was 12%, and the average circularity of the particles was 0.972. In FIG. 4, a TEM photograph of the iron-based oxide magnetic powder obtained in this Example is shown. Note that the length indicated by the white horizontal line displayed in the lower right of the TEM photograph is 100 nm. In addition, evaluation of compositional analysis was performed, and the molar compositional ratio of each metal element was calculated when the total amount of iron and the substituent metal elements was set to 2 mol.

Example 5

As an iron raw material containing chloride ions, 354.9 g of ferric(III) chloride hexahydrate with a purity of 99 mass, as raw materials of substituent elements, 72.1 g of a gallium (III) nitrate solution with a Ga concentration of 10.9 mass % and a nitrate concentration of 33 mass %, 15.8 g of cobalt(II) nitrate hexahydrate with a purity of 97 mass, and 10.9 g of a titanium(IV) chloride solution with a Ti concentration of 16.5 mass % and a chloride ion concentration of 31 mass %, and 475.6 g of pure water were mixed, whereby a raw material aqueous solution was prepared. The molar ratio of metal ions in the raw material aqueous solution is as follows: Fe:Ga:Co:Ti=1.730:0.150:0.070:0.050. Subsequently, in a 5 L reaction vessel, 1500 g of pure water was placed, and the liquid temperature was adjusted to 40° C. while mechanically stirring with a stirring blade. Subsequently, while continuing stirring and keeping the liquid temperature at 40° C., the raw material aqueous solution and a 6.2% ammonia aqueous solution (as an alkali) were simultaneously added into the pure water, and thereafter, stirring was performed for 60 minutes while keeping the liquid temperature at 40° C., whereby a colloidal solution was obtained (procedure 1, first neutralization step). Here, the raw material aqueous solution was continuously added over 240 minutes at an addition rate of 3.87 g/min, and the ammonia aqueous solution was continuously added over 240 minutes at an addition rate of 3.87 g/min. While adding the raw material aqueous solution and the ammonia aqueous solution, the ratio of the cumulative addition amount of the alkali to the total cumulative addition amount of the acid group contained in the raw material solution was 0.75 equivalents. The pH of the obtained colloidal solution was 1.65.

Subsequently, to the colloidal solution obtained by the procedure 1, 288.8 g of a citric acid solution with a citric acid concentration of 20 mass % as a hydroxycarboxylic acid was continuously added over 60 minutes under the condition of 40° C. (hydroxycarboxylic acid addition step), and thereafter, 186.3 g of a 22.14% ammonia solution was added thereto all at once, and then, the resulting mixture was held for 10 minutes while stirring under the condition of temperature of 40° C., whereby a slurry of a precursor, which is an intermediate product, was obtained (procedure 2, second neutralization step). The pH after adding 186.3 g of the ammonia solution all at once was 8.43.

The precursor slurry obtained by the procedure 2 was collected and washed with an ultrafiltration membrane and a membrane having a UF molecular weight cut-off of 50,000 until the electrical conductivity of the filtrate became 30 mS/m or less (procedure 3).

When the DLS average diameter of the precursor particles contained in the washed slurry obtained by the procedure 3 was measured, the DLS average diameter thereof was 37.4 nm.

Subsequently, 997.6 g of the washed slurry obtained by the procedure 3 was taken out, and pure water was added thereto to give a total amount of 1100 g. The temperature was adjusted to 40° C. while stirring, and 1288.4 g of ethanol was added thereto, followed by stirring for 5 minutes, and thereafter, 283.6 g of a 22.14 mass % ammonia aqueous solution was added thereto. Further, 1130.3 g of tetraethoxysilane (TEOS) as a silicon compound having a hydrolyzable group was added thereto over 35 minutes. Thereafter, while keeping the liquid temperature at 40° C., stirring was continued as such for 1 hour to carry out coating with a hydrolysate of the silicon compound. Thereafter, the obtained solution was washed and subjected to solid-liquid separation, and the product was collected as a cake (procedure 4).

After the cake (the precursor coated with the hydrolysate in a gel form) obtained by the procedure 4 was dried, the resulting dry powder was subjected to a heat treatment at 1130° C. for 4 hours in a furnace with an air atmosphere, whereby a powder of iron oxide containing substituent metal elements and coated with silicon oxide was obtained. Note that the hydrolysate of the silicon compound turns into an oxide when it is subjected to a heat treatment in an air atmosphere (procedure 5).

The powder of iron oxide containing substituent metal elements and coated with silicon oxide obtained by the procedure 5 was placed in a 20 mass % NaOH aqueous solution with a liquid temperature of 60° C. and stirred for 24 hours so as to carry out a treatment of removing the silicon oxide on the surfaces of the particles, whereby a slurry containing particles of ε-iron oxide in which Fe sites were partially substituted by other metal elements was obtained (procedure 6).

The slurry obtained by the procedure 6 was washed until the electrical conductivity became 15 mS/m or less.

Subsequently, to the washed slurry, a 25 mass % TMAOH aqueous solution was added as a surface modifier, whereby a surface modifier-containing slurry with a solid content of 4.1% was obtained. Here, the addition amount of the TMAOH aqueous solution was set so that the TMAOH concentration in the surface modifier-containing slurry became 0.065 mol/kg. In this case, the pH of the slurry became 13.

40 g of the obtained surface modifier-containing slurry was subjected to an ultrasonic dispersion treatment for 1 hour with an ultrasonic cleaner (Yamato 5510 Branson, manufactured by (Yamato Scientific) Co., Ltd.), and then subjected to a centrifugation treatment at a rotation speed of 14,000 rpm for 30 minutes with an R20A2 rotor of a centrifuge (himac CR21GII, manufactured by Hitachi Koki Co., Ltd.), and 30 g of a supernatant slurry was collected. The gravitational acceleration in the centrifugation treatment was set to 24,000 G. For a slurry on the precipitate side, the operation of addition of 30 g of a 0.065 mol/kg TMAOH aqueous solution, ultrasonic dispersion, a centrifugation treatment at 14,000 rpm and 24,000 G for 30 minutes, and collection of 30 g of a supernatant slurry was repeated further 9 times, whereby a total of 300 g of the supernatant slurry was collected. After 300 g of the collected supernatant slurry was mixed, 40 g thereof was taken out.

40 g of the taken out supernatant slurry was subjected to a centrifugation treatment at a rotation speed of 18,000 rpm for 30 minutes with an R20A2 rotor of a centrifuge (himac CR21GII, manufactured by Hitachi Koki Co., Ltd.), and 30 g of a supernatant slurry containing fine particles was removed and a precipitate was obtained. The gravitational acceleration in the centrifugation treatment was set to 39,000 G. To a slurry on the precipitate side obtained by repeating the operation of addition of 30 g of a 0.065 mol/kg TMAOH aqueous solution, ultrasonic dispersion, a centrifugation treatment at 18,000 rpm and 39,000 G for 30 minutes, and removal of 30 g of a supernatant slurry further 9 times for the obtained slurry on the precipitate side, 1 mass % sulfuric acid aqueous solution was added to adjust the pH to 6.5 and aggregate substitution-type ε-iron oxide particles, followed by filtration through a membrane filter, and the solid was collected and then dried, whereby an iron-based oxide magnetic powder according to Example 5 was obtained.

The obtained iron-based oxide magnetic powder had a coercive force of 341 (kA/m), a saturation magnetization of 16.2 (Am$^2$/kg), a square ratio of 0.641, an SFD of 0.69, and an $I_L/I_H$ value of 0.14. Further, as a result of subjecting the obtained iron-based oxide magnetic powder to TEM observation by the same procedure as in Example 1, the TEM average particle diameter was 15.3 nm, the number ratio of particles with a particle diameter of 8 nm or less was 0.1%, the number ratio of particles with a particle diameter of 20 nm or more was 0.0%, the coefficient of variation (CV value) was 13%, and the average circularity of the particles was 0.973. In addition, evaluation of compositional analysis was performed, and the molar compositional ratio of each metal element was calculated when the total amount of iron and the substituent metal elements was set to 2 mol.

Example 6

As an iron raw material containing chloride ions, 329.3 g of ferric(III) chloride hexahydrate with a purity of 99 mass %, as raw materials of substituent elements, 132.2 g of a gallium(III) nitrate solution with a Ga concentration of 10.9 mass % and a nitrate concentration of 33 mass %, 15.8 g of cobalt(II) nitrate hexahydrate with a purity of 97 mass, and 10.9 g of a titanium(IV) chloride solution with a Ti concentration of 16.5 mass % and a chloride ion concentration of 31 mass %, and 441.5 g of pure water were mixed, whereby a raw material aqueous solution was prepared. The molar ratio of metal ions in the raw material aqueous solution is as follows: Fe:Ga:Co:Ti=1.650:0.275:0.070:0.050. Subsequently, in a 5 L reaction vessel, 1500 g of pure water was placed, and the liquid temperature was adjusted to 40° C. while mechanically stirring with a stirring blade. Subsequently, while continuing stirring and keeping the liquid temperature at 40° C., the raw material aqueous solution and a 6.2% ammonia aqueous solution (as an alkali) were simultaneously added into the pure water, and thereafter, stirring was performed for 60 minutes while keeping the liquid temperature at 40° C., whereby a colloidal solution was obtained (procedure 1, first neutralization step). Here, the raw material aqueous solution was continuously added over 240 minutes at an addition rate of 3.87 g/min, and the ammonia aqueous solution was continuously added over 240 minutes at an addition rate of 3.87 g/min. While adding the raw material aqueous solution and the ammonia aqueous solution, the ratio of the cumulative addition amount of the alkali to the total cumulative addition amount of the acid group contained in the raw material solution was 0.75 equivalents. The pH of the obtained colloidal solution was 1.66.

Subsequently, to the colloidal solution obtained by the procedure 1, 288.8 g of a citric acid solution with a citric acid concentration of 20 mass % as a hydroxycarboxylic acid was continuously added over 60 minutes under the condition of 40° C. (hydroxycarboxylic acid addition step), and thereafter, 186.8 g of a 22.25% ammonia solution was added thereto all at once, and then, the resulting mixture was held for 10 minutes while stirring under the condition of temperature of 40° C., whereby a slurry of a precursor, which is an intermediate product, was obtained (procedure 2, second neutralization step). The pH after adding 186.8 g of the ammonia solution all at once was 8.51.

The precursor slurry obtained by the procedure 2 was collected and washed with an ultrafiltration membrane and a membrane having a UF molecular weight cut-off of 50,000 until the electrical conductivity of the filtrate became 30 mS/m or less (procedure 3).

When the DLS average diameter of the precursor particles contained in the washed slurry obtained by the procedure 3 was measured, the DLS average diameter thereof was 32.5 nm.

Subsequently, 971.0 g of the washed slurry obtained by the procedure 3 was taken out, and pure water was added thereto to give a total amount of 1100 g. The temperature was adjusted to 40° C. while stirring, and 1288.4 g of ethanol was added thereto, followed by stirring for 5 minutes, and thereafter, 283.6 g of a 22.14 mass % ammonia aqueous solution was added thereto. Further, 1130.3 g of tetraethoxysilane (TEOS) as a silicon compound having a hydrolyzable group was added thereto over 35 minutes. Thereafter, while keeping the liquid temperature at 40° C., stirring was continued as such for 1 hour to carry out coating with a hydrolysate of the silicon compound. Thereafter, the obtained solution was washed and subjected to solid-liquid separation, and the product was collected as a cake (procedure 4).

After the cake (the precursor coated with the hydrolysate in a gel form) obtained by the procedure 4 was dried, the resulting dry powder was subjected to a heat treatment at 1130° C. for 4 hours in a furnace with an air atmosphere, whereby a powder of iron oxide containing substituent metal elements and coated with silicon oxide was obtained. Note that the hydrolysate of the silicon compound turns into an oxide when it is subjected to a heat treatment in an air atmosphere (procedure 5).

The powder of iron oxide containing substituent metal elements and coated with silicon oxide obtained by the procedure 5 was placed in a 20 mass % NaOH aqueous solution with a liquid temperature of 60° C. and stirred for 24 hours so as to carry out a treatment of removing the silicon oxide on the surfaces of the particles, whereby a slurry containing particles of ε-iron oxide in which Fe sites were partially substituted by other metal elements was obtained (procedure 6).

The slurry obtained by the procedure 6 was washed until the electrical conductivity became 15 mS/m or less.

Subsequently, to the washed slurry, a 25 mass % TMAOH aqueous solution was added as a surface modifier, whereby a surface modifier-containing slurry with a solid content of 4.3% was obtained. Here, the addition amount of the TMAOH aqueous solution was set so that the TMAOH concentration in the surface modifier-containing slurry became 0.065 mol/kg. In this case, the pH of the slurry became 13.

40 g of the obtained surface modifier-containing slurry was subjected to an ultrasonic dispersion treatment for 1 hour with an ultrasonic cleaner (Yamato 5510 Branson, manufactured by (Yamato Scientific) Co., Ltd.), and then subjected to a centrifugation treatment at a rotation speed of 14,000 rpm for 30 minutes with an R20A2 rotor of a centrifuge (himac CR21GII, manufactured by Hitachi Koki Co., Ltd.), and 30 g of a supernatant slurry was collected. The gravitational acceleration in the centrifugation treatment was set to 24,000 G. For a slurry on the precipitate side, the operation of addition of 30 g of a 0.065 mol/kg TMAOH aqueous solution, ultrasonic dispersion, a centrifugation treatment at 14,000 rpm and 24,000 G for 30 minutes, and collection of 30 g of a supernatant slurry was repeated further 9 times, whereby a total of 300 g of the supernatant slurry was collected. After 300 g of the collected supernatant slurry was mixed, 40 g thereof was taken out.

40 g of the taken out supernatant slurry was subjected to a centrifugation treatment at a rotation speed of 18,000 rpm for 30 minutes with an R20A2 rotor of a centrifuge (himac CR21GII, manufactured by Hitachi Koki Co., Ltd.), and 30 g of a supernatant slurry containing fine particles was removed and a slurry on the precipitate side was obtained. The gravitational acceleration in the centrifugation treatment was set to 39,000 G. To a slurry on the precipitate side obtained by repeating the operation of addition of 30 g of a 0.065 mol/kg TMAOH aqueous solution, ultrasonic dispersion, a centrifugation treatment at 18,000 rpm and 39,000 G for 30 minutes, and removal of 30 g of a supernatant slurry further 9 times for the obtained slurry on the precipitate side, a 1 mass % sulfuric acid aqueous solution was added to adjust the pH to 6.5 and aggregate substitution-type ε-iron oxide particles, followed by filtration through a membrane filter, and the solid was collected and then dried, whereby an iron-based oxide magnetic powder according to Example 6 was obtained.

The obtained iron-based oxide magnetic powder had a coercive force of 200 kA/m), a saturation magnetization of 17.4 (Am$^2$/kg), a square ratio of 0.577, an SFD of 1.02, and an $I_L/I_H$ value of 0.27. Further, as a result of subjecting the obtained iron-based oxide magnetic powder to TEM observation by the same procedure as in Example 1, the TEM average particle diameter was 15.7 nm, the number ratio of particles with a particle diameter of 8 nm or less was 0.0%, the number ratio of particles with a particle diameter of 20 nm or more was 1.0%, the coefficient of variation (CV value) was 15%, and the average circularity of the particles was 0.970. In addition, evaluation of compositional analysis was performed, and the molar compositional ratio of each metal element was calculated when the total amount of iron and the substituent metal elements was set to 2 mol.

Example 7

As an iron raw material containing chloride ions, 334.4 g of ferric(III) chloride hexahydrate with a purity of 99 mass %, as raw materials of substituent elements, 120.2 g of a gallium(III) nitrate solution with a Ga concentration of 10.9 mass % and a nitrate concentration of 33 mass %, 15.8 g of cobalt(II) nitrate hexahydrate with a purity of 97 mass %, and 10.9 g of a titanium(IV) chloride solution with a Ti concentration of 16.5 mass % and a chloride ion concentration of 31 mass %, and 448.2 g of pure water were mixed, whereby a raw material aqueous solution was prepared. The molar ratio of metal ions in the raw material aqueous solution is as follows: Fe:Ga:Co:Ti=1.630:0.250:0.070: 0.050. Subsequently, in a 5 L reaction vessel, 1500 g of pure water was placed, and the liquid temperature was adjusted to 40° C. while mechanically stirring with a stirring blade. Subsequently, while continuing stirring and keeping the liquid temperature at 40° C., the raw material aqueous solution and a 6.2% ammonia aqueous solution (as an alkali) were simultaneously added into the pure water, and thereafter, stirring was performed for 60 minutes while keeping the liquid temperature at 40° C., whereby a colloidal solution was obtained (procedure 1, first neutralization step). Here, the raw material aqueous solution was continuously added over 240 minutes at an addition rate of 3.87 g/min, and the ammonia aqueous solution was continuously added over 240 minutes at an addition rate of 3.87 g/min. While adding the raw material aqueous solution and the ammonia aqueous solution, the ratio of the cumulative addition amount of the alkali to the total cumulative addition amount of the acid group contained in the raw material solution was 0.75 equivalents. The pH of the obtained colloidal solution was 1.61.

Subsequently, to the colloidal solution obtained by the procedure 1, 288.8 g of a citric acid solution with a citric acid concentration of 20 mass % as a hydroxycarboxylic acid was continuously added over 60 minutes under the condition of 40° C. (hydroxycarboxylic acid addition step), and thereafter, 186.5 g of a 22.25% ammonia solution was added thereto all at once, and then, the resulting mixture was held for 10 minutes while stirring under the condition of temperature of 40° C., whereby a slurry of a precursor, which is an intermediate product, was obtained (procedure 2, second neutralization step). The pH after adding 186.5 g of the ammonia solution all at once was 8.43.

The precursor slurry obtained by the procedure 2 was collected and washed with an ultrafiltration membrane and a membrane having a UF molecular weight cut-off of 50,000 until the electrical conductivity of the filtrate became 30 mS/m or less (procedure 3).

When the DLS average diameter of the precursor particles contained in the washed slurry obtained by the procedure 3 was measured, the DLS average diameter thereof was 32.3 nm.

Subsequently, 923.2 g of the washed slurry obtained by the procedure 3 was taken out, and pure water was added thereto to give a total amount of 1100 g. The temperature was adjusted to 40° C. while stirring, and 1288.4 g of ethanol was added thereto, followed by stirring for 5 minutes, and thereafter, 283.6 g of a 22.14 mass % ammonia aqueous solution was added thereto. Further, 1130.3 g of tetraethoxysilane (TEOS) as a silicon compound having a hydrolyzable group was added thereto over 35 minutes. Thereafter, while keeping the liquid temperature at 40° C., stirring was continued as such for 1 hour to carry out coating with a hydrolysate of the silicon compound. Thereafter, the obtained solution was washed and subjected to solid-liquid separation, and the product was collected as a cake (procedure 4).

After the cake (the precursor coated with the hydrolysate in a gel form) obtained by the procedure 4 was dried, the resulting dry powder was subjected to a heat treatment at 1130° C. for 4 hours in a furnace with an air atmosphere, whereby a powder of iron oxide containing substituent metal elements and coated with silicon oxide was obtained. Note that the hydrolysate of the silicon compound turns into an oxide when it is subjected to a heat treatment in an air atmosphere (procedure 5).

The powder of iron oxide containing substituent metal elements and coated with silicon oxide obtained by the procedure 5 was placed in a 20 mass % NaOH aqueous solution with a liquid temperature of 60° C. and stirred for 24 hours so as to carry out a treatment of removing the silicon oxide on the surfaces of the particles, whereby a slurry containing particles of ε-iron oxide in which Fe sites were partially substituted by other metal elements was obtained (procedure 6).

The slurry obtained by the procedure 6 was washed until the electrical conductivity became 15 mS/m or less.

Subsequently, to the washed slurry, a 25 mass % TMAOH aqueous solution was added as a surface modifier, whereby a surface modifier-containing slurry with a solid content of 4.3% was obtained. Here, the addition amount of the TMAOH aqueous solution was set so that the TMAOH concentration in the surface modifier-containing slurry became 0.065 mol/kg. In this case, the pH of the slurry became 13.

40 g of the obtained surface modifier-containing slurry was subjected to an ultrasonic dispersion treatment for 1 hour with an ultrasonic cleaner (Yamato 5510 Branson, manufactured by (Yamato Scientific) Co., Ltd.), and then subjected to a centrifugation treatment at a rotation speed of 14,000 rpm for 30 minutes with an R20A2 rotor of a centrifuge (himac CR21GII, manufactured by Hitachi Koki Co., Ltd.), and 30 g of a supernatant slurry was collected. The gravitational acceleration in the centrifugation treatment was set to 24,000 G. For a slurry on the precipitate side, the operation of addition of 30 g of a 0.065 mol/kg TMAOH aqueous solution, ultrasonic dispersion, a centrifugation treatment at 14,000 rpm and 24,000 G for 30 minutes, and collection of 30 g of a supernatant slurry was repeated further 9 times, whereby a total of 300 g of the supernatant slurry was collected. After 300 g of the collected supernatant slurry was mixed, 40 g thereof was taken out.

40 g of the taken out supernatant slurry was subjected to a centrifugation treatment at a rotation speed of 18,000 rpm for 30 minutes with an R20A2 rotor of a centrifuge (himac CR21GII, manufactured by Hitachi Koki Co., Ltd.), and 30 g of a supernatant slurry containing fine particles was removed and a slurry on the precipitate side was obtained. The gravitational acceleration in the centrifugation treatment was set to 39,000 G. To a slurry on the precipitate side obtained by repeating the operation of addition of 30 g of a 0.065 mol/kg TMAOH aqueous solution, ultrasonic dispersion, a centrifugation treatment at 18,000 rpm and 39,000 G for 30 minutes, and removal of 30 g of a supernatant slurry further 9 times for the obtained slurry on the precipitate side, a 1 mass % sulfuric acid aqueous solution was added to adjust the pH to 6.5 and aggregate substitution-type ε-iron oxide particles, followed by filtration through a membrane filter, and the solid was collected and then dried, whereby an iron-based oxide magnetic powder according to Example 7 was obtained.

The obtained iron-based oxide magnetic powder had a coercive force of 223 (kA/m), a saturation magnetization of 17.4 (Am$^2$/kg), a square ratio of 0.595, an SFD of 0.91, and an value of 0.21. Further, as a result of subjecting the obtained iron-based oxide magnetic powder to TEM observation by the same procedure as in Example 1, the TEM average particle diameter was 15.5 nm, the number ratio of particles with a particle diameter of 8 nm or less was 0.0%, the number ratio of particles with a particle diameter of 20 nm or more was 0.5%, the coefficient of variation (CV value) was 14%, and the average circularity of the particles was 0.972. In addition, evaluation of compositional analysis was performed, and the molar compositional ratio of each metal element was calculated when the total amount of iron and the substituent metal elements was set to 2 mol.

Example 8

As an iron raw material containing chloride ions, 627.8 g of ferric(III) chloride hexahydrate with a purity of 99 mass %, as raw materials of substituent elements, 333.4 g of a gallium(III) nitrate solution with a Ga concentration of 11.0 mass % and a nitrate concentration of 33 mass %, 31.6 g of cobalt(II) nitrate hexahydrate with a purity of 97 mass %, and 21.8 g of a titanium(IV) chloride solution with a Ti concentration of 16.5 mass % and a chloride ion concentration of 31 mass %, and 814.3 g of pure water were mixed, whereby a raw material aqueous solution was prepared. The molar ratio of metal ions in the raw material aqueous solution is as follows: Fe:Ga:Co:Ti=1.530:0.350:0.070: 0.050. Subsequently, in a 10 L reaction vessel, 3000 g of pure water was placed, and the liquid temperature was adjusted to 40° C. while mechanically stirring with a stirring blade. Subsequently, while continuing stirring and keeping the liquid temperature at 40° C., the raw material aqueous solution and a 6.8% ammonia aqueous solution (as an alkali) were simultaneously added into the pure water, and thereafter, stirring was performed for 60 minutes while keeping the liquid temperature at 40° C., whereby a colloidal solution was obtained (procedure 1, first neutralization step). Here, the raw material aqueous solution was continuously added over 240 minutes at an addition rate of 7.62 g/min, and the ammonia aqueous solution was continuously added over 240 minutes at an addition rate of 7.62 g/min. While adding the raw material aqueous solution and the ammonia aqueous solution, the ratio of the cumulative addition amount of the alkali to the total cumulative addition amount of the acid group contained in the raw material solution was 0.80 equivalents. The pH of the obtained colloidal solution was 1.86.

Subsequently, to the colloidal solution obtained by the procedure 1, 577.5 g of a citric acid solution with a citric acid concentration of 20 mass % as a hydroxycarboxylic acid was continuously added over 60 minutes under the condition of 40° C. (hydroxycarboxylic acid addition step), and thereafter, 376.6 g of a 22.13% ammonia solution was added thereto all at once, and then, the resulting mixture was held for 10 minutes while stirring under the condition of temperature of 40° C., whereby a slurry of a precursor, which is an intermediate product, was obtained (procedure 2, second neutralization step). The pH after adding 376.6 g of the ammonia solution all at once was 8.6.

The precursor slurry obtained by the procedure 2 was collected and washed with an ultrafiltration membrane and a membrane having a UF molecular weight cut-off of 50,000 until the electrical conductivity of the filtrate became 30 mS/m or less (procedure 3).

When the DLS average diameter of the precursor particles contained in the washed slurry obtained by the procedure 3 was measured, the DLS average diameter thereof was 50.8 nm.

Subsequently, 1975.5 g of the washed slurry obtained by the procedure 3 was taken out, and pure water was added thereto to give a total amount of 2500 g. The temperature was adjusted to 40° C. while stirring, and 2928.2 g of ethanol was added thereto, followed by stirring for 5 minutes, and thereafter, 702.0 g of a 21.87 mass % ammonia aqueous solution was added thereto. Further, 2763.9 g of tetraethoxysilane (TEOS) as a silicon compound having a hydrolyzable group was added thereto over 35 minutes. Thereafter, while keeping the liquid temperature at 40° C., stirring was continued as such for 1 hour to carry out coating with a hydrolysate of the silicon compound. Thereafter, the obtained solution was washed and subjected to solid-liquid separation, and the product was collected as a cake (procedure 4).

After the cake (the precursor coated with the hydrolysate in a gel form) obtained by the procedure 4 was dried, the resulting dry powder was subjected to a heat treatment at 1116° C. for 4 hours in a furnace with an air atmosphere, whereby a powder of iron oxide containing substituent metal elements and coated with silicon oxide was obtained. Note that the hydrolysate of the silicon compound turns into an oxide when it is subjected to a heat treatment in an air atmosphere (procedure 5).

The powder of iron oxide containing substituent metal elements and coated with silicon oxide obtained by the procedure 5 was placed in a 20 mass % NaOH aqueous solution with a liquid temperature of 60° C. and stirred for 24 hours so as to carry out a treatment of removing the silicon oxide on the surfaces of the particles, whereby a slurry containing particles of ε-iron oxide in which Fe sites were partially substituted by other metal elements was obtained (procedure 6).

The slurry obtained by the procedure 6 was washed until the electrical conductivity became 15 mS/m or less.

Subsequently, to the washed slurry, a 25 mass % TMAOH aqueous solution was added as a surface modifier, whereby a surface modifier-containing slurry with a solid content of 35% was obtained. Here, the addition amount of the TMAOH aqueous solution was set so that the TMAOH concentration in the surface modifier-containing slurry became 0.065 mol/kg. In this case, the pH of the slurry became 13.

550 g of the obtained surface modifier-containing slurry was subjected to an ultrasonic dispersion treatment for 1 hour with an ultrasonic cleaner (Yamato 5510 Branson, manufactured by (Yamato Scientific) Co., Ltd.), and then subjected to a centrifugation treatment at a rotation speed of 8800 rpm for 130 minutes with an R10A3 rotor of a centrifuge (himac CR21GII, manufactured by Hitachi Koki Co., Ltd.), and 250 g of a supernatant slurry was removed. The gravitational acceleration in the centrifugation treatment was set to 15,000 G. For a slurry on the precipitate side, the operation of addition of 250 g of a 0.065 mol/kg TMAOH aqueous solution, ultrasonic dispersion, a centrifugation treatment at 8800 rpm and 15,000 G for 130 minutes, and removal of 250 g of a supernatant slurry was repeated further times, whereby a slurry on the precipitate side was obtained (procedure 7).

Subsequently, 250 of the 0.065 mol/kg TMAOH aqueous solution was added to 300 g of the slurry on the precipitate side obtained by the procedure 7, and thereafter, the resulting mixture was subjected to an ultrasonic dispersion treatment for 1 hour with an ultrasonic cleaner (Yamato 5510 Branson, manufactured by (Yamato Scientific) Co., Ltd.), and then subjected to a centrifugation treatment at a rotation speed of 8800 rpm for 59 minutes with an R10A3 rotor of a centrifuge (himac CR21GII, manufactured by Hitachi Koki Co., Ltd.), and 250 g of a supernatant slurry was collected. The gravitational acceleration in the centrifugation treatment was set to 15,000 G. For a slurry on the precipitate side, the operation of addition of 250 g of a 0.065 mol/kg TMAOH aqueous solution, ultrasonic dispersion, a centrifugation treatment at 8800 rpm and 15,000 G for 59 minutes, and collection of 250 g of a supernatant slurry was repeated further 12 times, whereby a total of 3250 g of the supernatant slurry was collected. After 3250 g of the collected supernatant slurry was mixed, a 1 mass % sulfuric acid aqueous solution was added to adjust the pH to 6.5 and aggregate substitution-type ε-iron oxide particles, followed by filtration through a membrane filter, and the solid was collected and then dried, whereby an iron-based oxide magnetic powder according to Example 8 was obtained.

The obtained iron-based oxide magnetic powder had a coercive force of 183 (kA/m), a saturation magnetization of 17.7 (Am$^2$/kg), a square ratio of 0.558, an SFS of 1.19, and an $I_L/I_H$ value of 0.32. Further, as a result of subjecting the obtained iron-based oxide magnetic powder to TEM observation by the same procedure as in Example 1, the TEM average particle diameter was 15.0 nm, the number ratio of particles with a particle diameter of 8 nm or less was 0.3%, the number ratio of particles with a particle diameter of 20 nm or more was 1.0%, the coefficient of variation (CV value) was 14%, and the average circularity of the particles was 0.974. In addition, evaluation of compositional analysis was performed, and the molar compositional ratio of each metal element was calculated when the total amount of iron and the substituent metal elements was set to 2 mol.

Example 9

As an iron raw material containing chloride ions, 342.6 g of ferric(III) chloride hexahydrate with a purity of 99 mass %, as raw materials of substituent elements, 114.3 g of a gallium(III) nitrate solution with a Ga concentration of 11.0 mass % and a nitrate concentration of 33 mass %, 10.1 g of cobalt(II) nitrate hexahydrate with a purity of 97 mass %, and 9.8 g of a titanium(IV) chloride solution with a Ti concentration of 16.5 mass % and a chloride ion concentration of 31 mass %, and 464.0 g of pure water were mixed, whereby a raw material aqueous solution was prepared. The molar ratio of metal ions in the raw material aqueous solution is as follows: Fe:Ga:Co:Ti=1.670:0.240:0.045:0.045. Subsequently, in a 5 L reaction vessel, 1500 g of pure water was placed, and the liquid temperature was adjusted to 40° C. while mechanically stirring with a stirring blade. Subsequently, while continuing stirring and keeping the liquid temperature at 40° C., the raw material aqueous solution and a 6.5% ammonia aqueous solution (as an alkali) were simultaneously added into the pure water, and thereafter, stirring was performed for 60 minutes while keeping the liquid temperature at 40° C., whereby a colloidal solution was obtained (procedure 1, first neutralization step). Here, the raw material aqueous solution was continuously added over 240 minutes at an addition rate of 3.92 g/min, and the ammonia aqueous solution was continuously added over 240 minutes at an addition rate of 3.92 g/min. While adding the raw material aqueous solution and the ammonia aqueous solution, the ratio of the cumulative addition amount of the alkali to the total cumulative addition amount of the acid group contained in the raw material solution was 0.79 equivalents. The pH of the obtained colloidal solution was 1.81.

Subsequently, to the colloidal solution obtained by the procedure 1, 288.8 g of a citric acid solution with a citric acid concentration of 20 mass % as a hydroxycarboxylic acid was continuously added over 60 minutes under the condition of 40° C. (hydroxycarboxylic acid addition step), and thereafter, 190.2 g of a 21.87% ammonia solution was added thereto all at once, and then, the resulting mixture was held for 10 minutes while stirring under the condition of temperature of 40° C., whereby a slurry of a precursor, which is an intermediate product, was obtained (procedure 2, second neutralization step). The pH after adding 190.2 g of the ammonia solution all at once was 8.67.

The precursor slurry obtained by the procedure 2 was collected and washed with an ultrafiltration membrane and a membrane having a UF molecular weight cut-off of 50,000 until the electrical conductivity of the filtrate became 30 mS/m or less (procedure 3).

When the DLS average diameter of the precursor particles contained in the washed slurry obtained by the procedure 3 was measured, the DLS average diameter thereof was 58.1 nm.

Subsequently, 695.5 g of the washed slurry obtained by the procedure 3 was taken out, and pure water was added thereto to give a total amount of 807 g. The temperature was adjusted to 40° C. while stirring, and 945.2 g of ethanol was added thereto, followed by stirring for 5 minutes, and thereafter, 207.02 g of a 22.25 mass % ammonia aqueous solution was added thereto. Further, 829.2 g of tetraethoxysilane (TEOS) as a silicon compound having a hydrolyzable group was added thereto over 35 minutes. Thereafter, while keeping the liquid temperature at 40° C., stirring was continued as such for 1 hour to carry out coating with a hydrolysate of the silicon compound. Thereafter, the obtained solution was washed and subjected to solid-liquid separation, and the product was collected as a cake (procedure 4).

After the cake (the precursor coated with the hydrolysate in a gel form) obtained by the procedure 4 was dried, the resulting dry powder was subjected to a heat treatment at 1050° C. for 4 hours in a furnace with an air atmosphere, whereby a powder of iron oxide containing substituent metal elements and coated with silicon oxide was obtained. Note that the hydrolysate of the silicon compound turns into an oxide when it is subjected to a heat treatment in an air atmosphere (procedure 5).

The powder of iron oxide containing substituent metal elements and coated with silicon oxide obtained by the procedure 5 was placed in a 20 mass % NaOH aqueous solution with a liquid temperature of 60° C. and stirred for 24 hours so as to carry out a treatment of removing the silicon oxide on the surfaces of the particles, whereby a slurry containing particles of ε-iron oxide in which Fe sites were partially substituted by other metal elements was obtained (procedure 6).

The slurry obtained by the procedure 6 was washed until the electrical conductivity became 15 mS/m or less.

Subsequently, to the washed slurry, a 25 mass % TMAOH aqueous solution was added as a surface modifier, whereby a surface modifier-containing slurry with a solid content of 4.1% was obtained. Here, the addition amount of the TMAOH aqueous solution was set so that the TMAOH concentration in the surface modifier-containing slurry became 0.065 mol/kg. In this case, the pH of the slurry became 13.

40 g of the obtained surface modifier-containing slurry was subjected to an ultrasonic dispersion treatment for 1 hour with an ultrasonic cleaner (Yamato 5510 Branson, manufactured by (Yamato Scientific) Co., Ltd.), and then subjected to a centrifugation treatment at a rotation speed of 20,000 rpm for 30 minutes with an R20A2 rotor of a centrifuge (himac CR21GII, manufactured by Hitachi Koki Co., Ltd.), and 30 g of a supernatant slurry was removed. The gravitational acceleration in the centrifugation treatment was set to 48,000 G. For a slurry on the precipitate side, the operation of addition of 30 g of a 0.065 mol/kg TMAOH aqueous solution, ultrasonic dispersion, a centrifugation treatment at 20,000 rpm and 48,000 G for 30 minutes, and removal of 30 g of a supernatant slurry was repeated further times, whereby a slurry on the precipitate side was obtained (procedure 7).

After 30 g of a 0.065 mol/kg TMAOH aqueous solution was added to 10 g of the slurry on the precipitate side obtained by the procedure 7, the resulting mixture was subjected to an ultrasonic dispersion treatment for 1 hour with an ultrasonic cleaner (Yamato 5510 Branson, manufactured by (Yamato Scientific) Co., Ltd.), and then subjected to a centrifugation treatment at a rotation speed of 19,000 rpm for 30 minutes with an R20A2 rotor of a centrifuge (himac CR21GII, manufactured by Hitachi Kaki Co., Ltd.), and 30 g of a supernatant slurry was removed. The gravitational acceleration in the centrifugation treatment was set to 43,000 G. For a slurry on the precipitate side, the operation of addition of 250 g of a 0.065 mol/kg TMAOH aqueous solution, ultrasonic dispersion, a centrifugation treatment at 19,000 rpm and 43,000 G for 30 minutes, and removal of 30 g of a supernatant slurry was repeated further times, whereby a slurry on the precipitate side was obtained (procedure 8).

After 30 g of a 0.065 mol/kg TMAOH aqueous solution was added to 10 g of the slurry on the precipitate side obtained by the procedure 8, the resulting mixture was subjected to an ultrasonic dispersion treatment for 1 hour with an ultrasonic cleaner (Yamato 5510 Branson, manufactured by (Yamato Scientific) Co., Ltd.), and then subjected to a centrifugation treatment at a rotation speed of 18,000 rpm for 30 minutes with an R20A2 rotor of a centrifuge (himac CR21GII, manufactured by Hitachi Koki Co., Ltd.), and 30 g of a supernatant slurry was collected. The gravitational acceleration in the centrifugation treatment was set to 39,000 G. For a slurry on the precipitate side, the operation of addition of 30 g of a 0.065 mol/kg TMAOH aqueous solution, ultrasonic dispersion, a centrifugation treatment at 18,000 rpm and 39,000 G for 30 minutes, and collection of 30 g of a supernatant slurry was repeated further 9 times, whereby a total of 300 g of the supernatant slurry was obtained. After 300 g of the collected supernatant slurry was mixed, a 1 mass % sulfuric acid aqueous solution was added to adjust the pH to 6.5 and aggregate substitution-type ε-iron oxide particles, followed by filtration through a membrane filter, and the solid was collected and then dried, whereby an iron-based oxide magnetic powder according to Example 9 was obtained.

The obtained iron-based oxide magnetic powder had a coercive force of 272 (kA/m), a saturation magnetization of 15.0 ($Am^2$/kg), a square ratio of 0.606, an SFD of 1.16, and an $I_L/I_H$ value of 0.34. Further, as a result of subjecting the obtained iron-based oxide magnetic powder to TEM observation by the same procedure as in Example 1, the TEM average particle diameter was 14.0 nm, the number ratio of particles with a particle diameter of 8 nm or less was 0.3%, the number ratio of particles with a particle diameter of 20 nm or more was 0.6%, the coefficient of variation (CV value) was 14%, and the average circularity of the particles was 0.966. In addition, evaluation of compositional analysis was performed, and the molar compositional ratio of each metal element was calculated when the total amount of iron and the substituent metal elements was set to 2 mol.

Comparative Example 1

As an iron raw material containing chloride ions, 313.9 g of ferric(III) chloride hexahydrate with a purity of 99 mass %, as raw materials of substituent elements, 195.1 g of a gallium(III) nitrate solution with a Ga concentration of 9.4 mass % and a nitrate concentration of 24 mass %, 15.8 g of cobalt(II) nitrate hexahydrate with a purity of 97 mass, and 10.9 g of a titanium(IV) chloride solution with a Ti concentration of 16.5 mass % and a chloride ion concentration of 31 mass %, and 398.0 g of pure water were mixed, whereby a raw material solution was prepared. The molar ratio of metal ions in the raw material solution is as follows: Fe:Ga:Co:Ti=1.530:0.350:0.070:0.050. Subsequently, in a 5 L reaction vessel, 1500 g of pure water was placed, and the liquid temperature was adjusted to 40° C. while mechanically stirring with a stirring blade. Subsequently, while continuing stirring and keeping the liquid temperature at 40° C., the raw material aqueous solution and a 6.4 mass % ammonia aqueous solution as an alkaline aqueous solution were simultaneously added into the pure water, and thereafter, stirring was performed for 60 minutes while keeping the liquid temperature at 40° C., whereby a colloidal solution was obtained (procedure 1, first neutralization step). Here, the raw material aqueous solution was continuously added over 240 minutes at an addition rate of 3.9 g/min, and the ammonia aqueous solution was continuously added over 240 minutes at an addition rate of 3.9 g/min. While adding the raw material solution and the ammonia aqueous solution, the ratio of the cumulative addition amount of the alkali to the total cumulative addition amount of the acid group contained in the raw material solution was 0.80 equivalents. The pH of the obtained colloidal solution was 1.8.

Subsequently, to the colloidal solution obtained by the procedure 1, 288.75 g of a citric acid solution with a citric acid concentration of 20 mass % as a hydroxycarboxylic acid was continuously added over 60 minutes under the condition of 40° C. (hydroxycarboxylic acid addition step), and thereafter, 152.86 g of a 22.4 mass % ammonia aqueous solution was added thereto all at once, and then, the resulting mixture was held for 10 minutes while stirring under the condition of temperature of 40° C., whereby a slurry of precursor particles, which is an intermediate product, was obtained (procedure 2, second neutralization step). The pH after adding 152.86 g of the ammonia solution all at once was 8.6.

The precursor slurry obtained by the procedure 2 was collected and washed with an ultrafiltration membrane and a membrane having a UF molecular weight cut-off of 50,000 until the electrical conductivity of the filtrate became 30 mS/m or less (procedure 3).

Thereafter, 506.1 g of the washed slurry obtained by the procedure 3 was taken out, and the temperature was adjusted to 40° C. while stirring, and 138.8 g of a 22.1 mass % ammonia aqueous solution and 1171.3 g of 2-propanol were added thereto, followed by stirring for 5 minutes, and further, 552.8 g of tetraethoxysilane (TEAS) as a silicon compound having a hydrolyzable group was added thereto over minutes. Thereafter, while keeping the liquid temperature at 40° C., stirring was continued as such for 7 hours to carry out coating with a hydrolysate of the silicon compound. Thereafter, the obtained solution was washed and subjected to solid-liquid separation, and the product was collected as a cake (procedure 4).

After the cake (the precursor coated with the hydrolysate in a gel form) obtained by the procedure 4 was dried, the resulting dry powder was subjected to a heat treatment at 1130° C. for 4 hours in a furnace with an air atmosphere, whereby a powder of iron oxide containing substituent metal elements and coated with silicon oxide was obtained. Note that the hydrolysate of the silicon compound turns into an oxide when it is subjected to a heat treatment in an air atmosphere (procedure 5).

The powder of iron oxide containing substituent metal elements and coated with silicon oxide obtained by the procedure 5 was stirred at about 60° C. for 24 hours in a 20 mass % NaOH aqueous solution so as to carry out a treatment of removing the silicon oxide on the surfaces of the particles, whereby a slurry containing particles of ε-iron oxide in which Fe sites were partially substituted by other metal elements was obtained (procedure 6).

The slurry obtained by the procedure 6 was washed until the electrical conductivity became 15 mS/m or less, whereby a washed slurry according to Comparative Example 1 was obtained. To the obtained washed slurry, a 1 mass % sulfuric acid aqueous solution was added to adjust the pH to 6.5 and aggregate substitution-type ε-iron oxide particles, followed by filtration through a membrane filter, and the solid was collected and then dried, whereby an iron-based oxide magnetic powder according to Comparative Example 1 was obtained. This iron-based oxide magnetic powder had a coercive force of 177 kA/m, a saturation magnetization of 17.9 Am$^2$/kg, a square ratio of 0.522, an SFD of 1.00, and an $I_L/I_H$ value of 0.41.

As a result of subjecting the obtained iron-based oxide magnetic powder according to Comparative Example 1 to TEM observation by the same procedure as in Example 1, the TEM average particle diameter was 16.6 nm, the number ratio of particles with a particle diameter of 8 nm or less was 0.0%, the number ratio of particles with a particle diameter of 20 nm or more was 14.9%, the coefficient of variation (CV value) was 20%, and the average circularity of the particles was 0.972. In FIG. 5, a TEM photograph of the iron-based oxide magnetic powder obtained in this Comparative Example is shown. Note that the length indicated by the white horizontal line displayed in the lower right of the TEM photograph is 100 nm. In addition, a compositional analysis was performed, and the molar compositional ratio of each metal element was calculated when the total amount of iron and the substituent metal elements was set to 2 mol. The above-mentioned production conditions are shown in Tables 1 and 2, and the measurement results for the obtained iron-based oxide magnetic powders are shown in Tables 3 and 4

Comparative Example 2

In a 5 L reaction vessel, 291.32 g of ferric(III) nitrate nonahydrate with a purity of 99.4%, 80.18 g of a gallium(III) nitrate solution with a Ga concentration of 10.1%, 6.58 g of cobalt(II) nitrate hexahydrate with a purity of 97%, and 7.14 g of titanium(IV) sulfate n-hydrate with a Ti concentration of 14.7% were dissolved in 3214.78 g of pure water while mechanically stirring with a stirring blade in an air atmosphere under the condition of 40° C. The molar ratio of metal ions in the preparation solution is as follows: Fe:Ga:Co:Ti=1.635:0.265:0.050:0.050. Note that the number in parentheses after the reagent name indicates the valence of the metal element.

While mechanically stirring with a stirring blade at 40° C. in an air atmosphere, 166.29 g of a 21.2% ammonia solution was added thereto all at once so that the pH after neutralization became 1.0 or higher and 3.0 or lower, and stirring was continued for 2 hours. The mixture was a brown turbid liquid at the beginning of addition, but after 2 hours, the liquid turned into a transparent brown reaction solution, and the pH thereof was 1.96.

Subsequently, 252.66 g of a citric acid solution with a citric acid concentration of 10 mass % was continuously added thereto over 1 hour under the condition of 40° C., and thereafter, 200 g of a 10 mass % ammonia solution was added thereto all at once so that the pH became 7.0 or higher and 10.0 or lower, thereby adjusting the pH to 8.47, and then, the resulting mixture was held for 1 hour while stirring under the condition of temperature of 40° C., whereby crystals of an iron oxyhydroxide containing substituent elements of a precursor, which is an intermediate product, were generated (procedure 1). Note that the molar ratio with respect to the total amount of the trivalent iron ions and the ions of the metal M that partially substitutes the Fe sites: O/(Fe+M) is 0.15. The slurry containing the iron oxyhydroxide crystals obtained by the procedure 1 was dropped onto a collodion film on a grid and adhered thereto, and then, naturally dried. Thereafter, carbon vapor deposition was performed, and the resultant was subjected to TEM observation. In FIG. 6, a TEM photograph of the precursor particles (the particles of the substituent element-containing iron oxyhydroxide) obtained in this Comparative Example is shown. Note that the length indicated by the white horizontal line displayed in the lower right of the TEM photograph is 100 nm. In addition, when the slurry obtained by the procedure 1 was subjected to measurement of the DLS average diameter of the precursor particles, the result was above the allowable measurement range (up to 500 nm), and the DLS average diameter could not be measured.

Thereafter, while stirring at 30° C. in an air atmosphere, to the precursor slurry obtained by the procedure 1, 488.13 g of tetraethoxysilane was added over 35 minutes. Stirring was continued as such for about 1 day while maintaining the temperature at 30° C. to carry out coating with a silanol derivative generated by hydrolysis. Thereafter, a solution obtained by dissolving 194.7 g of ammonium sulfate in 300 g of pure water was added thereto, and the resulting solution was washed and subjected to solid-liquid separation, and the product was collected as a cake (procedure 2).

After the precipitate (the precursor coated with SiO$_2$ in a gel form) obtained by the procedure 2 was dried, the resulting dry powder was subjected to a heat treatment at 1070° C. for 4 hours in a furnace with an air atmosphere, whereby an iron-based oxide magnetic particle powder coated with silicon oxide was obtained. Note that the silanol derivative turns into an oxide when it is subjected to a heat treatment in an air atmosphere (procedure 3).

The heat-treated powder obtained by the procedure 3 was stirred at about 70° C. for 24 hours in a 20 mass % NaOH aqueous solution to carry out a treatment of removing the silicon oxide on the surfaces of the particles. Subsequently, washing was performed until the electrical conductivity of the washed slurry became 15 mS/m or less, and after drying, the resultant was subjected to a chemical analysis of the composition, XRD measurement, TEM observation, measurement of the magnetic properties, and the like.

The chemical composition of the obtained iron-based oxide magnetic particle powder was substantially the same as the composition at the time of preparation although the content of Fe slightly increased and the content of Ga slightly decreased.

As a result of subjecting the iron-based oxide magnetic particle powder obtained in this Comparative Example to TEM observation by the same procedure as in Example 1, the average particle diameter was 16.6 nm and the coefficient of variation (CV value) was 40.2%. In FIG. 7, a TEM photograph of the iron-based oxide magnetic particle powder obtained in this Comparative Example is shown. In a differential B-H curve, two peaks were clearly observed, and the SFD determined based on the half width of the peak of the high Hc component was 0.89, and the ratio of the low Hc component $I_L/I_H$ was 0.50.

Comparative Example 3

In a 5 L reaction vessel, 465.93 g of ferric(III) nitrate nonahydrate with a purity of 99.7%, 152.80 g of a gallium (III) nitrate solution with a Ga concentration of 12.0 mass %, 15.78 g of cobalt(II) nitrate hexahydrate with a purity of 97%, and 11.91 g of a titanium(IV) sulfate solution with a Ti concentration of 15.1 mass % were dissolved in 2453.58 g of pure water while mechanically stirring with a stirring blade in an air atmosphere under the condition of 40° C. The molar ratio of metal ions in the preparation solution is as follows: Fe:Ga:Co:Ti 1.530:0.350:0.070:0.050.

While mechanically stirring with a stirring blade at 40° C. in an air atmosphere, 268.52 g of a 22.4% ammonia aqueous solution was added thereto all at once, and stirring was continued for 2 hours (first neutralization step). The mixture was a brown turbid liquid at the beginning of addition, but after 2 hours, the liquid turned into a transparent brown reaction solution, and the pH thereof was 1.9.

Subsequently, as a hydroxycarboxylic acid, 288.75 g of a citric acid solution with a citric acid concentration of 20 mass % was continuously added thereto over 1 hour under the condition of 40° C. (hydroxycarboxylic acid addition step), and thereafter, 152.86 g of a 22.4% ammonia solution was added thereto all at once, and then, the resulting mixture was held for 1 hour while stirring under the condition of temperature of 40° C., whereby crystals of an iron oxyhydroxide containing substituent elements of a precursor, which is an intermediate product, were generated (procedure 1, second neutralization step). The pH after adding 152.86 g of the ammonia solution all at once was 8.6.

Thereafter, while stirring at 40° C. in an air atmosphere, to the precursor slurry obtained by the procedure 1, 416.89 g of tetraethoxysilane (TEOS) was added over 35 minutes. Stirring was continued as such for about 1 day to carry out coating with a hydrolysate of the silane compound generated by hydrolysis. Thereafter, the obtained solution was washed and subjected to solid-liquid separation, and the product was collected as a cake (procedure 2).

After the precipitate (the precursor coated with $SiO_2$ in a gel form) obtained by the procedure 2 was dried, the resulting dry powder was subjected to a heat treatment at 971° C. for 4 hours in a furnace with an air atmosphere, whereby a powder of substitution-type ε-iron oxide coated with silicon oxide was obtained. Note that the hydrolysate of the silane compound turns into an oxide when it is subjected to a heat treatment in an air atmosphere (procedure 3).

The powder of substitution-type ε-iron oxide coated with silicon oxide obtained by the procedure 3 was stirred at about 60° C. for 24 hours in a 20 mass % NaOH aqueous solution so as to carry out a treatment of removing the silicon oxide on the surfaces of the particles, whereby a slurry containing iron-based oxide particles was obtained (procedure 4).

When transmission electron microscope observation was performed for the slurry obtained by the procedure 4, the TEM average particle diameter was 17.8 nm and the coefficient of variation (CV value) was 39%.

The slurry obtained by the procedure 4 was washed until the electrical conductivity became 15 mS/m or less, whereby a washed slurry according to Comparative Example 1 was obtained. To the obtained washed slurry, a 1 mass % sulfuric acid aqueous solution was added to adjust the pH to 6.5 and aggregate substitution-type ε-iron oxide particles, followed by filtration through a membrane filter, and the solid was collected and then dried, whereby an iron-based oxide magnetic powder before a classification treatment was obtained. This iron-based oxide magnetic powder before classification had a coercive force of 171 (kA/m), a saturation magnetization of 15.7 ($Am^2$/kg), a square ratio of 0.433, an SFD of 1.40, an value of 0.82, and a BET specific surface area of 85.5 $m^2$/g.

Subsequently, to the washed slurry, a 25 mass % tetramethylammonium hydroxide (hereinafter referred to as TMAOH) aqueous solution was added as a surface modifier, whereby a surface modifier-containing slurry according to Comparative Example 3 was obtained. The addition amount of the TMAOH aqueous solution was set so that the TMAOH concentration in the surface modifier-containing slurry became 0.065 mol/kg. In this case, the pH of the slurry became 13.

40 g of the obtained surface modifier-containing slurry was subjected to an ultrasonic dispersion treatment for 1 hour with an ultrasonic cleaner (Yamato 5510 Branson, manufactured by (Yamato Scientific) Co., Ltd.), and then subjected to a centrifugation treatment at a rotation speed of 20,000 rpm for 15 minutes with an R20A2 rotor of a centrifuge (himac CR21GII, manufactured by Hitachi Koki Co., Ltd.), and 33 g of a supernatant containing fine particles was removed and a precipitate was obtained. The gravitational acceleration in the centrifugation treatment was set to 48,000 G. Further, when the average secondary particle diameter (DLS particle diameter) of the iron-based oxide in the surface modifier-containing slurry after performing the ultrasonic treatment was measured, it was 29 nm.

Thereafter, for the obtained precipitate, the operation of addition of 33 g of a 0.065 mol/kg TMAOH aqueous solution, the above-mentioned ultrasonic dispersion treatment, the above-mentioned centrifugation treatment, and removal of 33 g of a supernatant was repeated 9 times, whereby a slurry of an iron-based oxide magnetic powder according to Comparative Example 3 was obtained.

When TEM observation was performed for the obtained slurry of the iron-based oxide magnetic powder according to Comparative Example 3, the TEM average particle diameter was 18.8 nm and the coefficient of variation (CV value) was 29%. The TEM observation for the slurry refers to dropping the slurry onto a collodion film on a grid and adhering the slurry thereto, followed by natural drying and then carbon vapor deposition, and subjecting the resultant to TEM observation. In FIG. 1, a TEM photograph of the iron-based oxide magnetic powder obtained in this Example is shown. Note that the length indicated by the white vertical line displayed in the center on the left side of the TEM photograph is 100 nm.

To the obtained slurry of the iron-based oxide magnetic powder according to Comparative Example 3, 33 g of pure water was added, and a 1 mass % sulfuric acid aqueous solution was added thereto to adjust the pH to 6.5, followed by membrane filtration, and the cake was collected and then dried, whereby an iron-based oxide magnetic powder according to Comparative Example 3 was obtained.

When the chemical composition of the obtained iron-based oxide magnetic powder was calculated so that the sum of the molar ratios of Fe, Ga, Co, and Ti becomes 2.0, it was as shown in Table 1. Further, the value was 0.25.

Example 10

As a raw material solution, 1013 g of an aqueous solution with an Fe(III) concentration of 1.112 mol/kg and a chloride ion concentration of 3.337 mol/kg was prepared. Subsequently, in a 5 L reaction vessel, 1603 g of an aqueous solution with an Fe(III) concentration of 0.234 mol/kg and a chloride ion concentration of 0.703 mol/kg was placed, and the liquid temperature was adjusted to 30° C. while mechanically stirring with a stirring blade. Subsequently, while continuing stirring and keeping the liquid temperature at 40° C., the raw material solution and a 3.337 mol/kg ammonia aqueous solution were simultaneously added into the aqueous solution, and thereafter, stirring was performed for 60 minutes while keeping the liquid temperature at 30° C., whereby a colloidal solution was obtained (procedure 1, first neutralization step). Here, the raw material aqueous solution was continuously added over 240 minutes at an addition rate of 4.2 g/min, and the ammonia aqueous solution was continuously added over 240 minutes at an addition rate of 4.2 g/min. While adding the raw material aqueous solution and the ammonia aqueous solution, the ratio of the cumulative addition amount of the alkali to the total cumulative addition amount of the acid group contained in the raw material solution is 1.0 equivalents. The pH of the obtained colloidal solution was 2.3.

Subsequently, to the colloidal solution obtained by the procedure 1, 289 g of a citric acid solution with a citric acid concentration of 1.041 mol/kg as a hydroxycarboxylic acid was continuously added over 60 minutes under the condition of 30° C. (hydroxycarboxylic acid addition step), and thereafter, 189 g of a 12.864 mol/kg ammonia solution was added thereto all at once, and then, the resulting mixture was held for 10 minutes while stirring under the condition of temperature of 30° C., whereby a slurry of a precursor, which is an intermediate product, was obtained (procedure 2, second neutralization step). The pH after adding 189 g of the ammonia solution all at once was 9.2.

The precursor slurry obtained by the procedure 2 was collected and washed with an ultrafiltration membrane and a membrane having a UF molecular weight cut-off of 50,000 until the electrical conductivity of the filtrate became 30 mS/m or less (procedure 3).

When the DLS average diameter of the precursor particles contained in the washed slurry obtained by the procedure 3 was measured, the DLS average diameter thereof was 127.8 nm.

Subsequently, 857 g of the washed slurry obtained by the procedure 3 was taken out, and pure water was added thereto to give a total amount of 950 g. The temperature was adjusted to 40° C. while stirring, and 1171 g of ethanol was added thereto, followed by stirring for 5 minutes, and thereafter, 260 g of a 21.92 mass % ammonia aqueous solution was added thereto. Further, 1028 g of tetraethoxysilane (TEAS) as a silicon compound having a hydrolyzable group was added thereto over 35 minutes. Thereafter, while keeping the liquid temperature at 40° C., stirring was continued as such for 1 hour to carry out coating with a hydrolysate of the silicon compound. Thereafter, the obtained solution was washed and subjected to solid-liquid separation, and the product was collected as a cake (procedure 4).

After the cake (the precursor coated with the hydrolysate in a gel form) obtained by the procedure 4 was dried, the resulting dry powder was subjected to a heat treatment at 1130° C. for 4 hours in a furnace with an air atmosphere, whereby a powder of iron oxide containing substituent metal elements and coated with silicon oxide was obtained. Note that the hydrolysate of the silicon compound turns into an oxide when it is subjected to a heat treatment in an air atmosphere (procedure 5).

The powder of iron oxide containing substituent metal elements and coated with silicon oxide obtained by the procedure 5 was placed in a 20 mass % NaOH aqueous solution with a liquid temperature of 60° C. and stirred for 24 hours so as to carry out a treatment of removing the silicon oxide on the surfaces of the particles, whereby a slurry containing particles of ε-iron oxide was obtained (procedure 6).

The slurry obtained by the procedure 6 was washed until the electrical conductivity became 15 mS/m or less. Subsequently, to the washed slurry, a 35 mass % TEAOH aqueous solution was added as a surface modifier, whereby a surface modifier-containing slurry with a solid content of 5.0% was obtained. Here, the addition amount of the TEAOH aqueous solution was set so that the TEAOH concentration in the surface modifier-containing slurry became 0.099 mol/kg. In this case, the pH of the slurry became 13.

40 g of the obtained surface modifier-containing slurry was subjected to an ultrasonic dispersion treatment for 1 hour with an ultrasonic cleaner (Yamato 5510 Branson, manufactured by (Yamato Scientific) Co., Ltd.), and then subjected to a centrifugation treatment at a rotation speed of 20,000 rpm for 60 minutes with an R20A2 rotor of a centrifuge (himac CR21GII, manufactured by Hitachi Koki Co., Ltd.), and 30 g of a supernatant slurry containing fine particles was removed and a slurry on the precipitate side was obtained. The gravitational acceleration in the centrifugation treatment was set to 48,000 G. For the obtained slurry on the precipitate side, the operation of addition of 30 g of a 0.099 mol/kg TEAOH aqueous solution, ultrasonic dispersion, a centrifugation treatment at 20,000 rpm and 48,000 G for 60 minutes, and removal of 30 g of a supernatant slurry was repeated further 9 times, whereby a slurry on the precipitate side was obtained.

After 30 g of a 0.099 mol/kg TEAOH aqueous solution was added to 10 g of the obtained slurry on the precipitate side, the resulting mixture was subjected to an ultrasonic dispersion treatment for 1 hour with an ultrasonic cleaner (Yamato 5510 Branson, manufactured by (Yamato Scientific) Co., Ltd.), and then subjected to a centrifugation treatment at a rotation speed of 20,000 rpm for 50 minutes with an R20A2 rotor of a centrifuge (himac CR21GII, manufactured by Hitachi Koki Co., Ltd.), and 30 g of a supernatant slurry containing fine particles was removed, and a slurry on the precipitate side was obtained. The gravitational acceleration in the centrifugation treatment was set to 48,000 G. For the obtained slurry on the precipitate side, the operation of addition of 30 g of a 0.099 mol/kg TEAOH aqueous solution, ultrasonic dispersion, a centrifugation treatment at 20,000 rpm and 48,000 G for 50 minutes, and removal of 30 g of a supernatant slurry was repeated further times, whereby a slurry on the precipitate side was obtained.

After 30 g of a 0.099 mol/kg TEAOH aqueous solution was added to 10 g of the obtained slurry on the precipitate side, the resulting mixture was subjected to an ultrasonic dispersion treatment for 1 hour with an ultrasonic cleaner (Yamato 5510 Branson, manufactured by (Yamato Scientific) Co., Ltd.), and then subjected to a centrifugation treatment at a rotation speed of 20,000 rpm for 40 minutes with an R20A2 rotor of a centrifuge (himac CR21GII, manufactured by Hitachi Koki Co., Ltd.), and 30 g of a supernatant slurry was collected. The gravitational acceleration in the centrifugation treatment was set to 48,000 G. For an obtained slurry on the precipitate side, the operation of addition of 30 g of a 0.099 mol/kg TEAOH aqueous solution, ultrasonic dispersion, a centrifugation treatment at 20,000 rpm and 48,000 G for 40 minutes, and collection of 30 g of a supernatant slurry was repeated further 9 times, whereby a total of 300 g of the supernatant slurry was collected. To the collected supernatant slurry, a 1 mass % sulfuric acid aqueous solution was added to adjust the pH to 6.5 and aggregate substitution-type ε-iron oxide particles, followed by filtration through a membrane filter, and the solid was collected and then dried, whereby an iron-based oxide magnetic powder according to Example 10 was obtained.

The obtained iron-based oxide magnetic powder had a coercive force of 560 (kA/m), a saturation magnetization of 12.8 (Am$^2$/kg), a square ratio of 0.544, an SFD of 1.99, and an $I_L/I_H$ value of 0.47. Further, the obtained iron-based oxide magnetic powder was dispersed in pure water using an ultrasonic disperser to prepare a slurry, and the prepared slurry was dropped onto a collodion film on a grid and adhered thereto, and then, naturally dried. Thereafter, carbon vapor deposition was performed, and the resultant was subjected to TEM observation. As a result of measuring 200 particles by TEM observation, the TEM average particle diameter was 10.3 nm, the number ratio of particles with a particle diameter of 8 nm or less was 1.2%, the number ratio of particles with a particle diameter of 20 nm or more was 0.0%, the coefficient of variation (CV value) was 9%, and the average circularity of the particles was 0.970. In addition, evaluation of compositional analysis was performed, and the molar compositional ratio of each metal element was calculated when the total amount of iron and the substituent metal elements was set to 2 mol.

Example 11

As a raw material solution, 1019 g of an aqueous solution with an Fe(III) concentration of 1.056 mol/kg, Co(II) concentration of 0.066 mol/kg, a chloride ion concentration of 3.167 mol/kg, and a nitrate ion concentration of 0.133 mol/kg was prepared. Subsequently, in a 5 L reaction vessel, 1598 g of an aqueous solution with an Fe(III) concentration of 0.225 mol/kg and a chloride ion concentration of 0.674 mol/kg was placed, and the liquid temperature was adjusted to 40° C. while mechanically stirring with a stirring blade. Subsequently, while continuing stirring and keeping the liquid temperature at 40° C., the raw material solution and a 3.267 mol/kg ammonia aqueous solution were simultaneously added into the aqueous solution, and thereafter, stirring was performed for 60 minutes while keeping the liquid temperature at 40° C., whereby a colloidal solution was obtained (procedure 1, first neutralization step). Here, the raw material aqueous solution was continuously added over 240 minutes at an addition rate of 4.2 g/min, and the ammonia aqueous solution was continuously added over 240 minutes at an addition rate of 4.2 g/min. While adding the raw material aqueous solution and the ammonia aqueous solution, the ratio of the cumulative addition amount of the alkali to the total cumulative addition amount of the acid group contained in the raw material solution is 0.99 equivalents. The pH of the obtained colloidal solution was 2.1.

Subsequently, to the colloidal solution obtained by the procedure 1, 289 g of a citric acid solution with a citric acid concentration of 1.041 mol/kg as a hydroxycarboxylic acid was continuously added over 60 minutes under the condition of 40° C. (hydroxycarboxylic acid addition step), and thereafter, 194 g of a 12.347 mol/kg ammonia solution was added thereto all at once, and then, the resulting mixture was held for 10 minutes while stirring under the condition of temperature of 40° C., whereby a slurry of a precursor, which is an intermediate product, was obtained (procedure 2, second neutralization step). The pH after adding 194 g of the ammonia solution all at once was 9.2.

The precursor slurry obtained by the procedure 2 was collected and washed with an ultrafiltration membrane and a membrane having a UF molecular weight cut-off of 50,000 until the electrical conductivity of the filtrate became 30 mS/m or less (procedure 3).

When the DLS average diameter of the precursor particles contained in the washed slurry obtained by the procedure 3 was measured, the DLS average diameter thereof was 147.1 nm.

Subsequently, 894 g of the washed slurry obtained by the procedure 3 was taken out, and pure water was added thereto to give a total amount of 950 g. The temperature was adjusted to 40° C. while stirring, and 1171 g of ethanol was added thereto, followed by stirring for 5 minutes, and thereafter, 271 g of a 21.04 mass % ammonia aqueous solution was added thereto. Further, 1028 g of tetraethoxysilane (TEOS) as a silicon compound having a hydrolyzable group was added thereto over 35 minutes. Thereafter, while keeping the liquid temperature at 40° C., stirring was continued as such for 1 hour to carry out coating with a hydrolysate of the silicon compound. Thereafter, the obtained solution was washed and subjected to solid-liquid separation, and the product was collected as a cake (procedure 4).

After the cake (the precursor coated with the hydrolysate in a gel form) obtained by the procedure 4 was dried, the resulting dry powder was subjected to a heat treatment at 1130° C. for 4 hours in a furnace with an air atmosphere, whereby a powder of iron oxide containing substituent metal elements and coated with silicon oxide was obtained. Note that the hydrolysate of the silicon compound turns into an oxide when it is subjected to a heat treatment in an air atmosphere (procedure 5).

The powder of iron oxide containing substituent metal elements and coated with silicon oxide obtained by the procedure 5 was placed in a 20 mass % NaOH aqueous solution with a liquid temperature of 60° C. and stirred for 24 hours so as to carry out a treatment of removing the silicon oxide on the surfaces of the particles, whereby a slurry containing particles of ε-iron oxide in which Fe sites were partially substituted by other metal elements was obtained (procedure 6).

The slurry obtained by the procedure 6 was washed until the electrical conductivity became 15 mS/m or less.

Subsequently, to the washed slurry, a 35 mass % TEAOH aqueous solution was added as a surface modifier, whereby a surface modifier-containing slurry with a solid content of 3.1% was obtained. Here, the addition amount of the TEAOH aqueous solution was set so that the TEAOH concentration in the surface modifier-containing slurry became 0.099 mol/kg. In this case, the pH of the slurry became 13.

40 g of the obtained surface modifier-containing slurry was subjected to an ultrasonic dispersion treatment for 1 hour with an ultrasonic cleaner (Yamato 5510 Branson, manufactured by (Yamato Scientific) Co., Ltd.), and then subjected to a centrifugation treatment at a rotation speed of 20,000 rpm for 30 minutes with an R20A2 rotor of a centrifuge (himac CR21GII, manufactured by Hitachi Koki Co., Ltd.), and 30 g of a supernatant slurry was collected. The gravitational acceleration in the centrifugation treatment was set to 48,000 G. For an obtained slurry on the precipitate side, the operation of addition of 30 g of a 0.099 mol/kg TEAOH aqueous solution, ultrasonic dispersion, a centrifugation treatment at 20,000 rpm and 48,000 G for 30 minutes, and collection of 30 g of a supernatant slurry was repeated further 9 times, whereby a total of 300 g of the supernatant slurry was collected. After 300 g of the collected supernatant slurry was mixed, 40 g thereof was taken out.

40 g of the taken out supernatant slurry was subjected to a centrifugation treatment at a rotation speed of 16,000 rpm for 30 minutes with an R20A2 rotor of a centrifuge (himac CR21GII, manufactured by Hitachi Koki Co., Ltd.), and 30 g of a supernatant slurry was collected. The gravitational acceleration in the centrifugation treatment was set to 31,000 G. For an obtained slurry on the precipitate side, the operation of addition of 30 g of a 0.099 mol/kg TEAOH aqueous solution, ultrasonic dispersion, a centrifugation treatment at 16,000 rpm and 31,000 G for 30 minutes, and collection of 30 g of a supernatant slurry was repeated further 9 times, whereby a total of 300 g of the supernatant slurry was collected. After 300 g of the collected supernatant slurry was mixed, 40 g thereof was taken out.

40 g of the taken out supernatant slurry was subjected to a centrifugation treatment at a rotation speed of 18,000 rpm for 30 minutes with an R20A2 rotor of a centrifuge (himac CR21GII, manufactured by Hitachi Kaki Co., Ltd.), and 30 g of a supernatant slurry containing fine particles was removed and a slurry on the precipitate side was obtained. The gravitational acceleration in the centrifugation treatment was set to 39,000 G. For the slurry on the precipitate side, the operation of addition of 30 g of a 0.099 mol/kg TEAOH aqueous solution, ultrasonic dispersion, a centrifugation treatment at 18,000 rpm and 39,000 G for 30 minutes, and removal of 30 g of a supernatant slurry was repeated further times, whereby a slurry on the precipitate side was obtained. To the obtained slurry on the precipitate side, a 1 mass % sulfuric acid aqueous solution was added to adjust the pH to 6.5 and aggregate substitution-type ε-iron oxide particles, followed by filtration through a membrane filter, and the solid was collected and then dried, whereby an iron-based oxide magnetic powder according to Example 11 was obtained.

The obtained iron-based oxide magnetic powder had a coercive force of 875 (kA/m), a saturation magnetization of 20.6 ($Am^2/kg$), a square ratio of 0.502, an SFD of 1.66, and an $I_L/I_H$ value of 0.50. Further, the obtained iron-based oxide magnetic powder was dispersed in pure water using an ultrasonic disperser to prepare a slurry, and the prepared slurry was dropped onto a collodion film on a grid and adhered thereto, and then, naturally dried. Thereafter, carbon vapor deposition was performed, and the resultant was subjected to TEM observation. As a result of measuring 200 particles by TEM observation, the TEM average particle diameter was 16.5 nm, the number ratio of particles with a particle diameter of 8 nm or less was 0.5%, the number ratio of particles with a particle diameter of 20 nm or more was 3.0%, the coefficient of variation (CV value) was 12%, and the average circularity of the particles was 0.966. In addition, evaluation of compositional analysis was performed, and the molar compositional ratio of each metal element was calculated when the total amount of iron and the substituent metal elements was set to 2 mol.

Example 12

As a raw material solution, 1021 g of an aqueous solution with an Fe(III) concentration of 1.055 mol/kg, a Ti(IV) concentration of 0.066 mol/kg, and a chloride ion concentration of 3.332 mol/kg was prepared. Subsequently, in a 5 L reaction vessel, 1598 g of an aqueous solution with an Fe(III) concentration of 0.225 mol/kg and a chloride ion concentration of 0.674 mol/kg was placed, and the liquid temperature was adjusted to 40° C. while mechanically stirring with a stirring blade. Subsequently, while continuing stirring and keeping the liquid temperature at 40° C., the raw material solution and a 3.290 mol/kg ammonia aqueous solution were simultaneously added into the aqueous solution, and thereafter, stirring was performed for 60 minutes while keeping the liquid temperature at 40° C., whereby a colloidal solution was obtained (procedure 1, first neutralization step). Here, the raw material aqueous solution was continuously added over 240 minutes at an addition rate of 4.3 g/min, and the ammonia aqueous solution was continuously added over 240 minutes at an addition rate of 4.3 g/min. While adding the raw material aqueous solution and the ammonia aqueous solution, the ratio of the cumulative addition amount of the alkali to the total cumulative addition amount of the acid group contained in the raw material solution is 0.99 equivalents. The pH of the obtained colloidal solution was 1.8.

Subsequently, to the colloidal solution obtained by the procedure 1, 289 g of a citric acid solution with a citric acid concentration of 1.041 mol/kg as a hydroxycarboxylic acid was continuously added over 60 minutes under the condition of 40° C. (hydroxycarboxylic acid addition step), and thereafter, 196 g of a 12.347 mol/kg ammonia solution was added thereto all at once, and then, the resulting mixture was held for 10 minutes while stirring under the condition of temperature of 40° C., whereby a slurry of a precursor, which is an intermediate product, was obtained (procedure 2, second neutralization step). The pH after adding 196 g of the ammonia solution all at once was 9.1.

The precursor slurry obtained by the procedure 2 was collected and washed with an ultrafiltration membrane and a membrane having a UF molecular weight cut-off of 50,000 until the electrical conductivity of the filtrate became 30 mS/m or less (procedure 3).

When the DLS average diameter of the precursor particles contained in the washed slurry obtained by the procedure 3 was measured, the DLS average diameter thereof was 36.1 nm.

Subsequently, 882 g of the washed slurry obtained by the procedure 3 was taken out, and pure water was added thereto to give a total amount of 950 g. The temperature was adjusted to 40° C. while stirring, and 1171 g of ethanol was added thereto, followed by stirring for 5 minutes, and thereafter, 271 g of a 21.04 mass % ammonia aqueous solution was added thereto. Further, 1028 g of tetraethoxysilane (TEOS) as a silicon compound having a hydrolyzable group was added thereto over 35 minutes. Thereafter, while keeping the liquid temperature at 40° C., stirring was continued as such for 1 hour to carry out coating with a hydrolysate of the silicon compound. Thereafter, the obtained solution was washed and subjected to solid-liquid separation, and the product was collected as a cake (procedure 4).

After the cake (the precursor coated with the hydrolysate in a gel form) obtained by the procedure 4 was dried, the resulting dry powder was subjected to a heat treatment at 1130° C. for 4 hours in a furnace with an air atmosphere, whereby a powder of iron oxide containing substituent metal elements and coated with silicon oxide was obtained. Note that the hydrolysate of the silicon compound turns into an oxide when it is subjected to a heat treatment in an air atmosphere (procedure 5).

The powder of iron oxide containing substituent metal elements and coated with silicon oxide obtained by the procedure 5 was placed in a 20 mass % NaOH aqueous solution with a liquid temperature of 60° C. and stirred for 15 hours so as to carry out a treatment of removing the silicon oxide on the surfaces of the particles, whereby a slurry containing particles of ε-iron oxide in which Fe sites were partially substituted by other metal elements was obtained (procedure 6).

The slurry obtained by the procedure 6 was washed until the electrical conductivity became 15 mS/m or less.

Subsequently, to the washed slurry, a 35 mass % TEAOH aqueous solution was added as a surface modifier, whereby a surface modifier-containing slurry with a solid content of 3.1% was obtained. Here, the addition amount of the TEAOH aqueous solution was set so that the TEAOH concentration in the surface modifier-containing slurry became 0.099 mol/kg. In this case, the pH of the slurry became 13.

40 g of the obtained surface modifier-containing slurry was subjected to an ultrasonic dispersion treatment for 1 hour with an ultrasonic cleaner (Yamato 5510 Branson, manufactured by (Yamato Scientific) Co., Ltd.), and then subjected to a centrifugation treatment at a rotation speed of 20,000 rpm for 30 minutes with an R20A2 rotor of a centrifuge (himac CR21GII, manufactured by Hitachi Koki Co., Ltd.), and 30 g of a supernatant slurry was collected. The gravitational acceleration in the centrifugation treatment was set to 48,000 G. For an obtained slurry on the precipitate side, the operation of addition of 30 g of a 0.099 mol/kg TEAOH aqueous solution, ultrasonic dispersion, a centrifugation treatment at 20,000 rpm and 48,000 G for 30 minutes, and collection of 30 g of a supernatant slurry was repeated further 9 times, whereby a total of 300 g of the supernatant slurry was collected. After 300 g of the collected supernatant slurry was mixed, 40 g thereof was taken out.

40 g of the taken out supernatant slurry was subjected to a centrifugation treatment at a rotation speed of 16,000 rpm for 30 minutes with an R20A2 rotor of a centrifuge (himac CR21GII, manufactured by Hitachi Koki Co., Ltd.), and 30 g of a supernatant slurry was collected. The gravitational acceleration in the centrifugation treatment was set to 31,000 G. For an obtained slurry on the precipitate side, the operation of addition of 30 g of a 0.099 mol/kg TEAOH aqueous solution, ultrasonic dispersion, a centrifugation treatment at 16,000 rpm and 31,000 G for 30 minutes, and collection of 30 g of a supernatant slurry was repeated further 9 times, whereby a total of 300 g of the supernatant slurry was collected. After 300 g of the collected supernatant slurry was mixed, 40 g thereof was taken out.

40 g of the taken out supernatant slurry was subjected to a centrifugation treatment at a rotation speed of 18,000 rpm for 30 minutes with an R20A2 rotor of a centrifuge (himac CR21GII, manufactured by Hitachi Koki Co., Ltd.), and 30 g of a supernatant slurry containing fine particles was removed and a slurry on the precipitate side was obtained. The gravitational acceleration in the centrifugation treatment was set to 39,000 G. For the slurry on the precipitate side, the operation of addition of 30 g of a 0.099 mol/kg TEAOH aqueous solution, ultrasonic dispersion, a centrifugation treatment at 18,000 rpm and 39,000 G for 30 minutes, and removal of 30 g of a supernatant slurry was repeated further times, whereby a slurry on the precipitate side was obtained. To the obtained slurry on the precipitate side, a 1 mass % sulfuric acid aqueous solution was added to adjust the pH to 6.5 and aggregate substitution-type ε-iron oxide particles, followed by filtration through a membrane filter, and the solid was collected and then dried, whereby an iron-based oxide magnetic powder according to Example 12 was obtained.

The obtained iron-based oxide magnetic powder had a coercive force of 1267 (kA/m), a saturation magnetization of 16.0 (Am$^2$/kg), a square ratio of 0.546, an SFD of 0.50, and an $I_r/IN$ value of 0.12. Further, the obtained iron-based oxide magnetic powder was dispersed in pure water using an ultrasonic disperser to prepare a slurry, and the prepared slurry was dropped onto a collodion film on a grid and adhered thereto, and then, naturally dried. Thereafter, carbon vapor deposition was performed, and the resultant was subjected to TEM observation. As a result of measuring 200 particles by TEM observation, the TEM average particle diameter was 15.9 nm, the number ratio of particles with a particle diameter of 8 nm or less was 0.0%, the number ratio of particles with a particle diameter of 20 nm or more was 1.6%, the coefficient of variation (CV value) was 12%, and the average circularity of the particles was 0.974. In addition, evaluation of compositional analysis was performed, and the molar compositional ratio of each metal element was calculated when the total amount of iron and the substituent metal elements was set to 2 mol.

Example 13

As a raw material solution, 1018 g of an aqueous solution with an Fe(III) concentration of 1.045 mol/kg, a Co(II) concentration of 0.050 mol/kg, a Ti(IV) concentration of 0.033 mol/kg, a chloride ion concentration of 3.219 mol/kg, and a nitrate ion concentration of 0.100 mol/kg was prepared. Subsequently, in a 5 L reaction vessel, 1597 g of an aqueous solution with an Fe(III) concentration of 0.222 mol/kg and a chloride ion concentration of 0.666 mol/kg was placed, and the liquid temperature was adjusted to 40° C. while mechanically stirring with a stirring blade. Subsequently, while continuing stirring and keeping the liquid temperature at 40° C., the raw material solution and a 3.272 mol/kg ammonia aqueous solution were simultaneously added into the aqueous solution, and thereafter, stirring was performed for 60 minutes while keeping the liquid temperature at 40° C., whereby a colloidal solution was obtained (procedure 1, first neutralization step). Here, the raw material aqueous solution was continuously added over 240 minutes at an addition rate of 4.2 g/min, and the ammonia aqueous solution was continuously added over 240 minutes at an addition rate of 4.2 g/min. While adding the raw material aqueous solution and the ammonia aqueous solution, the ratio of the cumulative addition amount of the alkali to the total cumulative addition amount of the acid group contained in the raw material solution is 0.99 equivalents. The pH of the obtained colloidal solution was 1.6.

Subsequently, to the colloidal solution obtained by the procedure 1, 289 g of a citric acid solution with a citric acid concentration of 1.041 mol/kg as a hydroxycarboxylic acid was continuously added over 60 minutes under the condition of 40° C. (hydroxycarboxylic acid addition step), and thereafter, 196 g of a 12.512 mol/kg ammonia solution was added thereto all at once, and then, the resulting mixture was held for 10 minutes while stirring under the condition of temperature of 40° C., whereby a slurry of a precursor, which is an intermediate product, was obtained (procedure 2, second neutralization step). The pH after adding 196 g of the ammonia solution all at once was 8.8.

The precursor slurry obtained by the procedure 2 was collected and washed with an ultrafiltration membrane and a membrane having a UF molecular weight cut-off of 50,000 until the electrical conductivity of the filtrate became 30 mS/m or less (procedure 3).

When the DLS average diameter of the precursor particles contained in the washed slurry obtained by the procedure 3 was measured, the DLS average diameter thereof was 38.7 nm.

Subsequently, 852 g of the washed slurry obtained by the procedure 3 was taken out, and pure water was added thereto to give a total amount of 950 g. The temperature was adjusted to 40° C. while stirring, and 1171 g of ethanol was added thereto, followed by stirring for 5 minutes, and thereafter, 268 g of a 21.32 mass % ammonia aqueous solution was added thereto. Further, 1028 g of tetraethoxysilane (TEOS) as a silicon compound having a hydrolyzable group was added thereto over 35 minutes. Thereafter, while keeping the liquid temperature at 40° C., stirring was continued as such for 1 hour to carry out coating with a hydrolysate of the silicon compound. Thereafter, the obtained solution was washed and subjected to solid-liquid separation, and the product was collected as a cake (procedure 4).

After the cake (the precursor coated with the hydrolysate in a gel form) obtained by the procedure 4 was dried, the resulting dry powder was subjected to a heat treatment at 1130° C. for 4 hours in a furnace with an air atmosphere, whereby a powder of iron oxide containing substituent metal elements and coated with silicon oxide was obtained. Note that the hydrolysate of the silicon compound turns into an oxide when it is subjected to a heat treatment in an air atmosphere (procedure 5).

The powder of iron oxide containing substituent metal elements and coated with silicon oxide obtained by the procedure 5 was placed in a 20 mass % NaOH aqueous solution with a liquid temperature of 60° C. and stirred for 24 hours so as to carry out a treatment of removing the silicon oxide on the surfaces of the particles, whereby a slurry containing particles of ε-iron oxide in which Fe sites were partially substituted by other metal elements The slurry obtained by the procedure 6 was washed until the electrical conductivity became 15 mS/m or less.

Subsequently, to the washed slurry, a 35 mass % TEAOH aqueous solution was added as a surface modifier, whereby a surface modifier-containing slurry with a solid content of 5.7% was obtained. Here, the addition amount of the TEAOH aqueous solution was set so that the TEAOH concentration in the surface modifier-containing slurry became 0.099 mol/kg. In this case, the pH of the slurry became 13.

40 g of the obtained surface modifier-containing slurry was subjected to an ultrasonic dispersion treatment for 1 hour with an ultrasonic cleaner (Yamato 5510 Branson, manufactured by (Yamato Scientific) Co., Ltd.), and then subjected to a centrifugation treatment at a rotation speed of 16,000 rpm for 30 minutes with an R20A2 rotor of a centrifuge (himac CR21GII, manufactured by Hitachi Koki Co., Ltd.), and 30 g of a supernatant slurry was collected. The gravitational acceleration in the centrifugation treatment was set to 31,000 G. For an obtained slurry on the precipitate side, the operation of addition of 30 g of a 0.099 mol/kg TEAOH aqueous solution, ultrasonic dispersion, a centrifugation treatment at 16,000 rpm and 31,000 G for 30 minutes, and collection of 30 g of a supernatant slurry was repeated further 9 times, whereby a total of 300 g of the supernatant slurry was collected. After 300 g of the collected supernatant slurry was mixed, 40 g thereof was taken out.

40 g of the taken out supernatant slurry was subjected to a centrifugation treatment at a rotation speed of 18,000 rpm for 30 minutes with an R20A2 rotor of a centrifuge (himac CR21GII, manufactured by Hitachi Koki Co., Ltd.), and 30 g of a supernatant slurry containing fine particles was removed and a slurry on the precipitate side was obtained. The gravitational acceleration in the centrifugation treatment was set to 39,000 G. For the obtained slurry on the precipitate side, the operation of addition of 30 g of a 0.099 mol/kg TEAOH aqueous solution, ultrasonic dispersion, a centrifugation treatment at 18,000 rpm and 39,000 G for 30 minutes, and removal of 30 g of a supernatant slurry was repeated further 9 times, whereby a slurry on the precipitate side was obtained. To the obtained slurry on the precipitate side, a 1 mass % sulfuric acid aqueous solution was added to adjust the pH to 6.5 and aggregate substitution-type ε-iron oxide particles, followed by filtration through a membrane filter, and the solid was collected and then dried, whereby an iron-based oxide magnetic powder according to Example 13 was obtained.

The obtained iron-based oxide magnetic powder had a coercive force of 499 (kA/m), a saturation magnetization of 14.8 ($Am^2$/kg), a square ratio of 0.529, an SFD of 1.78, and an $I_L/I_H$ value of 0.46. Further, the obtained iron-based oxide magnetic powder was dispersed in pure water using an ultrasonic disperser to prepare a slurry, and the prepared slurry was dropped onto a collodion film on a grid and adhered thereto, and then, naturally dried. Thereafter, carbon vapor deposition was performed, and the resultant was subjected to TEM observation. As a result of measuring 200 particles by TEM observation, the TEM average particle diameter was 13.3 nm, the number ratio of particles with a particle diameter of 8 nm or less was 1.4%, the number ratio of particles with a particle diameter of 20 nm or more was 0.5%, the coefficient of variation (CV value) was 17%, and the average circularity of the particles was 0.970. In addition, evaluation of compositional analysis was performed, and the molar compositional ratio of each metal element was calculated when the total amount of iron and the substituent metal elements was set to 2 mol.

Example 14

As a raw material solution, 936 g of an aqueous solution with an Fe(III) concentration of 0.921 mol/kg, a Ga(III) concentration of 0.321 mol/kg, a Co(II) concentration of 0.056 mol/kg, a chloride ion concentration of 1.288 mol/kg, and a nitrate ion concentration of 2.659 mol/kg was prepared. Subsequently, in a 5 L reaction vessel, 1578 g of an aqueous solution with an Fe(III) concentration of 0.182 mol/kg and a chloride ion concentration of 0.546 mol/kg was placed, and the liquid temperature was adjusted to 40° C. while mechanically stirring with a stirring blade. Subsequently, while continuing stirring and keeping the liquid temperature at 40° C., the raw material solution and a 3.651 mol/kg ammonia aqueous solution were simultaneously added into the aqueous solution, and thereafter, stirring was performed for 60 minutes while keeping the liquid temperature at 40° C., whereby a colloidal solution was obtained (procedure 1, first neutralization step). Here, the raw material aqueous solution was continuously added over 240 minutes at an addition rate of 3.9 g/min, and the ammonia aqueous solution was continuously added over 240 minutes at an addition rate of 3.9 g/min. While adding the raw material aqueous solution and the ammonia aqueous solution, the ratio of the cumulative addition amount of the alkali to the total cumulative addition amount of the acid group contained in the raw material solution is 0.93 equivalents. The pH of the obtained colloidal solution was 2.0.

Subsequently, to the colloidal solution obtained by the procedure 1, 289 g of a citric acid solution with a citric acid concentration of 1.041 mol/kg as a hydroxycarboxylic acid was continuously added over 60 minutes under the condition of 40° C. (hydroxycarboxylic acid addition step), and thereafter, 196 g of a 12.553 mol/kg ammonia solution was added thereto all at once, and then, the resulting mixture was held for 10 minutes while stirring under the condition of temperature of 40° C., whereby a slurry of a precursor, which is an intermediate product, was obtained (procedure 2, second neutralization step). The pH after adding 196 g of the ammonia solution all at once was 8.6.

The precursor slurry obtained by the procedure 2 was collected and washed with an ultrafiltration membrane and a membrane having a UF molecular weight cut-off of 50,000 until the electrical conductivity of the filtrate became 150 mS/m or less (procedure 3).

When the DLS average diameter of the precursor particles contained in the washed slurry obtained by the procedure 3 was measured, the DLS average diameter thereof was 195.5 nm.

Subsequently, 852 g of the washed slurry obtained by the procedure 3 was taken out, and pure water was added thereto to give a total amount of 950 g. The temperature was adjusted to 40° C. while stirring, and 1171 g of ethanol was added thereto, followed by stirring for 5 minutes, and thereafter, 268 g of a 21.32 mass % ammonia aqueous solution was added thereto. Further, 1028 g of tetraethoxysilane (TEOS) as a silicon compound having a hydrolyzable group was added thereto over 35 minutes. Thereafter, while keeping the liquid temperature at 40° C., stirring was continued as such for 1 hour to carry out coating with a hydrolysate of the silicon compound. Thereafter, the obtained solution was washed and subjected to solid-liquid separation, and the product was collected as a cake (procedure 4).

After the cake (the precursor coated with the hydrolysate in a gel form) obtained by the procedure 4 was dried, the resulting dry powder was subjected to a heat treatment at 1060° C. for 4 hours in a furnace with an air atmosphere, whereby a powder of iron oxide containing substituent metal elements and coated with silicon oxide was obtained. Note that the hydrolysate of the silicon compound turns into an oxide when it is subjected to a heat treatment in an air atmosphere (procedure 5).

The powder of iron oxide containing substituent metal elements and coated with silicon oxide obtained by the procedure 5 was placed in a 20 mass % NaOH aqueous solution with a liquid temperature of 60° C. and stirred for 14 hours so as to carry out a treatment of removing the silicon oxide on the surfaces of the particles, whereby a slurry containing particles of ε-iron oxide in which Fe sites were partially substituted by other metal elements was obtained (procedure 6).

The slurry obtained by the procedure 6 was washed until the electrical conductivity became 15 mS/m or less.

Subsequently, to the washed slurry, a 35 mass % TEAOH aqueous solution was added as a surface modifier, whereby a surface modifier-containing slurry with a solid content of 3.1% was obtained. Here, the addition amount of the TEAOH aqueous solution was set so that the TEAOH concentration in the surface modifier-containing slurry became 0.099 mol/kg. In this case, the pH of the slurry became 13.

40 g of the obtained surface modifier-containing slurry was subjected to an ultrasonic dispersion treatment for 1 hour with an ultrasonic cleaner (Yamato 5510 Branson, manufactured by (Yamato Scientific) Co., Ltd.), and then subjected to a centrifugation treatment at a rotation speed of 20,000 rpm for 30 minutes with an R20A2 rotor of a centrifuge (himac CR21GII, manufactured by Hitachi Koki Co., Ltd.), and 30 g of a supernatant slurry was collected. The gravitational acceleration in the centrifugation treatment was set to 48,000 G. For an obtained slurry on the precipitate side, the operation of addition of 30 g of a 0.099 mol/kg TEAOH aqueous solution, ultrasonic dispersion, a centrifugation treatment at 20,000 rpm and 48,000 G for 30 minutes, and collection of 30 g of a supernatant slurry was repeated further 9 times, whereby a total of 300 g of the supernatant slurry was collected. After 300 g of the collected supernatant slurry was mixed, 40 g thereof was taken out.

40 g of the taken out supernatant slurry was subjected to a centrifugation treatment at a rotation speed of 16,000 rpm for 30 minutes with an R20A2 rotor of a centrifuge (himac CR21GII, manufactured by Hitachi Koki Co., Ltd.), and 30 g of a supernatant slurry was collected. The gravitational acceleration in the centrifugation treatment was set to 31,000 G. For an obtained slurry on the precipitate side, the operation of addition of 30 g of a 0.099 mol/kg TEAOH aqueous solution, ultrasonic dispersion, a centrifugation treatment at 16,000 rpm and 31,000 G for 30 minutes, and collection of 30 g of a supernatant slurry was repeated further 9 times, whereby a total of 300 g of the supernatant slurry was collected. After 300 g of the collected supernatant slurry was mixed, 40 g thereof was taken out.

40 g of the taken out supernatant slurry was subjected to a centrifugation treatment at a rotation speed of 18,000 rpm for 30 minutes with an R20A2 rotor of a centrifuge (himac CR21GII, manufactured by Hitachi Koki Co., Ltd.), and 30 g of a supernatant slurry containing fine particles was removed and a slurry on the precipitate side was obtained. The gravitational acceleration in the centrifugation treatment was set to 39,000 G. For the obtained slurry on the precipitate side, the operation of addition of 30 g of a 0.099 mol/kg TEAOH aqueous solution, ultrasonic dispersion, a centrifugation treatment at 18,000 rpm and 39,000 G for 30 minutes, and removal of 30 g of a supernatant slurry was repeated further 9 times, whereby a slurry on the precipitate side was obtained. To the obtained slurry on the precipitate side, a 1 mass % sulfuric acid aqueous solution was added to adjust the pH to 6.5 and aggregate substitution-type ε-iron oxide particles, followed by filtration through a membrane filter, and the solid was collected and then dried, whereby an iron-based oxide magnetic powder according to Example 14 was obtained.

The obtained iron-based oxide magnetic powder had a coercive force of 324 (kA/m), a saturation magnetization of 16.9 (Am$^2$/kg), a square ratio of 0.626, an SFD of 0.77, and an $I_L/I_H$ value of 0.20. Further, the obtained iron-based oxide magnetic powder was dispersed in pure water using an ultrasonic disperser to prepare a slurry, and the prepared slurry was dropped onto a collodion film on a grid and adhered thereto, and then, naturally dried. Thereafter, carbon vapor deposition was performed, and the resultant was subjected to TEM observation. As a result of measuring 200 particles by TEM observation, the TEM average particle diameter was 16.4 nm, the number ratio of particles with a particle diameter of 8 nm or less was 0.0%, the number ratio of particles with a particle diameter of 20 nm or more was 2.4%, the coefficient of variation (CV value) was 12%, and the average circularity of the particles was 0.975. In addition, evaluation of compositional analysis was performed, and the molar compositional ratio of each metal element was calculated when the total amount of iron and the substituent metal elements was set to 2 mol.

Example 15

As a raw material solution, 893 g of an aqueous solution with an Fe(III) concentration of 0.993 mol/kg, a Ga(III) concentration of 0.235 mol/kg, a Co(II) concentration of 0.038 mol/kg, a Ni(II) concentration of 0.084 mol/kg, a chloride ion concentration of 2.980 mol/kg, and a nitrate ion concentration of 1.005 mol/kg was prepared. Subsequently, in a 5 L reaction vessel, 1581 g of an aqueous solution with an Fe(III) concentration of 0.187 mol/kg and a chloride ion concentration of 0.561 mol/kg was placed, and the liquid temperature was adjusted to 40° C. while mechanically stirring with a stirring blade. Subsequently, while continuing stirring and keeping the liquid temperature at 40° C., the raw material solution and a 3.734 mol/kg ammonia aqueous solution were simultaneously added into the aqueous solution, and thereafter, stirring was performed for 60 minutes while keeping the liquid temperature at 40° C., whereby a colloidal solution was obtained (procedure 1, first neutralization step). Here, the raw material aqueous solution was continuously added over 240 minutes at an addition rate of 3.7 g/min, and the ammonia aqueous solution was continuously added over 240 minutes at an addition rate of 3.7 g/min. While adding the raw material aqueous solution and the ammonia aqueous solution, the ratio of the cumulative addition amount of the alkali to the total cumulative addition amount of the acid group contained in the raw material solution is 0.94 equivalents. The pH of the obtained colloidal solution was 2.1.

Subsequently, to the colloidal solution obtained by the procedure 1, 274.3 g of a citric acid solution with a citric acid concentration of 1.041 mol/kg as hydroxycarboxylic acid was continuously added over 60 minutes under the condition of 40° C. (hydroxycarboxylic acid addition step), and thereafter, 193 g of a 12.465 mol/kg ammonia solution was added thereto all at once, and then, the resulting mixture was held for 10 minutes while stirring under the condition of temperature of 40° C., whereby a slurry of a precursor, which is an intermediate product, was obtained (procedure 2, second neutralization step). The pH after adding 193 g of the ammonia solution all at once was 8.8.

The precursor slurry obtained by the procedure 2 was collected and washed with an ultrafiltration membrane and a membrane having a UF molecular weight cut-off of 50,000 until the electrical conductivity of the filtrate became 30 mS/m or less (procedure 3).

When the DLS average diameter of the precursor particles contained in the washed slurry obtained by the procedure 3 was measured, the DLS average diameter thereof was 39.9 nm.

Subsequently, 1057 g of the washed slurry obtained by the procedure 3 was taken out, and pure water was added thereto to give a total amount of 1150 g. The temperature was adjusted to 40° C. while stirring, and 1406 g of ethanol was added thereto, followed by stirring for 5 minutes, and thereafter, 347 g of a 21.24 mass % ammonia aqueous solution was added thereto. Further, 1327 g of tetraethoxysilane (TEOS) as a silicon compound having a hydrolyzable group was added thereto over 35 minutes. Thereafter, while keeping the liquid temperature at 40° C., stirring was continued as such for 1 hour to carry out coating with a hydrolysate of the silicon compound. Thereafter, the obtained solution was washed and subjected to solid-liquid separation, and the product was collected as a cake (procedure 4).

After the cake (the precursor coated with the hydrolysate in a gel form) obtained by the procedure 4 was dried, the resulting dry powder was subjected to a heat treatment at 1130° C. for 4 hours in a furnace with an air atmosphere, whereby a powder of iron oxide containing substituent metal elements and coated with silicon oxide was obtained. Note that the hydrolysate of the silicon compound turns into an oxide when it is subjected to a heat treatment in an air atmosphere (procedure 5).

The powder of iron oxide containing substituent metal elements and coated with silicon oxide obtained by the procedure 5 was placed in a 20 mass % NaOH aqueous solution with a liquid temperature of 60° C. and stirred for 14 hours so as to carry out a treatment of removing the silicon oxide on the surfaces of the particles, whereby a slurry containing particles of ε-iron oxide in which Fe sites were partially substituted by other metal elements was obtained (procedure 6).

The slurry obtained by the procedure 6 was washed until the electrical conductivity became 15 mS/m or less.

Subsequently, to the washed slurry, a 35 mass % TEAOH aqueous solution was added as a surface modifier, whereby a surface modifier-containing slurry with a solid content of 3.1% was obtained. Here, the addition amount of the TEAOH aqueous solution was set so that the TEAOH concentration in the surface modifier-containing slurry became 0.099 mol/kg. In this case, the pH of the slurry became 13.

40 g of the obtained surface modifier-containing slurry was subjected to an ultrasonic dispersion treatment for 1 hour with an ultrasonic cleaner (Yamato 5510 Branson, manufactured by (Yamato Scientific) Co., Ltd.), and then subjected to a centrifugation treatment at a rotation speed of 20,000 rpm for 30 minutes with an R20A2 rotor of a centrifuge (himac CR21GII, manufactured by Hitachi Koki Co., Ltd.), and 30 g of a supernatant slurry was collected. The gravitational acceleration in the centrifugation treatment was set to 48,000 G. For an obtained slurry on the precipitate side, the operation of addition of 30 g of a 0.099 mol/kg TEAOH aqueous solution, ultrasonic dispersion, a centrifugation treatment at 20,000 rpm and 48,000 G for 30 minutes, and collection of 30 g of a supernatant slurry was repeated further 9 times, whereby a total of 300 g of the supernatant slurry was collected. After 300 g of the collected supernatant slurry was mixed, 40 g thereof was taken out.

40 g of the taken out supernatant slurry was subjected to a centrifugation treatment at a rotation speed of 16,000 rpm for 30 minutes with an R20A2 rotor of a centrifuge (himac CR21GII, manufactured by Hitachi Koki Co., Ltd.), and 30 g of a supernatant slurry was collected. The gravitational acceleration in the centrifugation treatment was set to 31,000 G. For an obtained slurry on the precipitate side, the operation of addition of 30 g of a 0.099 mol/kg TEAOH aqueous solution, ultrasonic dispersion, a centrifugation treatment at 16,000 rpm and 31,000 G for 30 minutes, and collection of 30 g of a supernatant slurry was repeated further 9 times, whereby a total of 300 g of the supernatant slurry was collected. After 300 g of the collected supernatant slurry was mixed, 40 g thereof was taken out.

40 g of the taken out supernatant slurry was subjected to a centrifugation treatment at a rotation speed of 18,000 rpm for 30 minutes with an R20A2 rotor of a centrifuge (himac CR21GII, manufactured by Hitachi Koki Co., Ltd.), and 30 g of a supernatant slurry containing fine particles was removed and a slurry on the precipitate side was obtained. The gravitational acceleration in the centrifugation treatment was set to 39,000 G. For the obtained slurry on the precipitate side, the operation of addition of 30 g of a 0.099 mol/kg TEAOH aqueous solution, ultrasonic dispersion, a centrifugation treatment at 18,000 rpm and 39,000 G for 30 minutes, and removal of 30 g of a supernatant slurry repeated further 9 times, whereby a slurry on the precipitate side was obtained. To the obtained slurry on the precipitate side, a 1 mass % sulfuric acid aqueous solution was added to adjust the pH to 6.5 and aggregate substitution-type ε-iron oxide particles, followed by filtration through a membrane filter, and the solid was collected and then dried, whereby an iron-based oxide magnetic powder according to Example 15 was obtained.

The obtained iron-based oxide magnetic powder had a coercive force of 505 (kA/m), a saturation magnetization of 22.4 (Am$^2$/kg), a square ratio of 0.494, an SFD of 0.72, and an $I_L/I_H$ value of 0.59. Further, the obtained iron-based oxide magnetic powder was dispersed in pure water using an ultrasonic disperser to prepare a slurry, and the prepared slurry was dropped onto a collodion film on a grid and adhered thereto, and then, naturally dried. Thereafter, carbon vapor deposition was performed, and the resultant was subjected to TEM observation. As a result of measuring 200 particles by TEM observation, the TEM average particle diameter was 15.8 nm, the number ratio of particles with a particle diameter of 8 nm or less was 0.6%, the number ratio of particles with a particle diameter of 20 nm or more was 1.8%, the coefficient of variation (CV value) was 12%, and the average circularity of the particles was 0.973. In addition, evaluation of compositional analysis was performed, and the molar compositional ratio of each metal element was calculated when the total amount of iron and the substituent metal elements was set to 2 mol.

Example 16

As a raw material solution, 895 g of an aqueous solution with an Fe(III) concentration of 0.991 mol/kg, a Ga(III) concentration of 0.235 mol/kg, a Co(II) concentration of 0.038 mol/kg, a Cr(III) concentration of 0.084 mol/kg, a chloride ion concentration of 2.974 mol/kg, and a nitrate ion concentration of 1.087 mol/kg was prepared. Subsequently, in a 5 L reaction vessel, 1581 g of an aqueous solution with an Fe(III) concentration of 0.187 mol/kg and a chloride ion concentration of 0.561 mol/kg was placed, and the liquid temperature was adjusted to 40° C. while mechanically stirring with a stirring blade. Subsequently, while continuing stirring and keeping the liquid temperature at 40° C., the raw material solution and a 3.808 mol/kg ammonia aqueous solution were simultaneously added into the aqueous solution, and thereafter, stirring was performed for 60 minutes while keeping the liquid temperature at 40° C., whereby a colloidal solution was obtained (procedure 1, first neutralization step). Here, the raw material aqueous solution was continuously added over 240 minutes at an addition rate of 3.7 g/min, and the ammonia aqueous solution was continuously added over 240 minutes at an addition rate of 3.7 g/min. While adding the raw material aqueous solution and the ammonia aqueous solution, the ratio of the cumulative addition amount of the alkali to the total cumulative addition amount of the acid group contained in the raw material solution is 0.94 equivalents. The pH of the obtained colloidal solution was 2.0.

Subsequently, to the colloidal solution obtained by the procedure 1, 288.8 g of a citric acid solution with a citric acid concentration of 1.041 mol/kg as a hydroxycarboxylic acid was continuously added over 60 minutes under the condition of 40° C. (hydroxycarboxylic acid addition step), and thereafter, 196 g of a 12.553 mol/kg ammonia solution was added thereto all at once, and then, the resulting mixture was held for 10 minutes while stirring under the condition of temperature of 40° C., whereby a slurry of a precursor, which is an intermediate product, was obtained (procedure 2, second neutralization step). The pH after adding 196 g of the ammonia solution all at once was 8.5.

The precursor slurry obtained by the procedure 2 was collected and washed with an ultrafiltration membrane and a membrane having a UF molecular weight cut-off of 50,000 until the electrical conductivity of the filtrate became 30 mS/m or less (procedure 3).

When the DLS average diameter of the precursor particles contained in the washed slurry obtained by the procedure 3 was measured, the DLS average diameter thereof was 354.1 nm.

Subsequently, 1084 g of the washed slurry obtained by the procedure 3 was taken out, and pure water was added thereto to give a total amount of 1150 g. The temperature was adjusted to 40° C. while stirring, and 1406 g of ethanol was added thereto, followed by stirring for 5 minutes, and thereafter, 345 g of a 21.39 mass % ammonia aqueous solution was added thereto. Further, 1327 g of tetraethoxysilane (TEOS) as a silicon compound having a hydrolyzable group was added thereto over 35 minutes. Thereafter, while keeping the liquid temperature at 40° C., stirring was continued as such for 1 hour to carry out coating with a hydrolysate of the silicon compound. Thereafter, the obtained solution was washed and subjected to solid-liquid separation, and the product was collected as a cake (procedure 4).

After the cake (the precursor coated with the hydrolysate in a gel form) obtained by the procedure 4 was dried, the resulting dry powder was subjected to a heat treatment at 1130° C. for 4 hours in a furnace with an air atmosphere, whereby a powder of iron oxide containing substituent metal elements and coated with silicon oxide was obtained. Note that the hydrolysate of the silicon compound turns into an oxide when it is subjected to a heat treatment in an air atmosphere (procedure 5).

The powder of iron oxide containing substituent metal elements and coated with silicon oxide obtained by the procedure 5 was placed in a 20 mass % NaOH aqueous solution with a liquid temperature of 60° C. and stirred for 14 hours so as to carry out a treatment of removing the silicon oxide on the surfaces of the particles, whereby a slurry containing particles of ε-iron oxide in which Fe sites were partially substituted by other metal elements was obtained (procedure 6).

The slurry obtained by the procedure 6 was washed until the electrical conductivity became 15 mS/m or less.

Subsequently, to the washed slurry, a 35 mass % TEACH aqueous solution was added as a surface modifier, whereby a surface modifier-containing slurry with a solid content of 3.2% was obtained. Here, the addition amount of the TEACH aqueous solution was set so that the TEACH concentration in the surface modifier-containing slurry became 0.099 mol/kg. In this case, the pH of the slurry became 13.

40 g of the obtained surface modifier-containing slurry was subjected to an ultrasonic dispersion treatment for 1 hour with an ultrasonic cleaner (Yamato 5510 Branson, manufactured by (Yamato Scientific) Co., Ltd.), and then subjected to a centrifugation treatment at a rotation speed of 20,000 rpm for 30 minutes with an R20A2 rotor of a centrifuge (himac CR21GII, manufactured by Hitachi Koki Co., Ltd.), and 30 g of a supernatant slurry was collected. The gravitational acceleration in the centrifugation treatment was set to 48,000 G. For an obtained slurry on the precipitate side, the operation of addition of 30 g of a 0.099 mol/kg TEACH aqueous solution, ultrasonic dispersion, a centrifugation treatment at 20,000 rpm and 48,000 G for 30 minutes, and collection of 30 g of a supernatant slurry was repeated further 9 times, whereby a total of 300 g of the supernatant slurry was collected. After 300 g of the collected supernatant slurry was mixed, 40 g thereof was taken out.

40 g of the taken out supernatant slurry was subjected to a centrifugation treatment at a rotation speed of 16,000 rpm for 30 minutes with an R20A2 rotor of a centrifuge (himac CR21GII, manufactured by Hitachi Kaki Co., Ltd.), and 30 g of a supernatant slurry was collected. The gravitational acceleration in the centrifugation treatment was set to 31,000 G. For an obtained slurry on the precipitate side, the operation of addition of 30 g of a 0.099 mol/kg TEAOH aqueous solution, ultrasonic dispersion, a centrifugation treatment at 16,000 rpm and 31,000 G for 30 minutes, and collection of 30 g of a supernatant slurry was repeated further 9 times, whereby a total of 300 g of the supernatant slurry was collected. After 300 g of the collected supernatant slurry was mixed, 40 g thereof was taken out.

40 g of the taken out supernatant slurry was subjected to a centrifugation treatment at a rotation speed of 18,000 rpm for 30 minutes with an R20A2 rotor of a centrifuge (himac CR21GII, manufactured by Hitachi Kaki Co., Ltd.), and 30 g of a supernatant slurry containing fine particles was removed and a slurry on the precipitate side was obtained. The gravitational acceleration in the centrifugation treatment was set to 39,000 G. For the obtained slurry on the precipitate side, the operation of addition of 30 g of a 0.099 mol/kg TEACH aqueous solution, ultrasonic dispersion, a centrifugation treatment at 18,000 rpm and 39,000 G for 30 minutes, and removal of 30 g of a supernatant slurry was repeated further 9 times, whereby a slurry on the precipitate side was obtained. To the obtained slurry on the precipitate side, a 1 mass % sulfuric acid aqueous solution was added to adjust the pH to 6.5 and aggregate substitution-type ε-iron oxide particles, followed by filtration through a membrane filter, and the solid was collected and then dried, whereby an iron-based oxide magnetic powder according to Example 16 was obtained.

The obtained iron-based oxide magnetic powder had a coercive force of 471 (kA/m), a saturation magnetization of 16.1 (Am$^2$/kg), a square ratio of 0.542, an SFD of 0.78, and an $I_L/I_H$ value of 0.18. Further, the obtained iron-based oxide magnetic powder was dispersed in pure water using an ultrasonic disperser to prepare a slurry, and the prepared slurry was dropped onto a collodion film on a grid and adhered thereto, and then, naturally dried. Thereafter, carbon vapor deposition was performed, and the resultant was subjected to TEM observation. As a result of measuring 200 particles by TEM observation, the TEM average particle diameter was 15.8 nm, the number ratio of particles with a particle diameter of 8 nm or less was 0.0%, the number ratio of particles with a particle diameter of 20 nm or more was 2.0%, the coefficient of variation (CV value) was 13%, and the average circularity of the particles was 0.975. In addition, evaluation of compositional analysis was performed, and the molar compositional ratio of each metal element was calculated when the total amount of iron and the substituent metal elements was set to 2 mol.

Example 17

As a raw material solution, 1829 g of an aqueous solution with an Fe(III) concentration of 1.257 mol/kg, a Ga(III) concentration of 0.288 mol/kg, a Co(II) concentration of 0.058 mol/kg, a Ti(IV) concentration of 0.041 mol/kg, a chloride ion concentration of 3.876 mol/kg, and a nitrate ion concentration of 1.075 mol/kg was prepared. Subsequently, in a 10 L reaction vessel, 3000 g of pure water was placed, and the liquid temperature was adjusted to 40° C. while mechanically stirring with a stirring blade. Subsequently, while continuing stirring and keeping the liquid temperature at 40° C., the raw material solution and a 3.961 mol/kg ammonia aqueous solution were simultaneously added into the pure water, and thereafter, stirring was performed for 60 minutes while keeping the liquid temperature at 40° C., whereby a colloidal solution was obtained (procedure 1, first neutralization step). Here, the raw material aqueous solution was continuously added over 240 minutes at an addition rate of 7.6 g/min, and the ammonia aqueous solution was continuously added over 240 minutes at an addition rate of 7.6 g/min. While adding the raw material aqueous solution and the ammonia aqueous solution, the ratio of the cumulative addition amount of the alkali to the total cumulative addition amount of the acid group contained in the raw material solution is 0.80 equivalents. The pH of the obtained colloidal solution was 1.8.

Subsequently, to the colloidal solution obtained by the procedure 1, 578 g of a citric acid solution with a citric acid concentration of 1.041 mol/kg as a hydroxycarboxylic acid was continuously added over 60 minutes under the condition of 40° C. (hydroxycarboxylic acid addition step), and thereafter, 377 g of a 12.987 mol/kg ammonia solution was added thereto all at once, and then, the resulting mixture was held for 10 minutes while stirring under the condition of temperature of 40° C., whereby a slurry of a precursor, which is an intermediate product, was obtained (procedure 2, second neutralization step). The pH after adding 377 g of the ammonia solution all at once was 8.8.

The precursor slurry obtained by the procedure 2 was collected and washed with an ultrafiltration membrane and a membrane having a UF molecular weight cut-off of 50,000 until the electrical conductivity of the filtrate became 1 mS/m or less (procedure 3).

When the DLS average diameter of the precursor particles contained in the washed slurry obtained by the procedure 3 was measured, the DLS average diameter thereof was 46.2 nm.

Subsequently, 1294 g of the washed slurry obtained by the procedure 3 was taken out, and pure water was added thereto to give a total amount of 2400 g. The temperature was adjusted to 40° C. while stirring, and 2928 g of ethanol was added thereto, followed by stirring for 5 minutes, and thereafter, 694 g of a 22.13 mass % ammonia aqueous solution was added thereto. Further, 2764 g of tetraethoxysilane (TEOS) as a silicon compound having a hydrolyzable group was added thereto over 35 minutes. Thereafter, while keeping the liquid temperature at 40° C., stirring was continued as such for 1 hour to carry out coating with a hydrolysate of the silicon compound. Thereafter, the obtained solution was washed and subjected to solid-liquid separation, and the product was collected as a cake (procedure 4).

After the cake (the precursor coated with the hydrolysate in a gel form) obtained by the procedure 4 was dried, the resulting dry powder was subjected to a heat treatment at 1116° C. for 4 hours in a furnace with an air atmosphere, whereby a powder of iron oxide containing substituent metal elements and coated with silicon oxide was obtained. Note that the hydrolysate of the silicon compound turns into an oxide when it is subjected to a heat treatment in an air atmosphere (procedure 5).

The powder of iron oxide containing substituent metal elements and coated with silicon oxide obtained by the procedure 5 was placed in a 20 mass % NaOH aqueous solution with a liquid temperature of 80° C. and stirred for 20 hours so as to carry out a treatment of removing the silicon oxide on the surfaces of the particles, whereby a slurry containing particles of ε-iron oxide in which Fe sites were partially substituted by other metal elements was obtained (procedure 6).

The slurry obtained by the procedure 6 was washed until the electrical conductivity became 1 mS/m or less.

Subsequently, to the washed slurry, a 25 mass % TMAOH aqueous solution was added as a surface modifier, whereby a surface modifier-containing slurry with a solid content of 36.0% was obtained. Here, the addition amount of the TMAOH aqueous solution was set so that the TMAOH concentration in the surface modifier-containing slurry became 0.065 mol/kg. In this case, the pH of the slurry became 13.

460 g of the obtained surface modifier-containing slurry was subjected to an ultrasonic dispersion treatment for 1 hour with an ultrasonic cleaner (Yamato 5510 Branson, manufactured by (Yamato Scientific) Co., Ltd.), and then subjected to a centrifugation treatment at a rotation speed of 8800 rpm for 130 minutes with an R10A3 rotor of a centrifuge (himac CR21GII, manufactured by Hitachi Koki Co., Ltd.), and 250 g of a supernatant slurry containing fine particles was removed and a slurry on the precipitate side was obtained. The gravitational acceleration in the centrifugation treatment was set to 15,000 G. For the obtained slurry on the precipitate side, the operation of addition of 250 g of a 0.065 mol/kg TMAOH aqueous solution, ultrasonic dispersion, a centrifugation treatment at 8800 rpm and 15,000 G for 130 minutes, and removal of 250 g of a supernatant slurry was repeated further 9 times, whereby a slurry on the precipitate side was obtained.

After 250 g of a 0.065 mol/kg TMAOH aqueous solution was added to 210 g of the obtained slurry on the precipitate side, the resulting mixture was subjected to an ultrasonic dispersion treatment for 1 hour with an ultrasonic cleaner (Yamato 5510 Branson, manufactured by (Yamato Scientific) Co., Ltd.), and then subjected to a centrifugation treatment at a rotation speed of 8800 rpm for 70 minutes with an R10A3 rotor of a centrifuge (himac CR21GII, manufactured by Hitachi Koki Co., Ltd.), and 250 g of a supernatant slurry was collected. The gravitational acceleration in the centrifugation treatment was set to 15,000 G. For an obtained slurry on the precipitate side, the operation of addition of 250 g of a 0.065 mol/kg TMAOH aqueous solution, ultrasonic dispersion, a centrifugation treatment at 8800 rpm and 15,000 G for 70 minutes, and collection of 250 g of a supernatant slurry was repeated further 15 times, whereby a total of 4000 g of the supernatant slurry was collected. To the collected supernatant slurry, a 1 mass % sulfuric acid aqueous solution was added to adjust the pH to 6.5 and aggregate substitution-type ε-iron oxide particles, followed by filtration through a membrane filter, and the solid was collected and then dried, whereby an iron-based oxide magnetic powder according to Example 17 was obtained.

The obtained iron-based oxide magnetic powder had a coercive force of 171 (kA/m), a saturation magnetization of 16.6 (Am$^2$/kg), a square ratio of 0.556, an SFD of 1.21, and an $I_L/I_H$ value of 0.33. Further, the obtained iron-based oxide magnetic powder was dispersed in pure water using an ultrasonic disperser to prepare a slurry, and the prepared slurry was dropped onto a collodion film on a grid and adhered thereto, and then, naturally dried. Thereafter, carbon vapor deposition was performed, and the resultant was subjected to TEM observation. As a result of measuring 200 particles by TEM observation, the TEM average particle diameter was 15.3 nm, the number ratio of particles with a particle diameter of 8 nm or less was 0.3%, the number ratio of particles with a particle diameter of 20 nm or more was 2.1%, the coefficient of variation (CV value) was 14%, and the average circularity of the particles was 0.973. In addition, evaluation of compositional analysis was performed, and the molar compositional ratio of each metal element was calculated when the total amount of iron and the substituent metal elements was set to 2 mol.

Example 18

As a raw material solution, 2687 g of an aqueous solution with an Fe(III) concentration of 1.430 mol/kg, a Ga(III) concentration of 0.147 mol/kg, a Co(II) concentration of 0.059 mol/kg, a Ti(IV) concentration of 0.042 mol/kg, a chloride ion concentration of 4.398 mol/kg, and a nitrate ion concentration of 0.592 mol/kg was prepared. Subsequently, in a 10 L reaction vessel, 4500 g of pure water was placed, and the liquid temperature was adjusted to 40° C. while mechanically stirring with a stirring blade. Subsequently, while continuing stirring and keeping the liquid temperature at 40° C., the raw material solution and a 3.742 mol/kg ammonia aqueous solution were simultaneously added into the pure water, and thereafter, stirring was performed for 60 minutes while keeping the liquid temperature at 40° C., whereby a colloidal solution was obtained (procedure 1, first neutralization step). Here, the raw material aqueous solution was continuously added over 240 minutes at an addition rate of 11.2 g/min, and the ammonia aqueous solution was continuously added over 240 minutes at an addition rate of 11.2 g/min. While adding the raw material aqueous solution and the ammonia aqueous solution, the ratio of the cumulative addition amount of the alkali to the total cumulative addition amount of the acid group contained in the raw material solution is 0.75 equivalents. The pH of the obtained colloidal solution was 1.7.

Subsequently, to the colloidal solution obtained by the procedure 1, 866 g of a citric acid solution with a citric acid concentration of 1.041 mol/kg as a hydroxycarboxylic acid was continuously added over 60 minutes under the condition of 40° C. (hydroxycarboxylic acid addition step), and thereafter, 557 g of a 12.993 mol/kg ammonia solution was added thereto all at once, and then, the resulting mixture was held for 10 minutes while stirring under the condition of temperature of 40° C., whereby a slurry of a precursor, which is an intermediate product, was obtained (procedure 2, second neutralization step). The pH after adding 557 g of the ammonia solution all at once was 8.5.

The precursor slurry obtained by the procedure 2 was collected and washed with an ultrafiltration membrane and a membrane having a UF molecular weight cut-off of 50,000 until the electrical conductivity of the filtrate became 30 mS/m or less (procedure 3).

When the DLS average diameter of the precursor particles contained in the washed slurry obtained by the procedure 3 was measured, the DLS average diameter thereof was 37.8 nm.

Subsequently, 710 g of the washed slurry obtained by the procedure 3 was taken out, and pure water was added thereto to give a total amount of 1650 g. The temperature was adjusted to 40° C. while stirring, and 2050 g of ethanol was added thereto, followed by stirring for 5 minutes, and thereafter, 971 g of a 22.14 mass % ammonia aqueous solution was added thereto. Further, 3870 g of tetraethoxysilane (TEOS) as a silicon compound having a hydrolyzable group was added thereto over 35 minutes. Thereafter, while keeping the liquid temperature at 40° C., stirring was continued as such for 1 hour to carry out coating with a hydrolysate of the silicon compound. Thereafter, the obtained solution was washed and subjected to solid-liquid separation, and the product was collected as a cake (procedure 4).

After the cake (the precursor coated with the hydrolysate in a gel form) obtained by the procedure 4 was dried, the resulting dry powder was subjected to a heat treatment at 1115° C. for 4 hours in a furnace with an air atmosphere, whereby a powder of iron oxide containing substituent metal elements and coated with silicon oxide was obtained. Note that the hydrolysate of the silicon compound turns into an oxide when it is subjected to a heat treatment in an air atmosphere (procedure 5).

The powder of iron oxide containing substituent metal elements and coated with silicon oxide obtained by the procedure 5 was placed in a 20 mass % NaOH aqueous solution with a liquid temperature of 80° C. and stirred for 20 hours so as to carry out a treatment of removing the silicon oxide on the surfaces of the particles, whereby a slurry containing particles of ε-iron oxide in which Fe sites were partially substituted by other metal elements was obtained (procedure 6).

The slurry obtained by the procedure 6 was washed until the electrical conductivity became 1 mS/m or less.

Subsequently, to the washed slurry, a 25 mass % TMAOH aqueous solution was added as a surface modifier, whereby a surface modifier-containing slurry with a solid content of 40.0% was obtained. Here, the addition amount of the TMAOH aqueous solution was set so that the TMAOH concentration in the surface modifier-containing slurry became 0.065 mol/kg. In this case, the pH of the slurry became 13.

460 g of the obtained surface modifier-containing slurry was subjected to an ultrasonic dispersion treatment for 1 hour with an ultrasonic cleaner (Yamato 5510 Branson, manufactured by (Yamato Scientific) Co., Ltd.), and then subjected to a centrifugation treatment at a rotation speed of 8800 rpm for 60 minutes with an R10A3 rotor of a centrifuge (himac CR21GII, manufactured by Hitachi Koki Co., Ltd.), and 250 g of a supernatant slurry was collected. The gravitational acceleration in the centrifugation treatment was set to 15,000 G. For an obtained slurry on the precipitate side, the operation of addition of 250 g of a 0.065 mol/kg TMAOH aqueous solution, ultrasonic dispersion, a centrifugation treatment at 8800 rpm and 15,000 G for 70 minutes, and collection of 250 g of a supernatant slurry was repeated further 12 times, whereby a total of 3250 g of the supernatant slurry was collected. After 3250 g of the collected supernatant slurry was mixed, 460 g thereof was taken out.

460 g of the taken out supernatant slurry was subjected to an ultrasonic dispersion treatment for 1 hour with an ultrasonic cleaner (Yamato 5510 Branson, manufactured by (Yamato Scientific) Co., Ltd.), and then subjected to a centrifugation treatment at a rotation speed of 8800 rpm for 130 minutes with an R10A3 rotor of a centrifuge (himac CR21GII, manufactured by Hitachi Koki Co., Ltd.), and 250 g of a supernatant slurry containing fine particles was removed and a slurry on the precipitate side was obtained. The gravitational acceleration in the centrifugation treatment was set to 15,000 G. For the obtained slurry on the precipitate side, the operation of addition of 250 g of a 0.065 mol/kg TMAOH aqueous solution, ultrasonic dispersion, a centrifugation treatment at 8800 rpm and 15,000 G for 130 minutes, and removal of 250 g of a supernatant slurry was repeated further 8 times, whereby a slurry on the precipitate side was obtained.

After 250 g of a 0.065 mol/kg TMAOH aqueous solution was added to 210 g of the obtained slurry on the precipitate side, the resulting mixture was subjected to an ultrasonic dispersion treatment for 1 hour with an ultrasonic cleaner (Yamato 5510 Branson, manufactured by (Yamato Scientific) Co., Ltd.), and then subjected to a centrifugation treatment at a rotation speed of 8800 rpm for 70 minutes with an R10A3 rotor of a centrifuge (himac CR21GII, manufactured by Hitachi Koki Co., Ltd.), and 250 g of a supernatant slurry was collected. The gravitational acceleration in the centrifugation treatment was set to 15,000 G. For an obtained slurry on the precipitate side, the operation of addition of 250 g of a 0.065 mol/kg TMAOH aqueous solution, ultrasonic dispersion, a centrifugation treatment at 8800 rpm and 15,000 G for 70 minutes, and collection of 250 g of a supernatant slurry was repeated further 12 times, whereby a total of 3250 g of the supernatant slurry was collected. To the collected supernatant slurry, a 1 mass % sulfuric acid aqueous solution was added to adjust the pH to 6.5 and aggregate substitution-type ε-iron oxide particles, followed by filtration through a membrane filter, and the solid was collected and then dried, whereby an iron-based oxide magnetic powder according to Example 18 was obtained.

The obtained iron-based oxide magnetic powder had a coercive force of 349 (kA/m), a saturation magnetization of 15.3 (Am$^2$/kg), a square ratio of 0.643, an SFS of 0.71, and an $I_L/I_H$ value of 0.15. Further, the obtained iron-based oxide magnetic powder was dispersed in pure water using an ultrasonic disperser to prepare a slurry, and the prepared slurry was dropped onto a collodion film on a grid and adhered thereto, and then, naturally dried. Thereafter, carbon vapor deposition was performed, and the resultant was subjected to TEM observation. As a result of measuring 200 particles by TEM observation, the TEM average particle diameter was 15.8 nm, the number ratio of particles with a particle diameter of 8 nm or less was 0.0%, the number ratio of particles with a particle diameter of 20 nm or more was 1.4%, the coefficient of variation (CV value) was 12%, and the average circularity of the particles was 0.975. In addition, evaluation of compositional analysis was performed, and the molar compositional ratio of each metal element was calculated when the total amount of iron and the substituent metal elements was set to 2 mol.

Example 19

As a raw material solution, 2586 g of an aqueous solution with an Fe(III) concentration of 1.000 mol/kg, a Ga(III) concentration of 0.349 mol/kg, a Co(II) concentration of 0.061 mol/kg, a chloride ion concentration of 3.001 mol/kg, and a nitrate ion concentration of 1.199 mol/kg was prepared. Subsequently, in a 10 L reaction vessel, 4735 g of an aqueous solution with an Fe(III) concentration of 0.182 mol/kg and a chloride ion concentration of 0.546 mol/kg was placed, and the liquid temperature was adjusted to 40° C. while mechanically stirring with a stirring blade. Subsequently, while continuing stirring and keeping the liquid temperature at 40° C., the raw material solution and a 3.894 mol/kg ammonia aqueous solution were simultaneously added into the aqueous solution, and thereafter, stirring was performed for 60 minutes while keeping the liquid temperature at 40° C., whereby a colloidal solution was obtained (procedure 1, first neutralization step). Here, the raw material aqueous solution was continuously added over 240 minutes at an addition rate of 10.8 g/min, and the ammonia aqueous solution was continuously added over 240 minutes at an addition rate of 10.8 g/min. While adding the raw material aqueous solution and the ammonia aqueous solution, the ratio of the cumulative addition amount of the alkali to the total cumulative addition amount of the acid group contained in the raw material solution is 0.93 equivalents. The pH of the obtained colloidal solution was 2.1.

Subsequently, to the colloidal solution obtained by the procedure 1, 866 g of a citric acid solution with a citric acid concentration of 1.041 mol/kg as a hydroxycarboxylic acid was continuously added over 60 minutes under the condition of 40° C. (hydroxycarboxylic acid addition step), and thereafter, 582 g of a 12.465 mol/kg ammonia solution was added thereto all at once, and then, the resulting mixture was held for 10 minutes while stirring under the condition of temperature of 40° C., whereby a slurry of a precursor, which is an intermediate product, was obtained (procedure 2, second neutralization step). The pH after adding 582 g of the ammonia solution all at once was 8.6.

The precursor slurry obtained by the procedure 2 was collected and washed with an ultrafiltration membrane and a membrane having a UF molecular weight cut-off of 50,000 until the electrical conductivity of the filtrate became 150 mS/m or less (procedure 3).

When the DLS average diameter of the precursor particles contained in the washed slurry obtained by the procedure 3 was measured, the DLS average diameter thereof was 30.2 nm.

Subsequently, 1299 g of the washed slurry obtained by the procedure 3 was taken out, and pure water was added thereto to give a total amount of 1680 g. The temperature was adjusted to 40° C. while stirring, and 2085 g of 2-propanol was added thereto, followed by stirring for 5 minutes, and thereafter, 1029 g of a 21.24 mass % ammonia aqueous solution was added thereto. Further, 3936 g of tetraethoxysilane (TEOS) as a silicon compound having a hydrolyzable group was added thereto over 35 minutes. Thereafter, while keeping the liquid temperature at 40° C., stirring was continued as such for 1 hour to carry out coating with a hydrolysate of the silicon compound. Thereafter, the obtained solution was washed and subjected to solid-liquid separation, and the product was collected as a cake (procedure 4).

After the cake (the precursor coated with the hydrolysate in a gel form) obtained by the procedure 4 was dried, the resulting dry powder was subjected to a heat treatment at 1060° C. for 4 hours in a furnace with an air atmosphere, whereby a powder of iron oxide containing substituent metal elements and coated with silicon oxide was obtained. Note that the hydrolysate of the silicon compound turns into an oxide when it is subjected to a heat treatment in an air atmosphere (procedure 5).

The powder of iron oxide containing substituent metal elements and coated with silicon oxide obtained by the procedure 5 was placed in a 20 mass % NaOH aqueous solution with a liquid temperature of 80° C. and stirred for 20 hours so as to carry out a treatment of removing the silicon oxide on the surfaces of the particles, whereby a slurry containing particles of ε-iron oxide in which Fe sites were partially substituted by other metal elements was obtained (procedure 6).

The slurry obtained by the procedure 6 was washed until the electrical conductivity became 1 mS/m or less.

Subsequently, to the washed slurry, a 35 mass % TEAOH aqueous solution was added as a surface modifier, whereby a surface modifier-containing slurry with a solid content of 35.0% was obtained. Here, the addition amount of the TEAOH aqueous solution was set so that the TEAOH concentration in the surface modifier-containing slurry became 0.099 mol/kg. In this case, the pH of the slurry became 13.

460 g of the obtained surface modifier-containing slurry was subjected to an ultrasonic dispersion treatment for 1 hour with an ultrasonic cleaner (Yamato 5510 Branson, manufactured by (Yamato Scientific) Co., Ltd.), and then subjected to a centrifugation treatment at a rotation speed of 8800 rpm for 130 minutes with an R10A3 rotor of a centrifuge (himac CR21GII, manufactured by Hitachi Koki Co., Ltd.), and 250 g of a supernatant slurry containing fine particles was removed and a slurry on the precipitate side was obtained. The gravitational acceleration in the centrifugation treatment was set to 15,000 G. For the obtained slurry on the precipitate side, the operation of addition of 250 g of a 0.099 mol/kg TEAOH aqueous solution, ultrasonic dispersion, a centrifugation treatment at 8800 rpm and 15,000 G for 130 minutes, and removal of 250 g of a supernatant slurry was repeated further 15 times, whereby a slurry on the precipitate side was obtained.

After 250 g of a 0.099 mol/kg TEAOH aqueous solution was added to 210 g of the obtained slurry on the precipitate side, the resulting mixture was subjected to an ultrasonic dispersion treatment for 1 hour with an ultrasonic cleaner (Yamato 5510 Branson, manufactured by (Yamato Scientific) Co., Ltd.), and then subjected to a centrifugation treatment at a rotation speed of 8800 rpm for 60 minutes with an R10A3 rotor of a centrifuge (himac CR21GII, manufactured by Hitachi Koki Co., Ltd.), and 250 g of a supernatant slurry was collected. The gravitational acceleration in the centrifugation treatment was set to 15,000 G. For an obtained slurry on the precipitate side, the operation of addition of 250 g of a 0.099 mol/kg TEAOH aqueous solution, ultrasonic dispersion, a centrifugation treatment at 8800 rpm and 15,000 G for 60 minutes, and collection of 250 g of a supernatant slurry was repeated further 12 times, whereby a total of 3250 g of the supernatant slurry was collected. To the collected supernatant slurry, a 1 mass % sulfuric acid aqueous solution was added to adjust the pH to 6.5 and aggregate substitution-type ε-iron oxide particles, followed by filtration through a membrane filter, and the solid was collected and then dried, whereby an iron-based oxide magnetic powder according to Example 19 was obtained.

The obtained iron-based oxide magnetic powder had a coercive force of 353 (kA/m), a saturation magnetization of 15.8 (Am$^2$/kg), a square ratio of 0.620, an SFD of 0.84, and an $I_L/I_H$ value of 0.33. Further, the obtained iron-based oxide magnetic powder was dispersed in pure water using an ultrasonic disperser to prepare a slurry, and the prepared slurry was dropped onto a collodion film on a grid and adhered thereto, and then, naturally dried. Thereafter, carbon vapor deposition was performed, and the resultant was subjected to TEM observation. As a result of measuring 200 particles by TEM observation, the TEM average particle diameter was 16.7 nm, the number ratio of particles with a particle diameter of 8 nm or less was 0.0%, the number ratio of particles with a particle diameter of 20 nm or more was 5.9%, the coefficient of variation (CV value) was 12%, and the average circularity of the particles was 0.970. In addition, evaluation of compositional analysis was performed, and the molar compositional ratio of each metal element was calculated when the total amount of iron and the substituent metal elements was set to 2 mol.

Example 20

As a raw material solution, 2586 g of an aqueous solution with an Fe(III) concentration of 1.099 mol/kg, a Ga(III)

concentration of 0.184 mol/kg, a Co(II) concentration of 0.061 mol/kg, a Ti(IV) concentration of 0.044 mol/kg, a chloride ion concentration of 3.408 mol/kg, and a nitrate ion concentration of 0.673 mol/kg was prepared. Subsequently, in a 10 L reaction vessel, 4757 g of an aqueous solution with an Fe(III) concentration of 0.198 mol/kg and a chloride ion concentration of 0.594 mol/kg was placed, and the liquid temperature was adjusted to 40° C. while mechanically stirring with a stirring blade. Subsequently, while continuing stirring and keeping the liquid temperature at 40° C., the raw material solution and a 3.885 mol/kg ammonia aqueous solution were simultaneously added into the aqueous solution, and thereafter, stirring was performed for 60 minutes while keeping the liquid temperature at 40° C., whereby a colloidal solution was obtained (procedure 1, first neutralization step). Here, the raw material aqueous solution was continuously added over 240 minutes at an addition rate of 10.7 g/min, and the ammonia aqueous solution was continuously added over 240 minutes at an addition rate of 10.7 g/min. While adding the raw material aqueous solution and the ammonia aqueous solution, the ratio of the cumulative addition amount of the alkali to the total cumulative addition amount of the acid group contained in the raw material solution is 0.95 equivalents. The pH of the obtained colloidal solution was 1.9.

Subsequently, to the colloidal solution obtained by the procedure 1, 866 g of a citric acid solution with a citric acid concentration of 1.041 mol/kg as a hydroxycarboxylic acid was continuously added over 60 minutes under the condition of 40° C. (hydroxycarboxylic acid addition step), and thereafter, 573 g of a 12.553 mol/kg ammonia solution was added thereto all at once, and then, the resulting mixture was held for 10 minutes while stirring under the condition of temperature of 40° C., whereby a slurry of a precursor, which is an intermediate product, was obtained (procedure 2, second neutralization step). The pH after adding 573 g of the ammonia solution all at once was 8.6.

The precursor slurry obtained by the procedure 2 was collected and washed with an ultrafiltration membrane and a membrane having a UF molecular weight cut-off of 50,000 until the electrical conductivity of the filtrate became 150 mS/m or less (procedure 3).

When the DLS average diameter of the precursor particles contained in the washed slurry obtained by the procedure 3 was measured, the DLS average diameter thereof was 30.8 nm.

Subsequently, 1220 g of the washed slurry obtained by the procedure 3 was taken out, and pure water was added thereto to give a total amount of 1680 g. The temperature was adjusted to 40° C. while stirring, and 2085 g of 2-propanol was added thereto, followed by stirring for 5 minutes, and thereafter, 1022 g of a 21.39 mass % ammonia aqueous solution was added thereto. Further, 3936 g of tetraethoxysilane (TEAS) as a silicon compound having a hydrolyzable group was added thereto over 35 minutes. Thereafter, while keeping the liquid temperature at 40° C., stirring was continued as such for 1 hour to carry out coating with a hydrolysate of the silicon compound. Thereafter, the obtained solution was washed and subjected to solid-liquid separation, and the product was collected as a cake (procedure 4).

After the cake (the precursor coated with the hydrolysate in a gel form) obtained by the procedure 4 was dried, the resulting dry powder was subjected to a heat treatment at 1062° C. for 4 hours in a furnace with an air atmosphere, whereby a powder of iron oxide containing substituent metal elements and coated with silicon oxide was obtained. Note that the hydrolysate of the silicon compound turns into an oxide when it is subjected to a heat treatment in an air atmosphere (procedure 5).

The powder of iron oxide containing substituent metal elements and coated with silicon oxide obtained by the procedure 5 was placed in a 20 mass % NaOH aqueous solution with a liquid temperature of 80° C. and stirred for 20 hours so as to carry out a treatment of removing the silicon oxide on the surfaces of the particles, whereby a slurry containing particles of ε-iron oxide in which Fe sites were partially substituted by other metal elements was obtained (procedure 6).

The slurry obtained by the procedure 6 was washed until the electrical conductivity became 1 mS/m or less.

Subsequently, to the washed slurry, a 35 mass % TEAOH aqueous solution was added as a surface modifier, whereby a surface modifier-containing slurry with a solid content of 40.0% was obtained. Here, the addition amount of the TEAOH aqueous solution was set so that the TEAOH concentration in the surface modifier-containing slurry became 0.099 mol/kg. In this case, the pH of the slurry became 13.

460 g of the obtained surface modifier-containing slurry was subjected to an ultrasonic dispersion treatment for 1 hour with an ultrasonic cleaner (Yamato 5510 Branson, manufactured by (Yamato Scientific) Co., Ltd.), and then subjected to a centrifugation treatment at a rotation speed of 8800 rpm for 130 minutes with an R10A3 rotor of a centrifuge (himac CR21GII, manufactured by Hitachi Koki Co., Ltd.), and 250 g of a supernatant slurry containing fine particles was removed and a slurry on the precipitate side was obtained. The gravitational acceleration in the centrifugation treatment was set to 15,000 G. For the obtained slurry on the precipitate side, the operation of addition of 250 g of a 0.099 mol/kg TEAOH aqueous solution, ultrasonic dispersion, a centrifugation treatment at 8800 rpm and 15,000 G for 130 minutes, and removal of 250 g of a supernatant slurry was repeated further 9 times, whereby a slurry on the precipitate side was obtained.

After 250 g of a 0.099 mol/kg TEAOH aqueous solution was added to 210 g of the obtained slurry on the precipitate side, the resulting mixture was subjected to an ultrasonic dispersion treatment for 1 hour with an ultrasonic cleaner (Yamato 5510 Branson, manufactured by (Yamato Scientific) Co., Ltd.), and then subjected to a centrifugation treatment at a rotation speed of 8800 rpm for 60 minutes with an R10A3 rotor of a centrifuge (himac CR21GII, manufactured by Hitachi Koki Co., Ltd.), and 250 g of a supernatant slurry was collected. The gravitational acceleration in the centrifugation treatment was set to 15,000 G. For an obtained slurry on the precipitate side, the operation of addition of 250 g of a 0.099 mol/kg TEAOH aqueous solution, ultrasonic dispersion, a centrifugation treatment at 8800 rpm and 15,000 G for 60 minutes, and collection of 250 g of a supernatant slurry was repeated further 12 times, whereby a total of 3250 g of the supernatant slurry was collected. To the collected supernatant slurry, a 1 mass % sulfuric acid aqueous solution was added to adjust the pH to 6.5 and aggregate substitution-type ε-iron oxide particles, followed by filtration through a membrane filter, and the solid was collected and then dried, whereby an iron-based oxide magnetic powder according to Example 20 was obtained.

The obtained iron-based oxide magnetic powder had a coercive force of 327 (kA/m), a saturation magnetization of 15.4 ($Am^2$/kg), a square ratio of 0.628, an SFD of 0.97, and an $I_L/I_H$ value of 0.25. Further, the obtained iron-based oxide magnetic powder was dispersed in pure water using an ultrasonic disperser to prepare a slurry, and the prepared slurry was dropped onto a collodion film on a grid and adhered thereto, and then, naturally dried. Thereafter, carbon vapor deposition was performed, and the resultant was subjected to TEM observation. As a result of measuring 200 particles by TEM observation, the TEM average particle diameter was 17.3 nm, the number ratio of particles with a particle diameter of 8 nm or less was 0.0%, the number ratio of particles with a particle diameter of 20 nm or more was 12.9%, the coefficient of variation (CV value) was 14%, and the average circularity of the particles was 0.969. In addition, evaluation of compositional analysis was performed, and the molar compositional ratio of each metal element was calculated when the total amount of iron and the substituent metal elements was set to 2 mol. The above measurement results are shown in Tables 3 and 4.

TABLE 1

| | | Raw materials | | | | | |
| | | Preparation composition (molar ratio Fe + Ga + Co + Ti + Ni + Cr = 2.0) | | | | | |
| | Iron raw material | Fe | Ga | Co | Ti | Ni | Cr |
| --- | --- | --- | --- | --- | --- | --- | --- |
| Example 1 | Iron(III) chloride | 1.705 | 0.175 | 0.070 | 0.050 | 0 | 0 |
| Example 2 | Iron(III) chloride | 1.710 | 0.200 | 0.045 | 0.045 | 0 | 0 |
| Example 3 | Iron(III) chloride | 1.835 | 0.075 | 0.045 | 0.045 | 0 | 0 |
| Example 4 | Iron(III) chloride | 1.910 | 0.000 | 0.045 | 0.045 | 0 | 0 |
| Example 5 | Iron(III) chloride | 1.730 | 0.150 | 0.070 | 0.050 | 0 | 0 |
| Example 6 | Iron(III) chloride | 1.605 | 0.275 | 0.070 | 0.050 | 0 | 0 |
| Example 7 | Iron(III) chloride | 1.630 | 0.250 | 0.070 | 0.050 | 0 | 0 |
| Example 8 | Iron(III) chloride | 1.530 | 0.350 | 0.070 | 0.050 | 0 | 0 |
| Example 9 | Iron(III) chloride | 1.670 | 0.240 | 0.045 | 0.045 | 0 | 0 |
| Comparative example 1 | Iron(III) chloride | 1.530 | 0.350 | 0.070 | 0.050 | 0 | 0 |
| Comparative example 2 | Iron(III) nitrate | 1.635 | 0.265 | 0.050 | 0.050 | 0 | 0 |
| Comparative example 3 | Iron(III) nitrate | 1.530 | 0.350 | 0.070 | 0.050 | 0 | 0 |
| Example 10 | Iron(III) chloride | 2.000 | 0.000 | 0.000 | 0.000 | 0 | 0 |
| Example 11 | Iron(III) chloride | 1.910 | 0.000 | 0.090 | 0.000 | 0 | 0 |
| Example 12 | Iron(III) chloride | 1.910 | 0.000 | 0.000 | 0.090 | 0 | 0 |
| Example 13 | Iron(III) chloride | 1.888 | 0.000 | 0.068 | 0.045 | 0 | 0 |
| Example 14 | Iron(III) chloride + iron(III) nitrate | 1.530 | 0.400 | 0.070 | 0.000 | 0 | 0 |
| Example 15 | Iron(III) chloride | 1.575 | 0.280 | 0.045 | 0.000 | 0.100 | 0 |
| Example 16 | Iron(III) chloride | 1.575 | 0.280 | 0.045 | 0.000 | 0 | 0.100 |
| Example 17 | Iron(III) chloride | 1.530 | 0.350 | 0.070 | 0.050 | 0 | 0 |
| Example 18 | Iron(III) chloride | 1.705 | 0.175 | 0.070 | 0.050 | 0 | 0 |
| Example 19 | Iron(III) chloride | 1.530 | 0.400 | 0.070 | 0.000 | 0 | 0 |
| Example 20 | Iron(III) chloride | 1.670 | 0.210 | 0.070 | 0.050 | 0 | 0 |

TABLE 2

| | | Production method | | | | |
| | Reaction | First stage of neutralization | | | Hydroxycarboxylic acid | |
| | temperature (° C.) | Cumulative alkali addition equivalent | Neutralization time (min) | pH at end of alkali addition | type | Metal molar ratio to addition amount |
| --- | --- | --- | --- | --- | --- | --- |
| Example 1 | 40 | 0.75 | 240 | 1.7 | citric acid | 0.20 |
| Example 2 | 40 | 0.80 | 240 | 1.9 | citric acid | 0.20 |
| Example 3 | 40 | 0.75 | 240 | 2.1 | citric acid | 0.20 |
| Example 4 | 40 | 0.75 | 240 | 2.0 | citric acid | 0.20 |
| Example 5 | 40 | 0.75 | 240 | 1.7 | citric acid | 0.20 |
| Example 6 | 40 | 0.75 | 240 | 1.7 | citric acid | 0.20 |
| Example 7 | 40 | 0.75 | 240 | 1.6 | citric acid | 0.20 |
| Example 8 | 40 | 0.80 | 240 | 1.9 | citric acid | 0.20 |
| Example 9 | 40 | 0.79 | 240 | 1.8 | citric acid | 0.20 |
| Comparative example 1 | 40 | 0.80 | 240 | 1.8 | citric acid | 0.20 |
| Comparative example 2 | 40 | 0.80 | 1 | 2.0 | citric acid | 0.15 |
| Comparative example 3 | 40 | 0.80 | 1 | 1.8 | citric acid | 0.20 |
| Example 10 | 30 | 1.00 | 240 | 2.3 | citric acid | 0.20 |
| Example 11 | 40 | 0.99 | 240 | 2.1 | citric acid | 0.20 |
| Example 12 | 40 | 0.99 | 240 | 1.8 | citric acid | 0.20 |
| Example 13 | 40 | 0.99 | 240 | 1.6 | citric acid | 0.20 |
| Example 14 | 40 | 0.93 | 240 | 2.0 | citric acid | 0.20 |
| Example 15 | 40 | 0.94 | 240 | 2.1 | citric acid | 0.19 |
| Example 16 | 40 | 0.94 | 240 | 2.0 | citric acid | 0.20 |

TABLE 2-continued

| | | | | | | |
|---|---|---|---|---|---|---|
| Example 17 | 40 | 0.80 | 240 | 1.8 | citric acid | 0.20 |
| Example 18 | 40 | 0.75 | 240 | 1.7 | citric acid | 0.20 |
| Example 19 | 40 | 0.93 | 240 | 2.1 | citric acid | 0.20 |
| Example 20 | 40 | 0.95 | 240 | 1.9 | citric acid | 0.20 |

| | Production method | | | | |
|---|---|---|---|---|---|
| | pH arrived at second stage of neutralization | DLS average diameter of precursor (nm) | Firing temperature (° C.) | Type of surface modifier | Concentration of surface modifier (mol/kg) | pH of surface modifier-containing slurry |
| Example 1 | 8.5 | 36 | 1130 | TMAOH | 0.065 | 13 |
| Example 2 | 8.6 | 48 | 1050 | TMAOH | 0.065 | 13 |
| Example 3 | 8.9 | 36 | 1110 | TMAOH | 0.065 | 13 |
| Example 4 | 8.9 | 37 | 1110 | TMAOH | 0.065 | 13 |
| Example 5 | 8.4 | 37 | 1130 | TMAOH | 0.065 | 13 |
| Example 6 | 8.5 | 33 | 1130 | TMAOH | 0.065 | 13 |
| Example 7 | 8.4 | 32 | 1130 | TMAOH | 0.065 | 13 |
| Example 8 | 8.6 | 51 | 1116 | TMAOH | 0.065 | 13 |
| Example 9 | 8.7 | 58 | 1050 | TMAOH | 0.065 | 13 |
| Comparative example 1 | 8.6 | 39 | 1130 | — | — | — |
| Comparative example 2 | 8.5 | — | 1070 | — | — | — |
| Comparative example 3 | 8.6 | 31 | 971 | TMAOH | 0.065 | 13 |
| Example 10 | 9.2 | 128 | 1130 | TEAOH | 0.099 | 13 |
| Example 11 | 9.2 | 147 | 1130 | TEAOH | 0.099 | 13 |
| Example 12 | 9.1 | 36 | 1130 | TEAOH | 0.099 | 13 |
| Example 13 | 8.8 | 39 | 1130 | TEAOH | 0.099 | 13 |
| Example 14 | 8.6 | 196 | 1060 | TEAOH | 0.099 | 13 |
| Example 15 | 8.8 | 40 | 1130 | TEAOH | 0.099 | 13 |
| Example 16 | 8.5 | 354 | 1130 | TEAOH | 0.099 | 13 |
| Example 17 | 8.8 | 46 | 1116 | TMAOH | 0.065 | 13 |
| Example 18 | 8.5 | 38 | 1115 | TMAOH | 0.065 | 13 |
| Example 19 | 8.6 | 30 | 1060 | TEAOH | 0.099 | 13 |
| Example 20 | 8.6 | 31 | 1062 | TEAOH | 0.099 | 13 |

TABLE 3

| | Iron-based oxide magnetic powder | | | | | | | | | |
|---|---|---|---|---|---|---|---|---|---|---|
| | TEM observation | | | | | Composition (molar ratio: Fe + Ga + Co + Ti + Ni + Cr = 2.0) | | | | |
| | Average particle diameter (nm) | Ratio of particles with size of 8 nm or less (% by number) | Ratio of particles with size of 20 nm or more (% by number) | Coefficient of variation (%) | Circularity | Fe | Ga | Co | Ti | others |
| Example 1 | 16.0 | 0.0 | 1.3 | 12 | 0.974 | 1.76 | 0.15 | 0.05 | 0.05 | — |
| Example 2 | 14.2 | 0.5 | 7.2 | 19 | 0.960 | 1.75 | 0.18 | 0.03 | 0.04 | — |
| Example 3 | 14.1 | 0.0 | 0.0 | 14 | 0.972 | 1.86 | 0.06 | 0.04 | 0.04 | — |
| Example 4 | 14.2 | 0.0 | 0.0 | 12 | 0.972 | 1.93 | — | 0.03 | 0.04 | — |
| Example 5 | 15.3 | 0.1 | 0.3 | 13 | 0.973 | 1.76 | 0.14 | 0.05 | 0.05 | — |
| Example 6 | 15.7 | 0.0 | 1.0 | 15 | 0.970 | 1.66 | 0.26 | 0.04 | 0.05 | — |
| Example 7 | 15.5 | 0.0 | 0.5 | 14 | 0.972 | 1.67 | 0.24 | 0.05 | 0.05 | — |
| Example 8 | 15.0 | 0.3 | 1.0 | 14 | 0.974 | 1.57 | 0.34 | 0.04 | 0.05 | — |
| Example 9 | 14.0 | 0.3 | 0.6 | 14 | 0.966 | 1.70 | 0.22 | 0.04 | 0.04 | — |
| Comparative example 1 | 16.6 | 0.0 | 14.9 | 20 | 0.972 | 1.59 | 0.32 | 0.04 | 0.05 | — |
| Comparative example 2 | 16.6 | 5.8 | 26.0 | 40 | 0.919 | 1.67 | 0.24 | 0.04 | 0.05 | — |
| Comparative example 3 | 18.8 | 3.7 | 38.9 | 29 | 0.949 | 1.56 | 0.35 | 0.04 | 0.05 | — |
| Example 10 | 10.3 | 1.2 | 0.0 | 9 | 0.970 | 2.00 | — | — | — | — |
| Example 11 | 16.5 | 0.5 | 3.0 | 12 | 0.966 | 1.91 | — | 0.70 | — | — |
| Example 12 | 15.9 | 0.0 | 1.6 | 12 | 0.974 | 1.92 | — | — | 0.08 | — |
| Example 13 | 13.3 | 1.4 | 0.5 | 17 | 0.970 | 1.93 | — | 0.03 | 0.04 | — |
| Example 14 | 16.4 | 0.0 | 2.4 | 12 | 0.975 | 1.55 | 0.40 | 0.05 | — | — |
| Example 15 | 15.8 | 0.6 | 1.8 | 12 | 0.973 | 1.68 | 0.27 | 0.03 | — | Ni:0.02 |
| Example 16 | 15.8 | 0.0 | 2.0 | 13 | 0.975 | 1.63 | 0.26 | 0.03 | — | Cr:0.08 |
| Example 17 | 15.3 | 0.3 | 2.1 | 14 | 0.973 | 1.59 | 0.32 | 0.04 | 0.05 | — |
| Example 18 | 15.8 | 0.0 | 1.4 | 12 | 0.975 | 1.76 | 0.15 | 0.05 | 0.05 | — |
| Example 19 | 16.7 | 0.0 | 5.9 | 12 | 0.970 | 1.51 | 0.45 | 0.04 | 0.00 | — |
| Example 20 | 17.3 | 0.0 | 12.9 | 14 | 0.969 | 1.67 | 0.24 | 0.05 | 0.04 | — |

TABLE 4

| | Iron-based oxide magnetic powder Magnetic properties | | | | | |
|---|---|---|---|---|---|---|
| | Hmax (kA/m) | Hc (kA/m) | σs (Am²/kg) | SQ | SFD (main peak) | $I_L/I_H$ |
| Example 1 | 1035 | 314 | 16.6 | 0.637 | 0.71 | 0.14 |
| Example 2 | 1035 | 317 | 14.7 | 0.590 | 1.43 | 0.56 |
| Example 3 | 1035 | 441 | 12.8 | 0.645 | 1.08 | 0.42 |
| Example 4 | 1035 | 558 | 11.4 | 0.673 | 0.89 | 0.29 |
| Example 5 | 1035 | 341 | 16.2 | 0.641 | 0.69 | 0.14 |
| Example 6 | 1035 | 200 | 17.4 | 0.577 | 1.02 | 0.27 |
| Example 7 | 1035 | 223 | 17.4 | 0.595 | 0.91 | 0.21 |
| Example 8 | 1035 | 183 | 17.7 | 0.558 | 1.19 | 0.32 |
| Example 9 | 1035 | 272 | 15.0 | 0.606 | 1.16 | 0.34 |
| Comparative example 1 | 1035 | 177 | 17.9 | 0.522 | 1.00 | 0.41 |
| Comparative example 2 | 1035 | 313 | 15.8 | 0.535 | 0.89 | 0.50 |
| Comparative example 3 | 1035 | 237 | 15.8 | 0.560 | 0.83 | 0.25 |
| Example 10 | 2387 | 560 | 12.8 | 0.544 | 1.99 | 0.47 |
| Example 11 | 2387 | 875 | 20.6 | 0.502 | 1.66 | 0.50 |
| Example 12 | 2387 | 1267 | 16.0 | 0.546 | 0.50 | 0.12 |
| Example 13 | 2387 | 499 | 14.8 | 0.529 | 1.78 | 0.46 |
| Example 14 | 1035 | 324 | 16.9 | 0.626 | 0.77 | 0.20 |
| Example 15 | 2387 | 505 | 22.4 | 0.494 | 0.72 | 0.59 |
| Example 16 | 2387 | 471 | 16.1 | 0.542 | 0.78 | 0.18 |
| Example 17 | 1035 | 171 | 16.6 | 0.556 | 1.21 | 0.33 |
| Example 18 | 1035 | 349 | 15.3 | 0.643 | 0.71 | 0.15 |
| Example 19 | 1035 | 353 | 15.8 | 0.620 | 0.84 | 0.33 |
| Example 20 | 1035 | 327 | 15.4 | 0.628 | 0.97 | 0.25 |

The invention claimed is:

1. An iron-based oxide magnetic powder, comprising particles of ε-iron oxide or ε-iron oxide in which Fe sites are partially substituted by other metal elements, wherein an average particle diameter measured with a transmission electron microscope is 10 nm or more and 20 nm or less, the number ratio of particles with a particle diameter of 8 nm or less is 3% or less, the number ratio of particles with a particle diameter of 20 nm or more is 25% or less, the average circularity of particles measured with a transmission electron microscope is 0.955 or more, and the coefficient of variation of the particle diameter measured with a transmission electron microscope is 19% or less.

2. The iron-based oxide magnetic powder according to claim 1, wherein the metal element that partially substitutes the Fe sites is one or more types of Ga, Co, and Ti.

3. The iron-based oxide magnetic powder according to claim 1, wherein the metal element that partially substitutes the Fe sites is one or more types of Ga, Co, Ti, Ni, Mn, Cr, Nd, Dy, and Gd.

4. A method for producing an iron-based oxide magnetic powder composed of particles of ε-iron oxide or ε-iron oxide in which Fe sites are partially substituted by other metal elements, comprising:

a raw material solution preparation step of preparing a raw material solution containing trivalent iron ions, or trivalent iron ions and ions of a metal element that partially substitutes the Fe sites, and an alkaline aqueous solution for neutralizing the raw material solution;

a first neutralization step of continuously or intermittently adding each of the raw material solution and the alkaline aqueous solution to a reaction system and mixing so as to adjust the pH of the reaction system to 1.0 or higher and 3.0 or lower;

a step of adding a hydroxycarboxylic acid to the aqueous solution after the first neutralization step;

a second neutralization step of neutralizing the pH to 7.0 or higher and 10.0 or lower by adding an alkali to the aqueous solution to which the hydroxycarboxylic acid is added, thereby obtaining a slurry containing a precipitate of an iron oxyhydroxide or a substituent metal element-containing iron oxyhydroxide;

a step of adding a silicon compound having a hydrolyzable group to the slurry containing the iron oxyhydroxide or the substituent metal element-containing iron oxyhydroxide, thereby coating the iron oxyhydroxide or the substituent metal element-containing iron oxyhydroxide with a hydrolysate of the silicon compound;

a step of heating the substituent metal element-containing iron oxyhydroxide coated with the hydrolysate of the silicon compound, thereby forming ε-iron oxide or ε-iron oxide, in which Fe sites are partially substituted by other metal elements, coated with silicon oxide;

a step of removing the silicon oxide on the ε-iron oxide or the ε-iron oxide, in which Fe sites are partially substituted by other metal elements, coated with the silicon oxide, thereby obtaining a slurry containing the ε-iron oxide or the ε-iron oxide, in which Fe sites are partially substituted by other metal elements;

a step of adding a quaternary ammonium salt at a concentration of 0.009 mol/kg or more and 1.0 mol/kg or less as a surface modifier to the slurry containing the ε-iron oxide or the ε-iron oxide, in which Fe sites are partially substituted by other metal elements, and also adjusting the pH to 11.0 or higher and 14.0 or lower;

a step of subjecting the surface modifier-containing slurry to a dispersion treatment, thereby obtaining a dispersion slurry of particles of the ε-iron oxide or the ε-iron oxide, in which Fe sites are partially substituted by other metal elements; and a step of classifying the dispersion slurry of the particles of the ε-iron oxide or the ε-iron oxide, in which Fe sites are partially substituted by other metal elements.

5. The method for producing an iron-based oxide magnetic powder according to claim 4, wherein the first neutralization step is a step of continuously or intermittently adding each of the raw material solution and the alkaline aqueous solution containing an alkali in an amount of 0.4 equivalents or more and 0.9 equivalents or less with respect to the total amount of an acid group contained in the raw material solution to the reaction system which does not contain trivalent iron ions or ions of a metal element that partially substitutes the Fe sites and mixing so as to adjust the pH of the reaction system to 1.0 or higher and 3.0 or lower.

6. The method for producing an iron-based oxide magnetic powder according to claim 5, wherein in the first neutralization step, the addition rate of each of the raw material solution and the alkaline aqueous solution is adjusted so as to maintain the cumulative addition amount of the alkali with respect to the total cumulative addition amount of the acid group contained in the raw material solution within a range of 0.4 equivalents or more and 0.9 equivalents or less through the step.

7. The method for producing an iron-based oxide magnetic powder according to claim 5, wherein the cumulative addition amount of the alkali with respect to the total cumulative addition amount of the acid group contained in the raw material solution is set to 0.6 equivalents or more and 0.9 equivalents or less through the first neutralization step.

8. The method for producing an iron-based oxide magnetic powder according to claim 4, wherein the first neutralization step is a step in which when each of the raw material solution and the alkaline aqueous solution is continuously or intermittently added to the reaction system which previously contains trivalent iron ions, or trivalent iron ions and ions of a metal element that partially substitutes the Fe sites, the amount of the trivalent iron ions and the ions of the metal element that partially substitutes the Fe sites previously contained in the reaction system is set to 50 mol % or less of the sum of the amount of the trivalent iron ions and the ions of the metal element that partially substitutes the Fe sites and the amount of the trivalent iron ions and the ions of the metal element that partially substitutes the Fe sites contained in the raw material solution added to the reaction system, and each of the raw material solution and the alkaline aqueous solution containing an alkali in an amount of 0.4 equivalents or more and 1.8 equivalents or less with respect to the total amount of an acid group contained in the raw material solution is continuously or intermittently added to the reaction system and mixed so as to adjust the pH of the reaction system to 1.0 or higher and 3.0 or lower.

9. The method for producing an iron-based oxide magnetic powder according to claim 8, wherein the cumulative addition amount of the alkali with respect to the total cumulative addition amount of the acid group contained in the raw material solution is set to 0.4 equivalents or more and 1.8 equivalents or less through the first neutralization step.

10. The method for producing an iron-based oxide magnetic powder according to claim 4, wherein in the first neutralization step, the raw material solution and the alkaline aqueous solution are added over 10 minutes or more.

11. The method for producing an iron-based oxide magnetic powder according to claim 4, wherein the average diameter measured with a dynamic light scattering particle size distribution analyzer of the slurry containing the iron oxyhydroxide or the substituent metal element-containing iron oxyhydroxide obtained in the second neutralization step is 300 nm or less.

12. The method for producing an iron-based oxide magnetic powder according to claim 4, wherein iron (III) chloride is used as a supply source of the trivalent iron ions contained in the raw material solution.

* * * * *